US012762311B2

(12) United States Patent
Tielve et al.

(10) Patent No.: US 12,762,311 B2
(45) Date of Patent: Oct. 13, 2026

(54) SYSTEM CONFIGURED TO GENERATE LAYOUT PLANS

(71) Applicant: Ai Fire Design LLC, Belleville, NJ (US)

(72) Inventors: Jason Tielve, Wayne, NJ (US); Harry SanMartin, North Arlington, NJ (US)

( * ) Notice: Subject to any disclaimer, the term of this patent is extended or adjusted under 35 U.S.C. 154(b) by 0 days.

(21) Appl. No.: 19/568,785

(22) Filed: Mar. 17, 2026

(65) Prior Publication Data

US 2026/0252767 A1 Aug. 27, 2026

Related U.S. Application Data

(60) Provisional application No. 63/898,250, filed on Oct. 13, 2025.

(51) Int. Cl.

*G06F 30/27* (2020.01)
*G06F 30/12* (2020.01)
*G06F 30/13* (2020.01)
*G06F 30/18* (2020.01)
*G06F 111/02* (2020.01)
*G06F 111/04* (2020.01)

(52) U.S. Cl.

CPC .............. *G06F 30/27* (2020.01); *G06F 30/12* (2020.01); *G06F 30/13* (2020.01); *G06F 30/18* (2020.01); *G06F 2111/02* (2020.01); *G06F 2111/04* (2020.01)

(58) Field of Classification Search

CPC .......... G06F 30/27; G06F 30/12; G06F 30/13; G06F 30/18; G06F 2111/02; G06F 2111/04

See application file for complete search history.

(56) References Cited

U.S. PATENT DOCUMENTS 12,463,820 B1 * 11/2025 Narayan ................ G06V 10/25
12,596,975 B1 * 4/2026 Torpen ............. G06Q 10/06313
2020/0380081 A1 * 12/2020 Rossi ...................... G06F 30/13
2026/0120420 A1 * 4/2026 Baskin .................... G06T 19/20

* cited by examiner

*Primary Examiner* — Chuen-Meei Gan
(74) *Attorney, Agent, or Firm* — Joshua Kaplan; Kaplan Law Practice LLC

(57) ABSTRACT

A system and method for automating the design and layout of building infrastructure systems using artificial intelligence. The system includes a front-end interface for initiating and managing projects, receiving architectural layout files and project-specific data, and presenting output in blueprint or digital format. A back-end AI engine comprises a measure agent for processing spatial and dimensional data from vector files, an AI agent for performing calculations and generating compliant layouts for fire sprinklers, HVAC, plumbing, electrical, alarms, fire extinguishers, and low-voltage systems based on applicable codes, and an assemble agent for compiling, validating, and outputting the final layout. The system identifies hazard areas, recommends components and supports iterative design revisions until a validated, code-compliant solution is achieved. The system further provides optional virtual reality or augmented reality demonstrations for testing and reviewing proposed layouts prior to implementation.

28 Claims, 32 Drawing Sheets

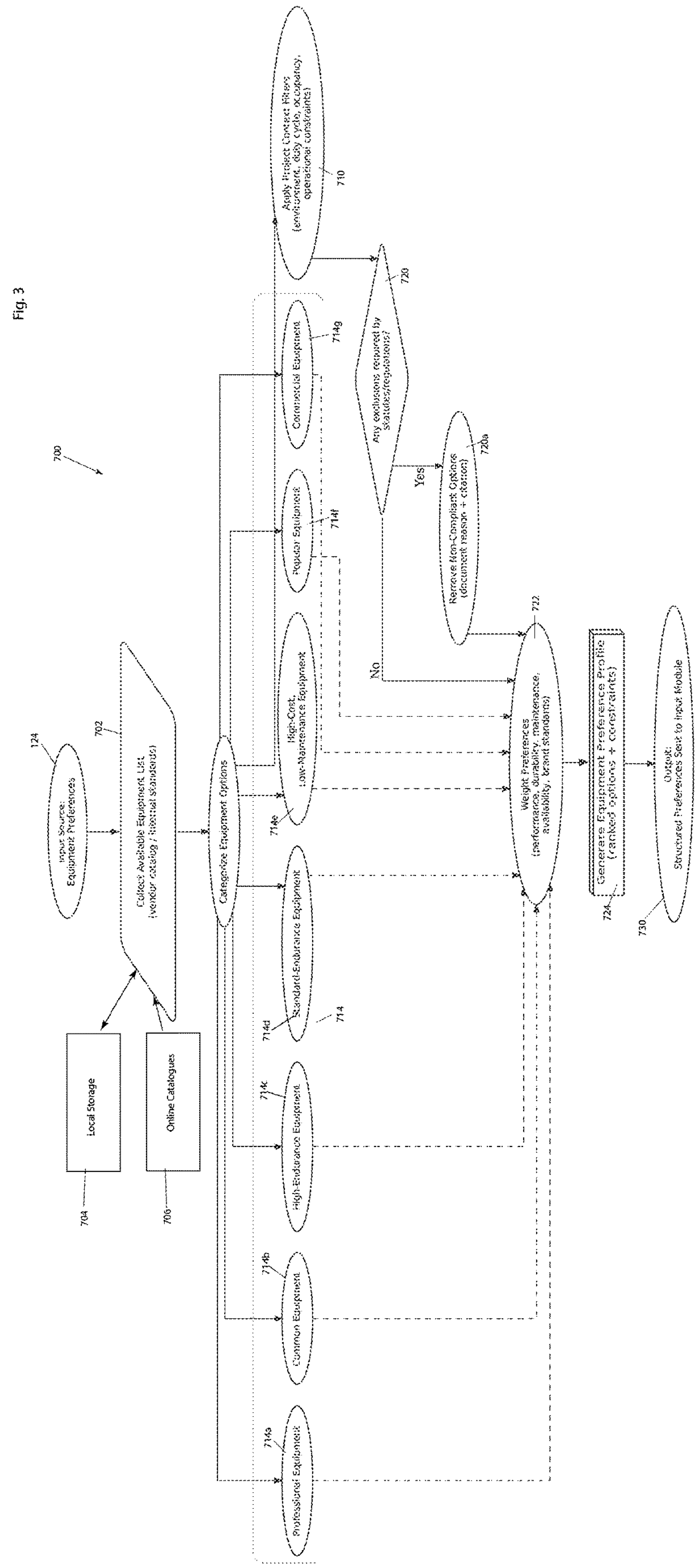
Fig. 3
700
Input Source: Equipment Preferences
124
Collect Available Equipment List (vendor catalog / internal standards)
702
Local Storage
704
Online Catalogues
706
Categorize Equipment Options
Apply Project Context Filters (environment, duty cycle, occupancy, operational constraints)
710
Commercial Equipment
714g
Regular Equipment
714f
High-Cost, Low-Maintenance Equipment
714e
Standard-Endurance Equipment
714d
714
High-Endurance Equipment
714c
Common Equipment
714b
Professional Equipment
714a
Any exclusions required by statutes/regulations?
720
Yes
No
Remove Non-Compliant Options (document reason + citation)
720a
Weight Preferences (performance, durability, maintenance, availability, brand standards)
722
Generate Equipment Preference Profile (ranked options + constraints)
724
Output: Structured Preferences Sent to Input Module
730

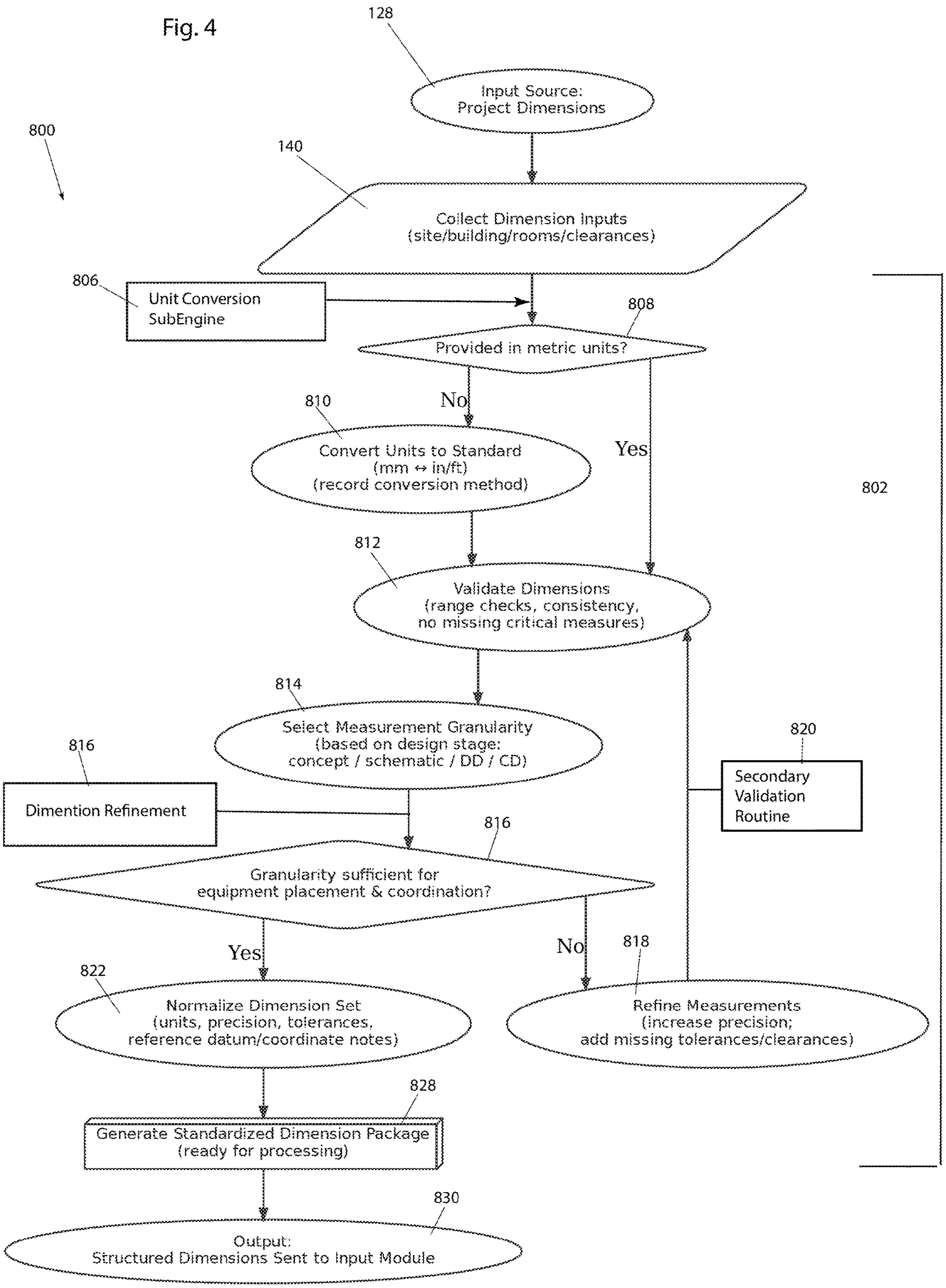
Fig. 4
128
Input Source:
Project Dimensions
800
140
Collect Dimension Inputs
(site/building/rooms/clearances)
806
Unit Conversion
SubEngine
808
Provided in metric units?
810
No
Convert Units to Standard
(mm ↔ in/ft)
(record conversion method)
Yes
802
812
Validate Dimensions
(range checks, consistency,
no missing critical measures)
814
Select Measurement Granularity
(based on design stage:
concept / schematic / DD / CD)
816
Dimention Refinement
820
Secondary
Validation
Routine
816
Granularity sufficient for
equipment placement & coordination?
Yes
No
818
822
Normalize Dimension Set
(units, precision, tolerances,
reference datum/coordinate notes)
Refine Measurements
(increase precision;
add missing tolerances/clearances)
828
Generate Standardized Dimension Package
(ready for processing)
830
Output:
Structured Dimensions Sent to Input Module

SYSTEM CONFIGURED TO GENERATE LAYOUT PLANS

BACKGROUND OF THE INVENTION

The present invention relates generally to building safety and infrastructure systems, and more particularly to systems and methods for designing and laying out fire protection sprinkler systems, heating, ventilation and air conditioning (HVAC) systems, plumbing, electrical wiring, alarm systems, and other low-voltage installations. Specifically, the invention pertains to an artificial intelligence (AI)-driven software application that automates the process of designing fire sprinkler layouts in accordance with applicable codes and standards. Regulations that may be analyzed and considered by the described system may include but are not limited to the National Fire Protection Association (NFPA), local building regulations, international building regulations, and most importantly, all such laws and regulations that would govern in a jurisdiction where each individual project developed by the disclosed system will reside.

Traditionally, the design of building infrastructure systems has been a manual, labor-intensive process requiring significant engineering expertise. Designers and engineers must interpret architectural and mechanical plans for each individual project, analyze space utilization, occupancy classifications, utility requirements, and hazard levels, and then manually configure elements such as sprinkler head placement, pipe routing, duct distribution, electrical wiring paths, alarm sensors, pipe routing, hydraulic calculations, and low-voltage device placement. Each of these tasks must be performed in compliance with NFPA standards, plumbing and electrical codes, HVAC regulations, and local ordinances. This process can be time-consuming, prone to human error, and may require multiple rounds of review and revision.

While some computer-aided design (CAD) tools have been introduced to assist with this process, these tools generally function as drafting aids rather than decision-making systems. They lack the capability to independently interpret architectural features or apply code requirements without direct human input. Moreover, current systems do not incorporate machine learning or intelligent inference mechanisms that can adapt to different building types or regional code variations.

Accordingly, there is a need for an intelligent, automated system that can streamline and improve the process of designing infrastructure layouts and fire sprinkler systems. The present invention addresses this need by introducing an AI-based software application capable of autonomously analyzing building layouts, interpreting relevant code provisions, and generating compliant designs for fire protection sprinklers, HVAC systems, plumbing, electrical, alarm, fire extinguishers, and low-voltage systems such as closed-circuit cameras, speakers, and LED lighting in a fraction of the time required by manual methods.

SUMMARY OF THE INVENTION

The present invention provides an AI-driven system and method for automating the design and layout of building infrastructure systems, including fire protection sprinkler systems, HVAC, plumbing, electrical wiring, alarm systems, strategic placement of fire extinguishers, and low-voltage installations such as closed-circuit cameras, speakers, and LED lighting systems. The system is configured to streamline the traditionally manual and time-intensive design process by intelligently interpreting project-specific data and generating optimized layouts in accordance with applicable codes and standards, including NFPA or IBC standards and local building regulations.

In one aspect of the invention, the system includes a user interface configured to initiate and manage multiple design projects across multiple user accounts. Through this interface, users can input various data points associated with a particular building, building infrastructure, or fire protection project. These inputs include, but are not limited to, architectural files in a proprietary binary format such as DWX or other CAD-compatible file types that store both two-dimensional and three-dimensional design data along with associated metadata. Additional inputs may include project-specific variables such as the brand and model information (sprinkler heads, HVAC units, pipes, wiring, sensors, cameras, etc.), resource availability (water pressure, electrical load capacity, air flow requirements), and location-specific parameters such as floor levels, ceiling heights, and designated service corridors.

Upon receiving these inputs, the system routes the data to a generator module, which employs AI-based logic and pattern recognition to analyze spatial configurations and generate a planned or proposed building infrastructure system being mapped out. The generator module conducts automated measurements of interior spaces, selects appropriate sprinkler head placements, pipe routing, and hydraulic configurations, pipes, ducts, conduits, wiring, and devices and tests the proposed layout against applicable codes and the supplied project parameters. Importantly, the system coordinates the interaction of multiple infrastructure systems within a shared space to avoid physical conflicts, such as preventing sprinkler piping from intersecting HVAC ductwork, or ensuring electrical conduits do not interfere with alarm wiring or low-voltage installations. The layout is dynamically adjusted in response to any deficiencies or noncompliance detected during internal validation tests.

The output of the system comprises a newly generated .DWX file or equivalent format, containing the complete infrastructure layout, including pipe types, diameters, fitting specifications, duct dimensions, fitting types, wiring gauges, device placement coordinates, pitch and elevation data, and placement recommendations tailored to available resources and regulatory requirements, including the k-factor and available water pressure. Additionally, the system provides a hazard assessment summary highlighting areas of increased fire risk, which may require special design considerations or components.

The system further enables users to review and validate the proposed design through a test or live demonstration session. This may include the generation of a virtual environment derived from the architectural drawings, combined with a three-dimensional representation of the proposed infrastructure layout, effectively creating a virtual reality (VR) tour of the system within the building. Users may also view the proposed layout by overlaying system elements onto a snapshot or real time spatial image or scan of the current or existing environment, thereby enabling direct comparison between the designed solution and real-world conditions.

The final output may be delivered to the user in a variety of formats, including a .DWX file for further CAD-based manipulation, a two-dimensional printed blueprint, or a compiled digital interface such as a web page presenting the finalized 2D layout. By automating complex decision-making processes and code compliance verification, the invention significantly improves design accuracy, efficiency, and project turnaround times of building systems and infrastructure projects.

BRIEF DESCRIPTION OF DRAWINGS

FIG. 3 outlines equipment preference intake, filtering, and selection.

FIG. 4 presents project dimension intake, unit normalization, and validation.

DETAILED DESCRIPTION OF THE INVENTION

Figure 1:
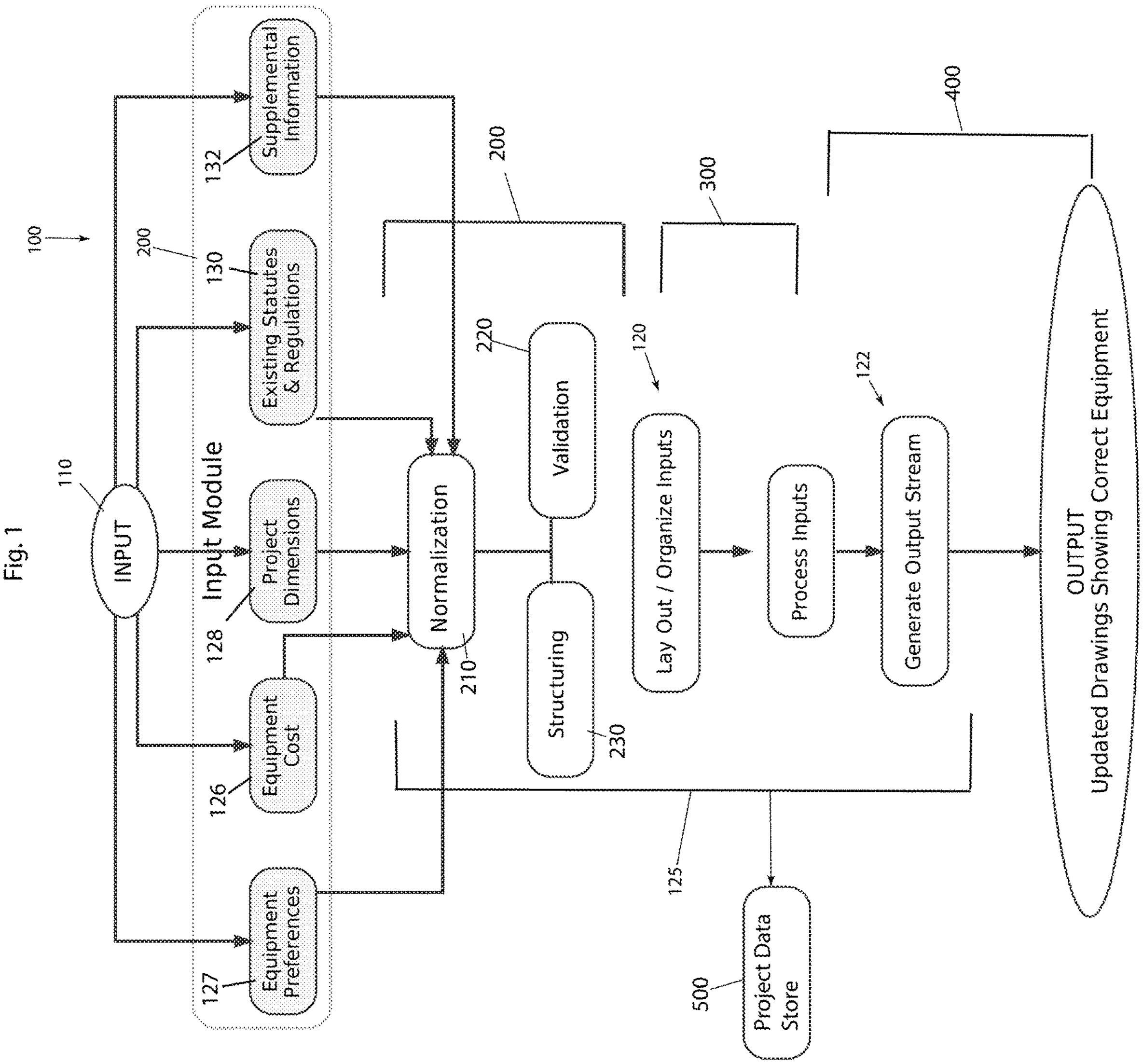
FIG. 1 shows the overall system architecture for ingesting inputs, applying constraints, and generating outputs.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 depicts a system-level architecture 100 implementing a computer-executed application configured to ingest heterogeneous project information, normalize and validate the ingested information into machine-actionable representations, and computationally synthesize one or more compliant design outputs consisting of fire retardant sprinkling systems, plumbing systems, electrical systems, heating, air-conditioning and/or ventilation systems or any combination of such systems, collectively or individually ("Engineered System"). The architecture of one embodiment of software application 100 includes a user interface subsystem 110 operatively coupled to an input module 200, the input module 200 being operatively coupled to a processing module 300, and the processing module 300 being operatively coupled to an output module 400. The operative coupling may be realized by one or more interprocess communication channels, application programming interfaces, network interfaces, shared memory, message buses, or combinations thereof, such that data objects are transmitted, transformed, and persisted as the disclosed workflow proceeds. The preferred or planned Engineered System is preferably designed by the architecture 100 with all generating equipment, conducting architecture, control interfaces, and input/output interchanges, or a particular subsets thereof.

The user interface subsystem 110 is configured to provide a human-machine interface for initialization of a project instance and for acquisition of primary and supplemental inputs. In exemplary embodiments, the user interface subsystem 110 comprises one or more graphical user interfaces executing on a client device and/or browser, and further comprises an exchange layer enabling authenticated submission of structured and unstructured artifacts. The user interface subsystem 110 is further configured to accept or facilitate acquisition of three-dimensional model artifacts and/or two-dimensional drawing artifacts, including but not limited to BIM-derived model files, CAD drawings, raster images, and scanned documents. Where the user-provided artifacts are not natively machine-interpretable, the user interface subsystem 110 may invoke pre-processing routines that enable conversion of image-based or scan-based drawings into a structured model representation suitable for downstream parsing and feature extraction.

An embodiment of model-file input 120 comprises one or more three-dimensional or parametric representations of a facility, space, or site, including geometric primitives, spatial topology, and, where available, semantic attributes describing architectural and building-system elements where the Engineering System is to be disposed. The model-file input 120 may be provided directly by a user via the user interface subsystem 110 or may be produced by conversion of other artifacts into a model structure.

A drawing input 122 may comprise one or more two-dimensional architectural plan sets, schematics, elevations, reflected ceiling plans, or similar drawing artifacts. The drawing input 122 may be provided in vector form, raster form, or scanned form, and may be converted, in whole or in part, into a structured representation usable by the input module 200 and the processing module 300.

In exemplary embodiments, the system receives a model-file input 120 and/or a drawing input 122 and generates one or more output streams 123, wherein ingestion, prioritization, reconciliation, and sequencing of such inputs and outputs are preferably organized by an AI engine 125 that coordinates parsing, normalization, and constraint-aware preparation of the project dataset for downstream processing.

The embodiment of the input module 200 shown in FIG. 1, may comprise a plurality of various input streams. The following subset of input streams may be provided, but fewer or additional input streams may exist or may be added or configured by user preference or dynamically by the AI engine 125. An equipment cost input 126 may comprise cost constraints, budget ceilings, price lists, bid schedules, cost databases, or other economic parameters usable to evaluate tradeoffs among candidate equipment configurations and to compute cost-optimized or cost-constrained design outputs.

A project-dimension input 128 may comprise dimensional descriptors and boundary conditions, including spatial extents, occupancy parameters, floor-area measures, ceiling heights, hazard classifications, and other geometric or programmatic constraints that condition the code analysis and equipment selection logic.

A regulatory input 130\ may comprise codified constraints and normative requirements derived from statutes, administrative regulations, adopted model codes, local amendments, authority having jurisdiction interpretations, and/or project-specific compliance criteria. The regulatory input 130 may be provided as user-specified jurisdictional selections, as machine-readable rule sets, and/or as documents from which constraints are extracted and formalized. A supplemental project-data input (132) may comprise additional project artifacts and metadata not otherwise enumerated, including existing conditions data, as-built documentation, architectural drawings, site constraints, operational requirements, inspection history, and integration requirements for building systems. Equipment preferences 127 may contain an input of available manufacturers, and specify class or style of equipment.

The input module (200) is configured to receive the inputs (127), (126), 128), (130), and (132) from the user interface subsystem (110) and to transform such inputs into a unified, internally consistent dataset for computational processing. The input module (200) may operate in a batch mode for initial project ingestion and may further operate in a dynamic mode in which subsequent inputs are incrementally received, versioned, and merged into an evolving project state without requiring reinitialization of the entire workflow.

A data normalization engine (210), implemented within the input module (200), is configured to perform canonicalization of formats and units, coordinate-frame harmonization, schema alignment, and semantic mapping such that heterogeneous artifacts are converted into a shared internal representation. In exemplary embodiments, the data normalization engine (210) transforms geometric entities and associated metadata into standardized primitives and attributes, thereby enabling uniform downstream reasoning across model-based and drawing-based sources.

A data validation engine (220), implemented within the input module (200), is configured to perform integrity checks and completeness assessments over the normalized dataset. The data validation engine (220) detects missing fields, incompatible scales, inconsistent topology, non-manifold geometry, conflicting attribute assignments, and other error conditions that may impair reliable synthesis, and it produces one or more validation results that may be stored and/or surfaced to the user interface subsystem (110) for corrective action.

A data structuring engine (230), implemented within the input module (200), is configured to organize validated and normalized data into categorized datasets and indexed structures that facilitate efficient retrieval and computation by the processing module (300). In exemplary embodiments, the data structuring engine (230) generates one or more spatial indexes, adjacency graphs, element taxonomies, constraint tables, and parameter bundles that together represent the project state in a computation-ready form.

The processing module (300) is configured to perform multi-source data reconciliation and synthesis to generate candidate design solutions and compliance determinations. In exemplary embodiments, the processing module (300) overlays the regulatory input (130) onto the structured project representation produced by the input module (200), resolves conflicts among constraints and user preferences, and computes equipment placement, signage, egress features, and other fire- and life-safety plan elements consistent with the governing requirements and project constraints. The processing module (300) may implement rule-based inference, constraint satisfaction, optimization routines, machine-learning-assisted recognition, or combinations thereof, and may further reconcile multiple input streams by prioritization logic, confidence scoring, and/or traceable provenance linking outputs to their contributing inputs.

The output module (400) is configured to materialize one or more system outputs derived from the processing module (300), including, by way of example, one or more design layouts, compliance overlays, annotated drawings, structured reports, and exportable artifacts. The output module (400) may generate preview able representations suitable for interactive review via the user interface subsystem (110) and may further generate finalized deliverables in machine-readable and/or human-readable formats suitable for implementation, inspection, permitting, or archival.

A project data store (500) may be provided to persist the ingested inputs, intermediate representations, version history, and generated outputs associated with the architecture (100). The project data store (500) may comprise one or more databases, object stores, and/or file repositories, and may retain provenance metadata associating normalized and structured inputs with processing results and output artifacts, thereby enabling reproducibility and auditability across iterative project revisions.

Figure 2:
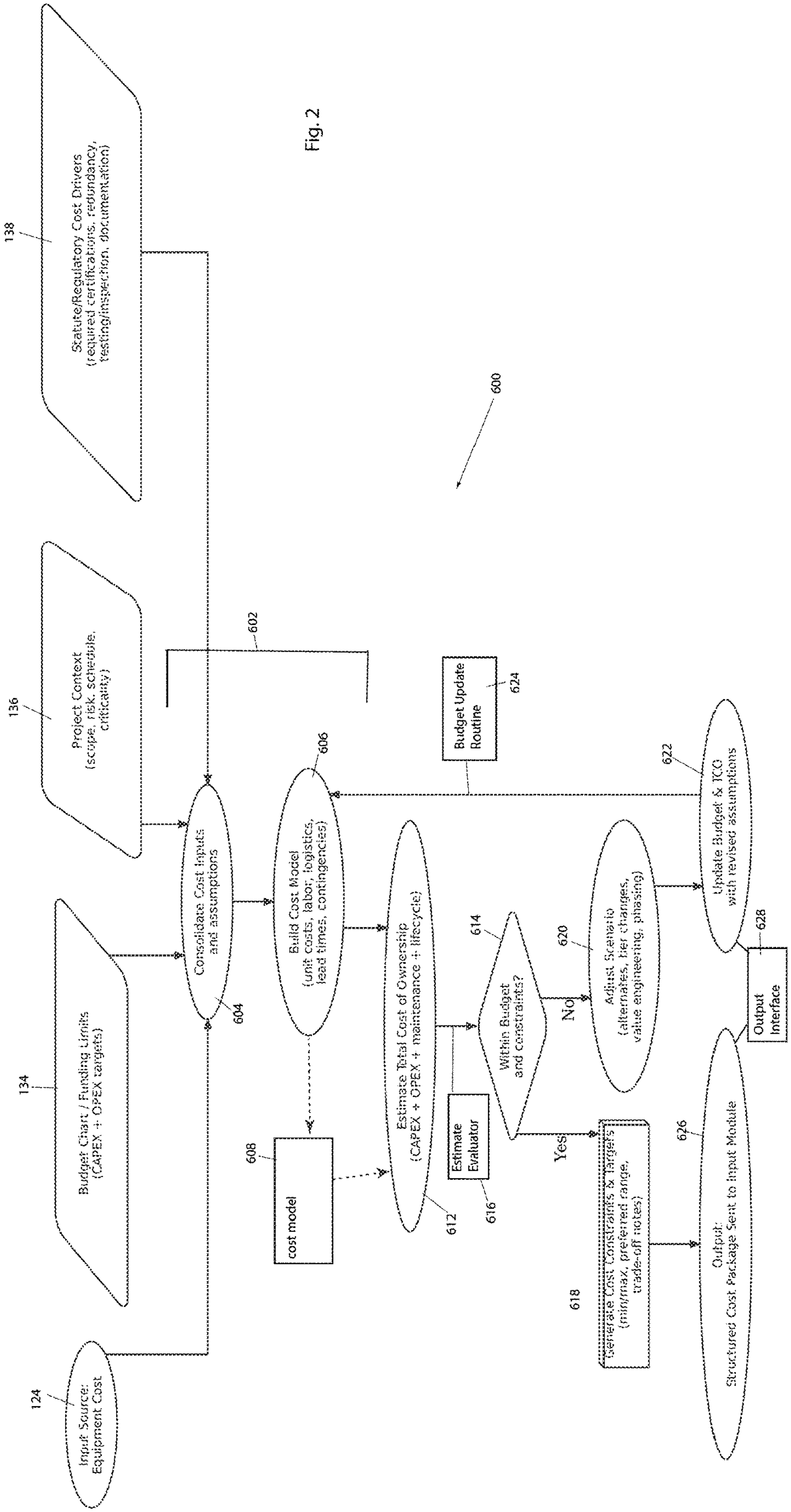
FIG. 2 illustrates equipment cost intake, budgeting, and cost-constraint generation.

FIG. 2 depicts an equipment-cost synthesis and budgeting workflow 600 that may be executed as a specialized input-processing pathway contributing to the equipment cost input 126 described with respect to FIG. 1. In the illustrated embodiment, the workflow 600 receives one or more cost-relevant data sources, consolidates such data into structured cost inputs, constructs a computable cost model, generates an estimate, and conditionally iterates the estimate and/or constraints based on a budget-conformance determination, ultimately emitting cost constraints back to the input module 200 for further processing by the processing module 300.

The embodiment of the equipment preference input 124 shown in FIG. 2 comprises user-specified equipment selections, performance targets, manufacturer constraints, feature constraints, or other preference vectors that influence equipment type, rating, placement, and integration within the synthesized design output.

A budget chart input (134) comprises one or more budgetary envelopes, allocation schedules, cost ceilings, and/or line-item constraints that define an allowable spending boundary for a project or a portion thereof. The budget chart input (134) may be provided by a user via the user interface subsystem (110) and/or retrieved from an external system or project repository, and may include temporal constraints (e.g., phased release of funds) and categorical constraints (e.g., fixed allocations per equipment class).

A project context input (136) comprises contextual parameters describing the operational and execution environment of the project, including scope descriptors, risk tolerances, schedule constraints, mission criticality, uptime requirements, and similar factors that influence acceptable cost tradeoffs and allowable substitution or deferral of equipment and services.

A regulatory cost-driver input (138) comprises cost-influencing regulatory and compliance factors derived from the regulatory input (130) and related materials, including required certifications, required redundancies, required inspection frequencies, documentation or recordkeeping mandates, commissioning requirements, testing protocols, and jurisdiction-specific approval pathways that impose incremental costs on certain selections or configurations.

A cost consolidation engine (602) is configured to ingest and reconcile the equipment cost input (126), the budget chart input (134), the project context input (136), the regulatory input (130), and the regulatory cost-driver input (138) into consolidated cost inputs (604). The cost consolidation engine (602) performs normalization of units and price bases, mapping of costs to equipment categories and compliance requirements, and association of context-derived multipliers or weighting factors, such that cost quantities become comparable across vendors, equipment classes, and compliance scenarios. The cost consolidation engine (602) may further encode explicit assumptions, confidence intervals, and provenance links so that any downstream estimate is traceable to its contributing inputs.

Consolidated cost inputs (604) comprise a structured cost dataset formed by the cost consolidation engine (602) and usable as an input to a cost-model generation routine. The consolidated cost inputs (604) may include baseline unit costs, installation and integration costs, certification and inspection costs, redundancy-driven duplication costs, documentation costs, schedule-driven premiums, and risk-driven contingency allocations.

A cost model generator (606) is configured to construct a cost model (608) from the consolidated cost inputs (604). In exemplary embodiments, the cost model generator (606) generates a parametric, rule-conditioned, or probabilistic model that computes total cost as a function of selected equipment configurations, regulatory obligations, and contextual constraints, and further supports sensitivity analysis and scenario evaluation under alternative assumptions.

A cost model (608) may comprise a computable representation of expected costs associated with one or more candidate equipment configurations and associated compliance obligations. The cost model (608) may further encode line-item decompositions and aggregation logic, and may include allowances for uncertainty, escalation, lead-time effects, and jurisdictional approval sequencing.

An estimate evaluator (610) is configured to evaluate the cost model (608) and produce an estimated cost output (612). The estimate generator (610) may produce a total estimated cost and may additionally produce intermediate values such as cost by equipment class, cost by regulatory requirement, and cost by project phase.

An estimated cost output (612) comprises one or more computed estimates generated by the estimate generator (610) based on the cost model (608). The estimated cost output (612) may be persisted, displayed, and/or used as an input to a budget-conformance determination.

A budget-conformance query (614) comprises a user-initiated or system-initiated request to determine whether the estimated cost output (612) satisfies the budget chart input (134). In exemplary embodiments, the budget-conformance query (614) may be invoked via the user interface subsystem (110) as an interactive check and may be invoked automatically by the system upon formation of a new estimate or revision of any contributing input.

The budget conformance evaluator (616) is configured to compare the estimated cost output (612) to the budget chart input (134), optionally conditioned by project context input (136) and regulatory cost-driver input (138), and to generate a within-budget determination (618). The budget conformance evaluator (616) may apply categorical and temporal budget constraints in addition to aggregate ceilings and may compute margin-to-budget values and identify the dominant contributors to any exceedance.

A within-budget determination (618) comprises a computed result indicating whether a candidate configuration's estimated cost output (612) is within the applicable budget chart input (134). The within-budget determination (618) may include a binary indicator, a quantitative variance amount, and attribution metadata identifying which cost drivers and/or regulatory factors contributed to any variance.

A scenario adjustment engine (620) is configured to be conditionally invoked when the within-budget determination (618) indicates that the estimated cost output (612) exceeds the applicable budget chart input (134). The scenario adjustment engine (620) generates one or more updated scenarios (622) by modifying one or more parameters within the consolidated cost inputs (604), the cost model (608), and/or upstream selections, including substitutions among equipment alternatives, reallocation of budget categories, adjustment of redundancy levels where permitted by code and project context, or sequencing modifications that alter cost timing. The scenario adjustment engine (620) may generate candidate recommendations for display to the user via the user interface subsystem (110), and may further generate automatic modifications where the user has authorized such adjustments.

Updated scenarios (622) comprise one or more modified parameter sets and/or candidate equipment configurations produced by the scenario adjustment engine (620) for re-evaluation. The updated scenarios (622) are provided as revised inputs to the cost model generator (606) and/or the estimate generator (610), thereby forming an iterative loop until budget conformance is achieved or until termination criteria are met.

A budget update routine (624) is configured to optionally revise the budget chart input (134) responsive to user authorization and/or project governance rules. In exemplary embodiments, where a user elects to increase a budget ceiling, reallocate line items, or modify phase allocations, the budget update routine (624) updates the budget chart input (134), after which the workflow (600) returns to re-evaluate budget conformance through the budget conformance evaluator (616) using the updated budget values.

Final cost constraints (626) comprise cost-limiting parameters generated when the within-budget determination (618) indicates conformance, or when an accepted scenario has been selected. The final cost constraints (626) may include maximum allowable unit costs, permitted equipment classes, approved vendor lists, contingency ceilings, phase-specific allocations, and cost-driven placement or redundancy limitations consistent with the regulatory input (130) and project context input (136).

A cost-constraint output interface (628) is configured to transmit the final cost constraints (626) as a structured contribution to the equipment cost input (126) and/or as a separate constraint object delivered to the input module (200). In this manner, the cost constraints generated in FIG. 2 become part of the unified internal representation produced by the input module (200) and may be jointly reconciled with other inputs by the processing module (300) as described with respect to FIG. 1. The output interface 628 is another way by which a user may view the estimated cost of a desired system based on parameters and constraints and has an opportunity to adjust the budget or provide notice and incite to $3^{rd}$ parties early in the data processing of the application 100.

FIG. 3 depicts an equipment-preference workflow (700) that begins with equipment preference input (124), expands that preference into available equipment lists, filters and removes noncompliant equipment, then further categorizes, ranks, and outputs an equipment list for submission to the input module (200). Components introduced in FIG. 1 retain their reference numerals in FIG. 3, including the user interface subsystem (110), input module (200), processing module (300), and output module (400).

An equipment source aggregator (702) is configured to collect available equipment lists from one or more sources, including a local equipment database (704) and one or more online catalogs (706) accessible from manufacturers or other remote repositories.

A local equipment database (704) stores equipment list records available to the application for equipment preference processing.

An external catalog interface (706) enables collection of equipment lists from Internet-accessible catalogs, including manufacturer-provided catalogs, and may normalize retrieved catalog records into an internal schema.

A classification engine (714) is configured to categorize collected equipment into application-defined categories, including professional equipment 714*a*, common equipment 714*b*, high-endurance equipment 714*c*, standard equipment 714*d*, high-cost equipment 714*e*, low-maintenance equipment 714*f*, popular equipment 714*g*, and commercial equipment 714*h*. These or other categories may be defined by user preference, type of project, budget, or structural limitations.

A preference-and-requirements filter (710) is configured to identify an appropriate amount and configuration of equipment from the categorized equipment based on consumer preference and configuration data and project requirements, and to determine whether any equipment items must be excluded or modified based on regulations.

A preference-and-requirements filter (710) is configured to identify an appropriate amount and configuration of equipment from the categorized equipment based on consumer preference and configuration data and project requirements, and to determine whether any equipment items must be excluded or modified based on regulations.

A regulatory compatibility filter (720) is configured to remove equipment items determined to be noncompliant 720*a*, thereby producing a compliant equipment set (722).

A list generation and ranking engine (724) is configured to further categorize the compliant equipment set (722) based on performance, durability, maintenance, availability, and brand standards, to produce and rank an equipment list output (730) from the further-categorized equipment.

A ranked equipment list output (730) comprises a structured equipment list and ranking data that is provided to the input module (200) for subsequent processing with other project inputs as described with respect to FIG. 1.

FIG. 4 depicts a project-dimension synthesis workflow (800) that refines the project-dimension input (128) described with respect to FIG. 1 and generates a standard dimension package (830) for submission to the input module (200). Components introduced in FIG. 1 retain their reference numerals in FIG. 4, including the user interface subsystem (110), the input module (200), the data normalization engine (210), the data validation engine (220), the data structuring engine (230), the processing module (300), and the output module (400).

A site-dimension input (140) comprises site-scale dimensional parameters describing the site envelope and spatial limits relevant to placement and routing. Additional dimension input may comprise building-scale dimensional parameters describing overall building geometry and governing building-level measurements, room-dimension input describing room geometry, extents, and room-specific measurements, clearance input comprising clearance parameters and containing required or measured offsets, envelopes, and access/egress clearances that constrain installation and coordination.

A dimension intake engine (802) is configured to ingest the project-dimension input (128), including one or more of 140 the site-dimension input, building-dimension input, room-dimension input, and clearance input, and to marshal the received measurements into an internal dimensional dataset for downstream normalization and validation.

A unit conversion subengine (806) is configured to transform the ingested dimensions into a selected canonical unit basis, thereby producing a unit-normalized dimension set suitable for deterministic computation. A preferred unit-normalized dimension set comprises the project dimensions expressed in the selected unit system and represented in a consistent internal format. The unit conversion subengine 806 therefore to perform engineering validation of the unit-normalized dimension set (808), including range checks, cross-field consistency checks, and verification of critical measures against expected dimensional relationships, and converts to necessary or preferred units if required 810.

A validation result (812) comprises machine-actionable validation indicators identifying pass/fail states and, where applicable, error and warning conditions associated with specific dimensional elements.

A granularity assessment (814) is configured to set and evaluate measurement granularity and to determine whether the available dimensional resolution is sufficient to support equipment placement and coordination requirements.

A dimension refinement engine (816) may be provided in some embodiments and would be configured to be conditionally invoked when the granularity assessor (814) indicates insufficient resolution, and to refine the dimensional dataset by increasing measurement precision and/or incorporating missing tolerances or clearance values, thereby producing refined dimensions (818).

Refined dimensions (818) comprise the refined and/or augmented measurement values generated by the dimension refinement engine (816).

A secondary validation routine (820) may be provided or requested configured to re-validate the refined dimensions (818) to confirm that the refinement resolves prior deficiencies and yields a validated dimension result (812).

A validated dimension set (822) comprises dimension values that have passed validation and satisfy the granularity threshold for downstream placement and coordination computations.

A dimension package generator (828) is configured to compile the validated dimension set (822) into the standard dimension package (830) in a structured, machine-readable form. A standard dimension package (830) comprises the packaged set of validated project dimensions and clearances formatted for integration with other inputs and is configured to be transmitted to the input module (200) as a contribution to the project-dimension input (128) for subsequent reconciliation with other project inputs as described with respect to FIG. 1.

Figure 5:
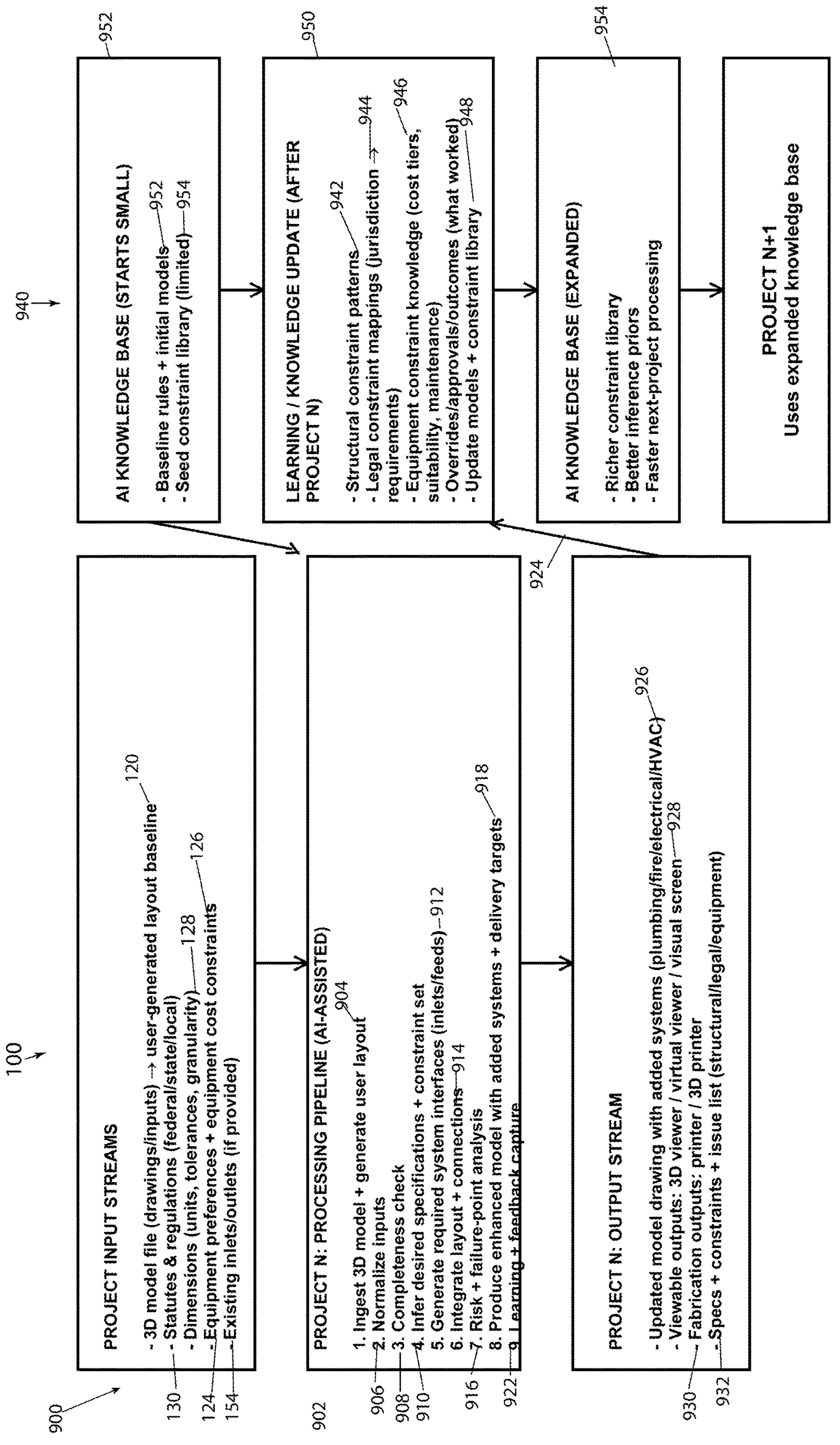
FIG. 5 summarizes the end-to-end project pipeline with outputs and learning updates.

FIG. 5 depicts an end-to-end operational model (900) in which a project instance proceeds through a simplified, day-in-the-life workflow comprising Inputs→Processing→Outputs, with continuous bidirectional interaction with an artificial intelligence assisted knowledge base that both supplies inference priors to project processing and is updated by project outcomes for subsequent reuse.

A typical project begins by ingesting one or more primary artifacts via model-file input (120) and/or drawing input (122), together with constraint and preference streams including equipment preference input (124), equipment cost input (126), project-dimension input (128) (e.g., tolerances, granularity, and available service envelopes), regulatory input (130), and supplemental project-data input (132). In parallel, the system receives contextual streams coordinated by a project stream aggregator (150), including a regionalized data stream reflecting jurisdiction-specific rule interpretations and parameter bundles, and an existing-context inlet/outlet stream (154) capturing existing-condition interface points, tie-ins, routing constraints, and legacy system locations that constrain integration of fire protection, plumbing, electrical, and/or HVAC systems.

The project then moves to Processing (AI-assisted project pipeline). A project pipeline controller (902) orchestrates AI-assisted synthesis by coordinating the input module (200), the processing module (300), and intermediate persistence to the project data store (500). In simplified form, the pipeline performs: model incorporation (904) to register geometry and spatial references; multi-stream normalization (906) using the normalization engine (210) to produce a canonical project state; dimension inference and reconciliation (908) consistent with validation by the validation engine (220); specification inference (910) to generate machine-actionable system requirements under the governing regulatory scope; required-systems synthesis (912) to select system types and component configurations consistent with equipment preferences and cost constraints; layout connection and integration (914) to compute routing, device placement, clearances, and tie-ins to existing inlet/outlet interfaces; and risk/weakness analysis (916) to annotate conflicts, vulnerabilities, constructability issues, and potential failure points. The processing culminates in generation of an enhanced model via the enhanced model generator to produce an enhanced project model (918) that augments the original geometry with the synthesized systems, connection metadata, performance targets, and risk annotations. Throughout processing, a learning-inference module (922) leverages the AI knowledge base (950) to accelerate inference and constraint resolution and captures decision provenance, user adjustments, and acceptance signals for downstream learning.

The output module (400) emits a project output stream (924) based on the enhanced project model (918). The project output stream (924) includes (i) updated drawings and/or model overlays generated by a model-and-drawing overlay engine (926), (ii) interactive rendering via a visualization interface (928) (e.g., 3D viewer and/or virtual viewer), and (iii) optional export to external visualization or fabrication devices via a fabrication/physical-output interface (930) (e.g., three-dimensional printer). The output stream may further include structured constraints produced by a specification constraint generator (932) as specification constraints, and an issue list produced by an issue and unknowns list generator as an issue list, thereby supporting iterative remediation, stakeholder review, and compliance closure.

In response to emitted outputs, review actions, and realized outcomes, a knowledge-update pipeline (940) extracts learning signals and transforms them into reusable updates, including structural constraint patterns learned by a structural constraint pattern learner (942), jurisdictional constraint mappings learned by a legal constraint mapping learner (944), and equipment and performance constraints learned by an equipment constraint learner (946), with an outcome and model updater (948) incorporating validated selections and approvals into predictive and decision models used by the processing module (300).

An AI knowledge base (950) supplies baseline priors (934) and known constraint libraries (936) to the project pipeline controller (902) and learning-inference module (922) during project processing, and is updated by the knowledge-update pipeline (940) after or during execution. The AI knowledge base (950) is initially populated by a baseline knowledge set (952) and is progressively enriched by an incremental knowledge update set (954), thereby improving future inference quality, constraint resolution, and convergence speed in subsequent project instances.

During the processing stage, the project pipeline controller (902) and learning-inference module (922) preferentially retrieve from the AI knowledge base (950) one or more of: learned constraint libraries, jurisdictional mappings, equipment suitability priors, cost tier heuristics, and historical resolution strategies, which are applied to specification inference (910), required-systems synthesis (912), layout connection and integration (914), and risk/weakness analysis (916).

Upon issuance of the project output stream (924) and downstream acceptance/approval signals, the knowledge-update pipeline (940) merges validated learning signals into the AI knowledge base (950) as incremental knowledge update set (954), thereby causing the output of a completed project to serve as an input refinement source for subsequent projects under similar structural, jurisdictional, and equipment contexts.

Figure 6:
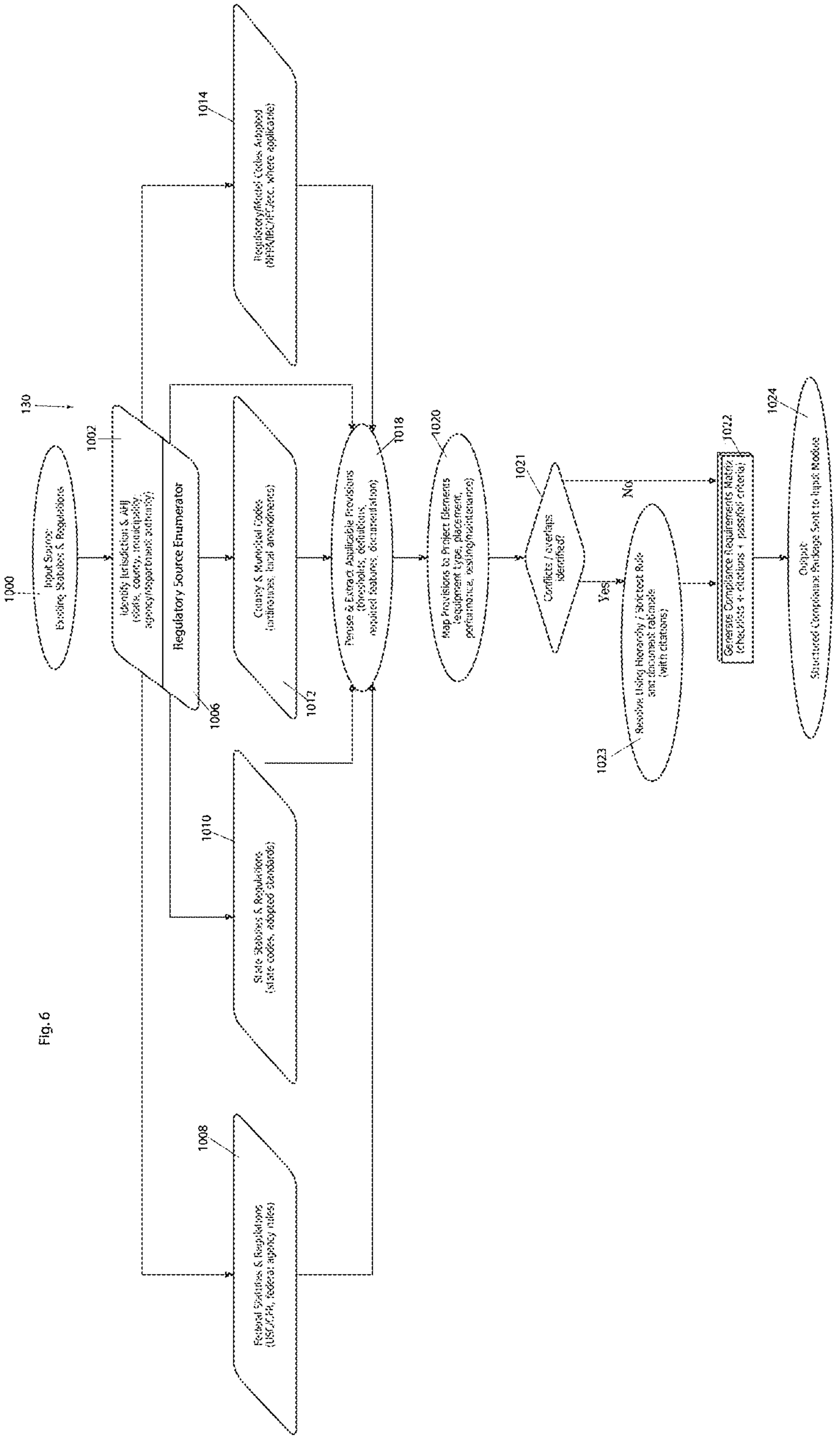
FIG. 6 shows jurisdiction identification and regulatory constraint compilation.

FIG. 6 depicts an embodiment of regulatory-ingestion and codification workflow (1000) that expands the regulatory input (130) by determining the controlling jurisdiction for a project, acquiring and organizing the applicable legal and technical code corpus, compiling the controlling provisions into machine-actionable constraints, and delivering those constraints to the input module (200) (and for use by the processing module (300)) to support project-parameter comparison, conflict detection, and compliance matrix generation.

A jurisdiction context identifier (1002) determines the controlling jurisdictional scope applicable to the project, including, as applicable, the governing state, county, municipality, agency, department, and authority having jurisdiction, based on project location metadata and user-provided selections via the user interface subsystem (110). The system records the basis for the selected jurisdiction in a justification record to preserve auditability, authority-chain provenance, and any ambiguity flags.

A regulatory source enumerator (1006) enumerates the classes of legal and code sources applicable to the resolved jurisdiction and defines acquisition endpoints and parsing strategies. The system then acquires the controlling corpus across multiple authority levels, including federal statutes and regulations via a federal corpus acquisition engine (1008), applicable state statutes, administrative regulations, and adopted technical codes via a state corpus acquisition engine (1010), and county/municipal ordinances, local amendments, and AHJ guidance via a local corpus acquisition engine (1012). In exemplary embodiments, the acquired technical corpus may include discipline-specific codes and standards such as fire, building, electrical, mechanical, plumbing, and other referenced standards (1014) (e.g., NFPA-derived requirements or adopted model codes) as reflected in the state and local acquisitions (1010, 1012).

The acquired materials are organized using a code-and-standard taxonomy (1014) that classifies provisions by applicability domains (e.g., discipline, occupancy, hazard, and system categories) so they can be bound to relevant project elements.

A regulatory precedence resolver (1018) resolves hierarchy across federal, state, and local sources, determines controlling provisions, and flags conflicts, exceptions, and conditional applicability predicates consistent with the resolved jurisdictional chain captured by (1002) and (1004).

A machine-actionable rule compiler (1020) transforms the normalized, precedence-resolved provisions into computable constraints and evaluation logic (e.g., thresholds, prohibitions, spacing/coverage rules, required features, documentation requirements, inspection cadence, and performance criteria). The compiled outputs are assembled into a regulatory constraint library (1022) with traceable links to originating citations, scope, effective dates, and applicability predicates, as part of machine learning element of the application. In operation, these compiled constraints are applied against project parameters maintained by the input module (200) to identify conflicts between project-defined characteristics and controlling provisions; where conflicts are detected 1021, the constraints and applicability predicates support generation of suggested resolution pathways and a compliance requirements matrix suitable for downstream synthesis and review 1023.

A regulatory output interface (1024) delivers the regulatory constraint library (1022) as at least a portion of the regulatory input (130) into the input module (200) for integration with other project inputs and makes the constraints available to the processing module (300) for automated compliance evaluation and design synthesis. The regulatory output interface (1024) may further persist the acquired corpus, normalized representations, and compiled constraints to the project data store (500) to support traceability, audits, and iterative project revisions.

Figure 7:
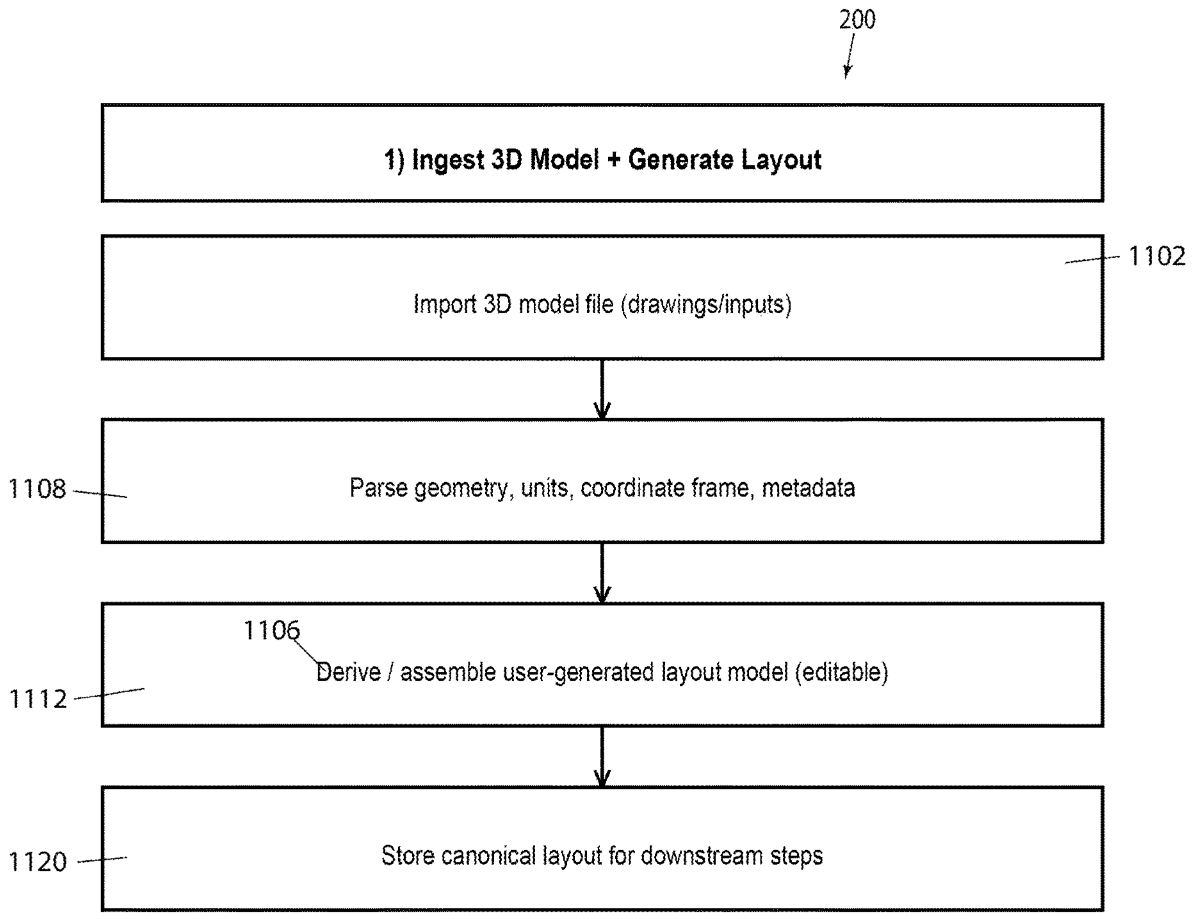
FIG. 7 illustrates AI parsing and canonical baseline layout selection or assembly.

FIG. 7 depicts a detailed artificial intelligence assisted workflow executed by the input module (200) in which a primary project artifact, such as a model-file input (120) or a drawing input (122), is imported, parsed into a normalized representation, assembled into a baseline (canonical) layout using user- and AI-derived signals, and persisted for downstream processing.

Import stage (1102) is configured to receive a three-dimensional project artifact comprising at least one of the model-file input (120) and the drawing input (122), including via an input stream and/or via an application function call or shared interface. Where the drawing input (122) is provided without an accompanying model-file input (120), the import stage (1102) may invoke a drawing-to-model conversion routine that generates a derived model artifact suitable for subsequent parsing as a model-file input (120).

Parse stage (1108) is configured to parse the received model artifact, whether native (120) or derived (1106), into machine-actionable components defining the modeled environment. In exemplary embodiments, the parse stage (1108) decomposes the artifact into measurement units, geometric primitives, coordinate frames, spatial references, metadata, and object-level identifiers, and may normalize spatial references to emit a spatial representation (1112) having consistent units, stable coordinate alignment, and canonical reference planes used as base.

Assemble stage (1120) is configured to preemptively assemble, select, or otherwise establish a baseline layout model using project-specific inputs and learned priors. The assemble stage (1120) may incorporate user data, user preferences, user specifications, and inferred derivations obtained from prior projects and repositories including the AI knowledge base (950) and the project data store (500), and may generate and rank candidate baseline layouts to produce a canonical layout object representing an initial layout intent bound to the normalized spatial representation (1112).

Figure 8:
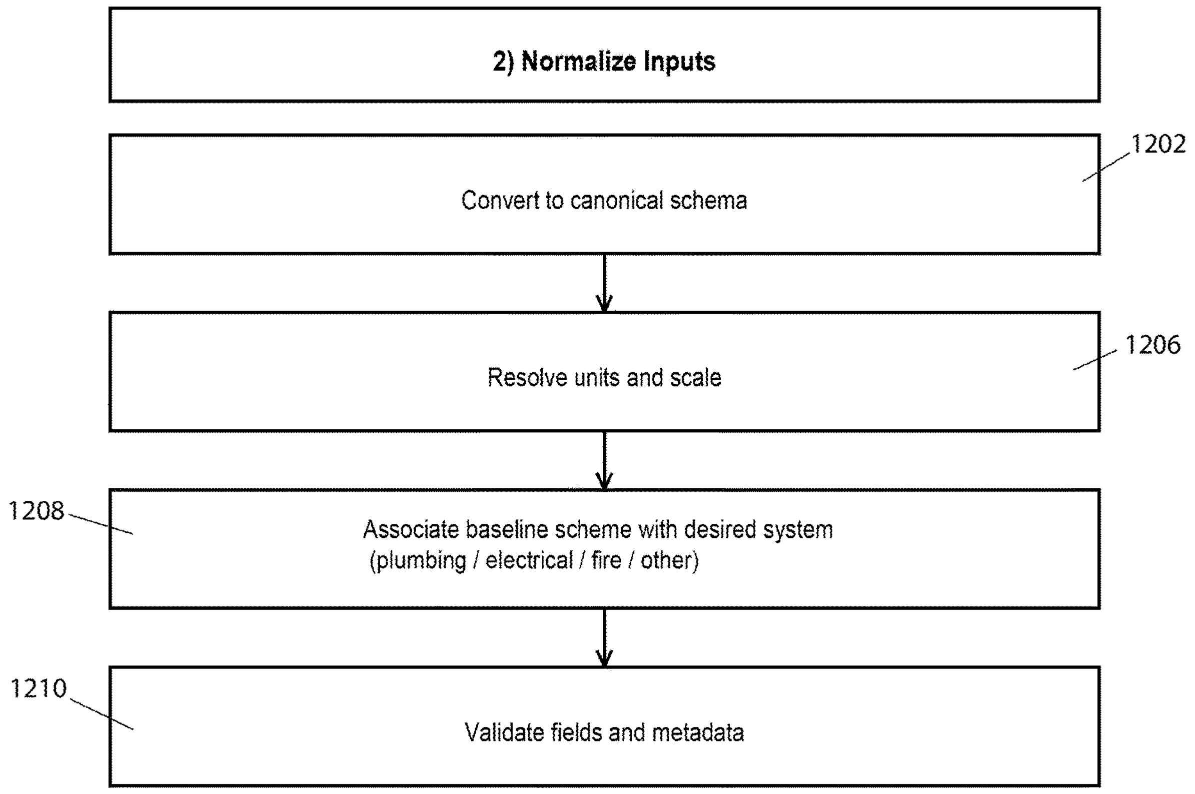
FIG. 8 outlines downstream normalization into system-ready data.

FIG. 8 depicts downstream processes executed within, or in coordination with, the input module (200) after formation of the canonical layout object (1120) described with respect to FIG. 7. In FIG. 8, canonical schemas and preliminary representations are transformed into computation-ready, system-specific data structures by resolving units and scales, validating sensibility and consistency, and parameterizing calculations according to the technical system domain being synthesized.

A canonical-to-instance translator (1202) is configured to convert one or more canonical schemas and templates embodied in the canonical layout object (1120) into instantiated data objects bound to the project's normalized spatial representation and extracted architectural features (1112). The canonical-to-instance translator (1202) replaces abstract placeholders and schema-level descriptors with project-specific values, element identifiers, and spatial bindings, thereby producing a layout dataset suitable for numerical evaluation and constraint checking. In some embodiments the layout dataset may comprise project-bound representations of layout entities, including preliminary device objects, routing primitives, connectivity intents, and attribute fields that are populated sufficiently to support unit conversion, scale validation, and system-specific computations.

A unit-and-scale reconciliation engine (1206) is configured to resolve measurement units, scale factors, and coordinate transformations applicable to for example, the layout dataset. The unit-and-scale reconciliation engine (1206) harmonizes mixed-unit inputs, validates drawing scales against model scales, resolves elevation and reference-plane inconsistencies, and produces a more reconciled dataset (1208) expressed in a canonical unit basis consistent with the system's internal computation requirements.

A reconciled dataset (1208) comprises instantiated layout objects whose dimensional fields, coordinate fields, and scale-dependent attributes have been converted into consistent units and aligned reference frames. In a reconciled dataset, the underlying baseline schema, such as the architectural representation of a structure, or pictorial representation of a space, is linked dynamically with a system specific dimensional fields, coordinate fields, and scale-dependent attributes pertaining to a specific desired system or combination of systems, with systems being electrical circuitry, plumbing system, fire retardant/sprinkler systems, cooling and heating systems and ductwork or piping, or a combination of such systems.

A sensibility and consistency validator (1210) is configured to evaluate the reconciled dataset (1208) for numerical plausibility and cross-field consistency, including detection of nonphysical values, out-of-range dimensions, incompatible clearances, contradictory coordinate transforms, and topology anomalies that would render downstream computations unreliable. The sensibility and consistency validator (1210) generates a normalization validation result (1212) and may annotate specific objects with error states, warning states, or confidence reductions.

Figure 9:
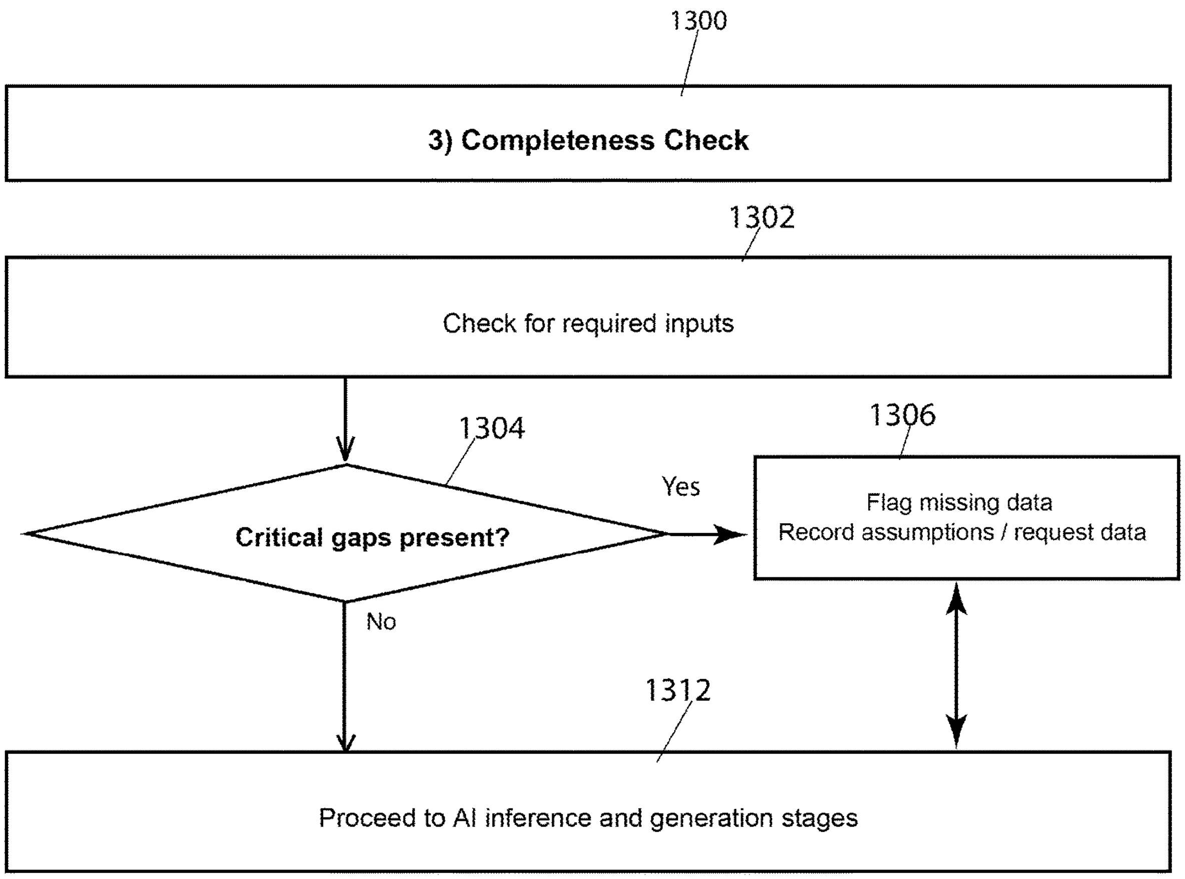
FIG. 9 shows completeness checking with inference backfill or input reversion.

FIG. 9 depicts one embodiment of the verification or completeness phase (1300) that may be executed within the AI-assisted input module of the input module (200) prior to, or in parallel with, downstream synthesis and layout finalization. As noted herein, the processes described with respect to FIG. 9 are exemplary; in alternate embodiments, additional processes may be included, fewer processes may be performed, and one or more processes may occur in different phases or sequences without departing from the disclosed operational model. Components introduced in FIG. 1 retain their reference numerals in FIG. 9, including the user interface subsystem (110), the input module (200), the data normalization engine (210), the data validation engine (220), the data structuring engine (230), the project data store (500), and the AI knowledge base (950).

A required-inputs determination engine (1302) is configured to determine which inputs are required for a given project instance and for a given intended synthesis objective, including whether one or more pairs of inputs are jointly required to proceed. In exemplary embodiments, the required-inputs determination engine (1302) evaluates whether both a geometric basis and a constraint basis are present at sufficient resolution, such as whether a model-file input (120) or derived model artifact (1106) is available in conjunction with project-dimension input (128) and regulatory input (130), and further determines whether system-specific prerequisite fields are required for the intended layout generation.

A completeness verifier (1304) is configured to evaluate the availability, coverage, and sufficiency of the inputs identified as required by the required-inputs determination engine (1302). The completeness verifier (1304) checks for missing artifacts, incomplete parameter fields, insufficient dimensional granularity, and missing contextual qualifiers that would prevent reliable inference, parameterization, or constraint checking.

A measurement-and-data sufficiency checker (1306) is configured to determine whether the computation-ready dataset (1220), and/or the underlying project representation, contains the measurement types and ancillary data necessary to proceed with layout determination for the relevant system domain. In exemplary embodiments, the measurement-and-data sufficiency checker (1306) verifies presence of dimensional measurements, clearances, elevation references, and other spatial qualifiers, as well as any domain-specific operational parameters. The sufficiency status may include one or more indicators describing whether required measurements and associated data are present at the required quality and granularity, including identification of missing fields, uncertainty thresholds exceeded, and the downstream computations affected. It is preferred that the application may contain a remediation controller, which may be another function of the sufficiency checker (1306) to attempt to obtain the missing data by executing one or more remediation pathways. For example, one in one remediation pathway, the missing-data remediation controller may obtain or infer the missing data dynamically and/or assisted by AI capabilities of the software, from a knowledge-based backfill engine (1312). In a second pathway, the missing-data remediation controller (1310) triggers an input reversion routine (820) that inquires the missing data from the an acquisition stage via the user interface subsystem (110) to obtain the missing information from a user or external source. The missing-data remediation controller (1310) may select utilize AI directed calculation to select between pathways based on confidence thresholds, criticality of the missing field, and governance rules requiring user confirmation for inferred values.

A knowledge-based backfill engine (1312) is configured to infer, estimate, or retrieve missing data elements using one or more local repositories, including the project data store (500) and the AI knowledge base (950). The knowledge-based backfill engine (1312) may utilize prior project patterns, learned priors, equipment catalog defaults, jurisdictional templates, and statistically plausible ranges to generate candidate values, and associates generated values with provenance and confidence metadata so that downstream modules can treat such values as provisional where appropriate.

An input reversion routine (820) may be configured to initiate re-acquisition of missing inputs by returning the workflow to an input-collection phase, including prompting via the user interface subsystem (110) for targeted measurements, clarifications, or artifact submissions. The input reversion routine (820) may specify required formats and minimum precision for requested data, and may further identify why the missing data is necessary in terms of the affected downstream computations, thereby enabling efficient completion and reducing iteration cycles.

Figure 10:
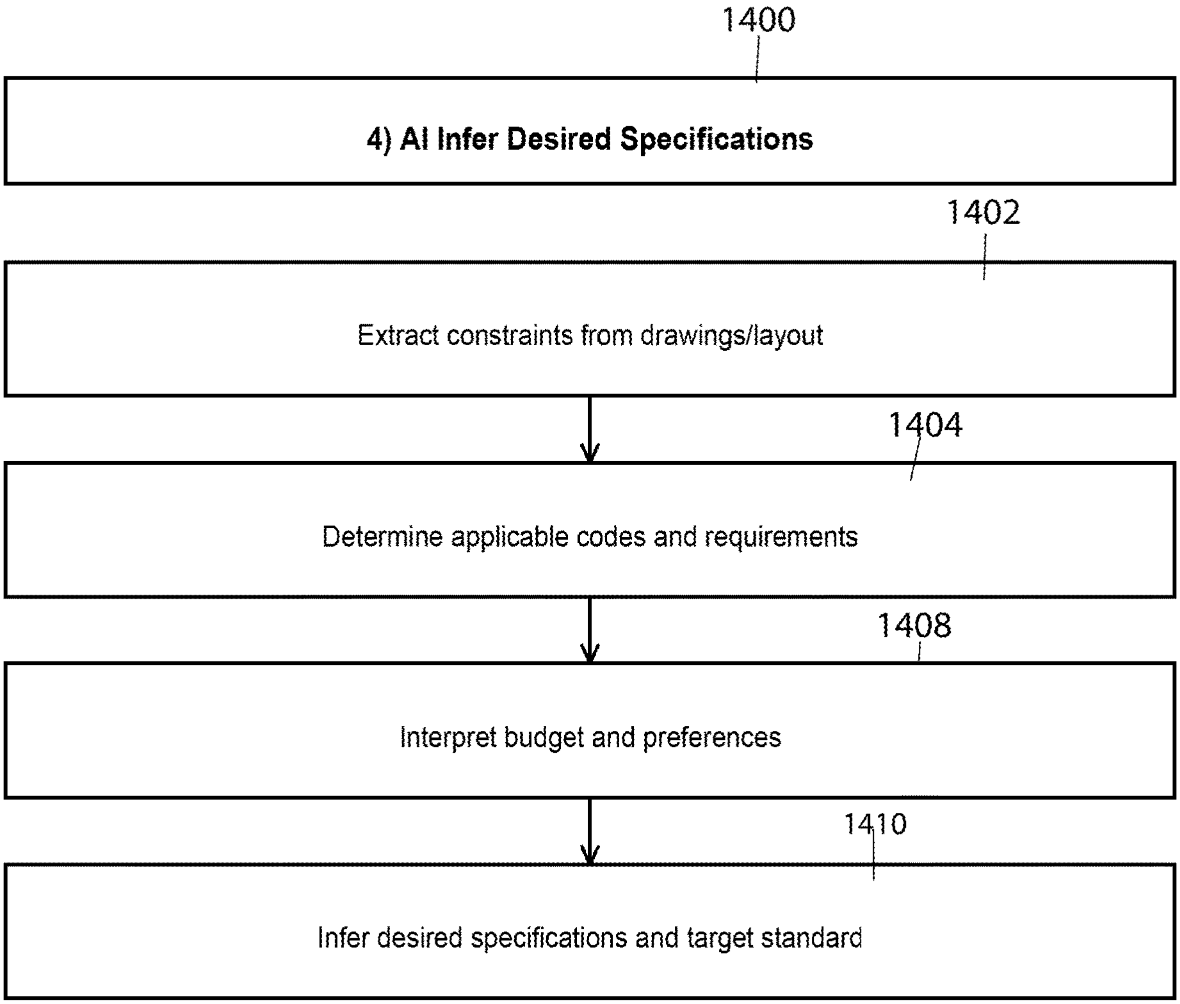
FIG. 10 illustrates specification inference from constraints, codes, budgets, and standards.

FIG. 10 depicts an embodiment an inference phase (1400) executed within the AI-assisted input module (200) to infer project-specific design specifications from the available project artifacts and constraint streams. In the illustrated embodiment, the phase (1400) extracts constraints from drawings, layouts, and preference inputs; determines which codes and requirements are applicable to the project based on legal jurisdiction, use of space or structure or projected use of the same, and risk; reconciles the resulting obligations with budget and preference constraints; and composes a standards-conformant specification set for downstream synthesis.

A constraint extraction engine (1402) is configured to extract and formalize constraints from one or more project artifacts and inputs, including the model-file input (120), drawing input (122), canonical layout object (1124), equipment preference input (124), and project-dimension input (128). The constraint extraction engine (1402) identifies geometric constraints, placement prohibitions, routing limitations, access and clearance requirements, and other implied design boundaries embedded in drawings and layouts and converts such boundaries into machine-actionable constraint objects associated with element identifiers and spatial scopes.

A code applicability determination engine (1404) is configured to determine the applicable set of legal and code requirements governing the project. The code applicability determination engine (1404) selects controlling provisions from the regulatory input (130) and may further condition applicability based on project use classifications, occupancy categories, hazard indicators, risk posture, system type, and authority having jurisdiction interpretations as reflected in jurisdictional metadata. The code applicability determination engine (1404) is configured to compile an applicable requirements applicable requirements may comprise a structured collection of controlling code and legal obligations, including thresholds, mandatory systems, performance criteria, documentation duties, and inspection-related requirements, each linked to jurisdictional scope, effective versioning, and triggering conditions.

A budget-and-preference reconciliation engine (1408) may be embodied and may be configured to reconcile the extracted constraints and the applicable requirements set (1404) with cost and preference constraints, including equipment cost input (126) and equipment preference input (124). The budget-and-preference reconciliation engine (1408) evaluates whether alternative compliance pathways exist, identifies permissible substitutions and tradeoffs consistent with the applicable requirements set, and produces reconciled specification parameters (1410) that serve as information to be inferred by the ai based input module (200) and a later date.

Reconciled specification parameters (1410) comprise a set of project-specific specification variables reflecting a compliance-feasible design target conditioned by budget constraints, equipment preferences, operational constraints, and any permissible alternative compliance options identified during reconciliation.

The standards for an ongoing project can then be composed by combining the reconciled specification parameters (1410) with relevant technical specifications and standards to generate a standards-conformant specification set for later inference from exemplary embodiments, the standards.

Figure 11:
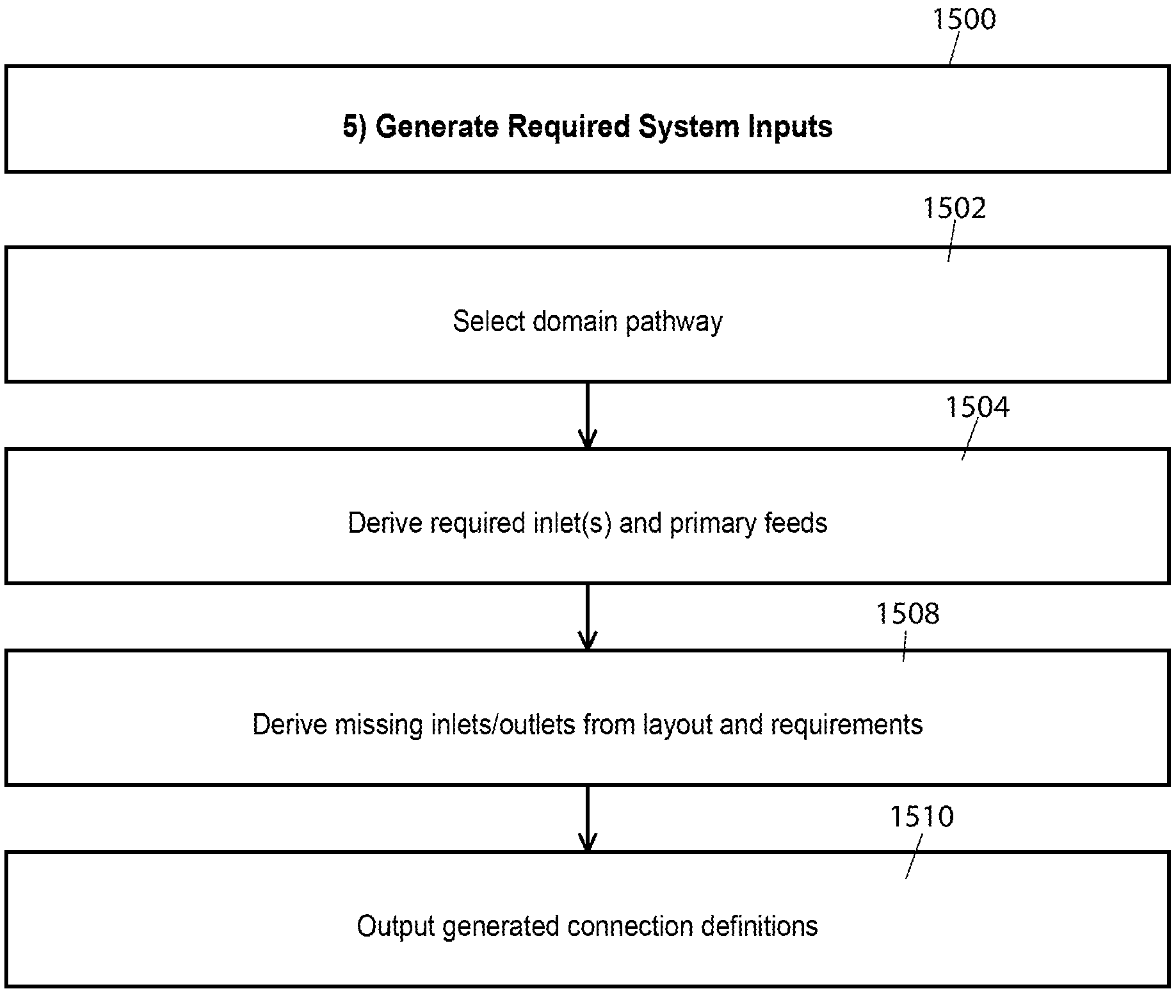
FIG. 11 shows domain selection and inlet/outlet connection definition generation.
Figure 12:
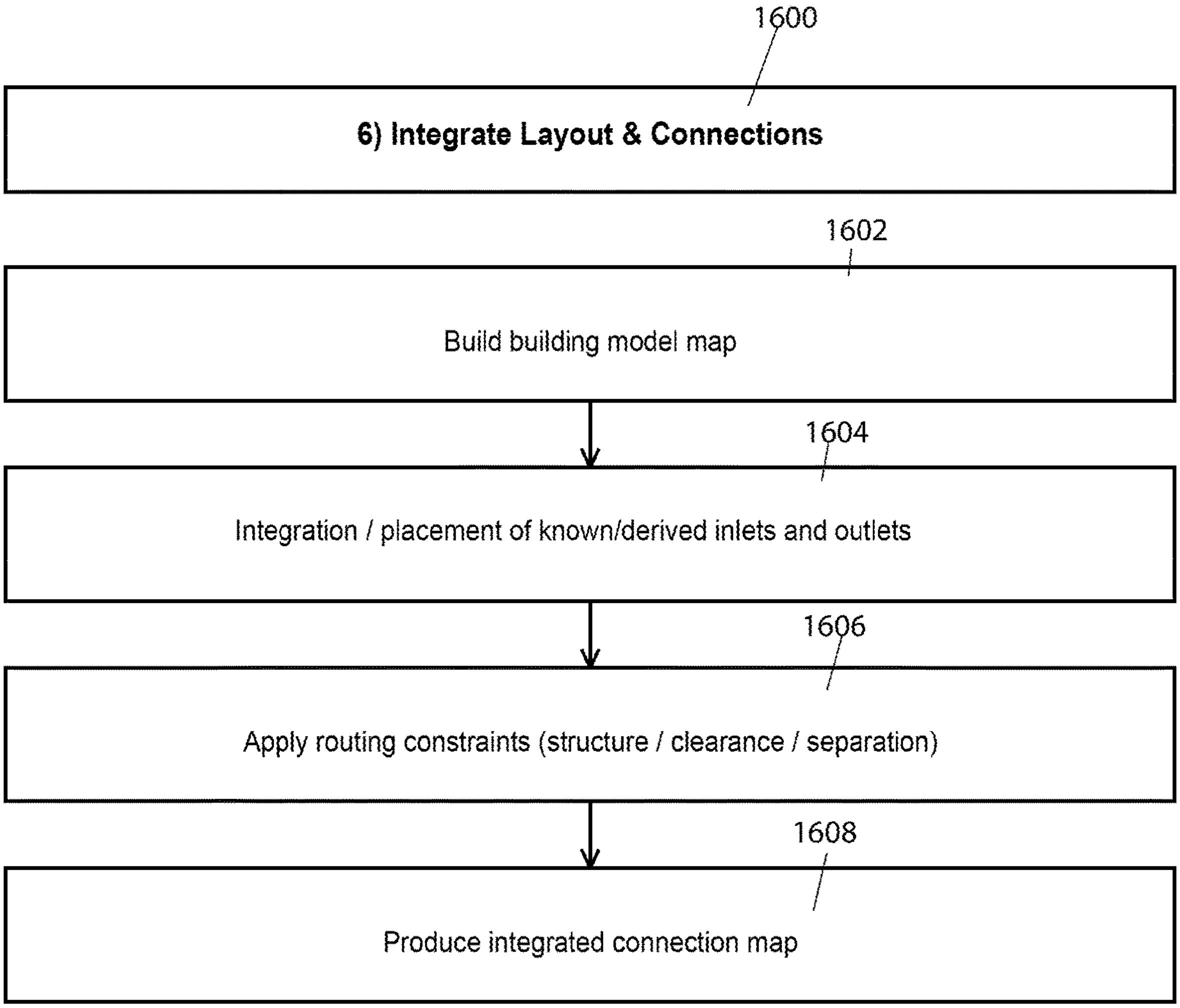
FIG. 12 illustrates model-map building and final connection map generation.
Figure 13:
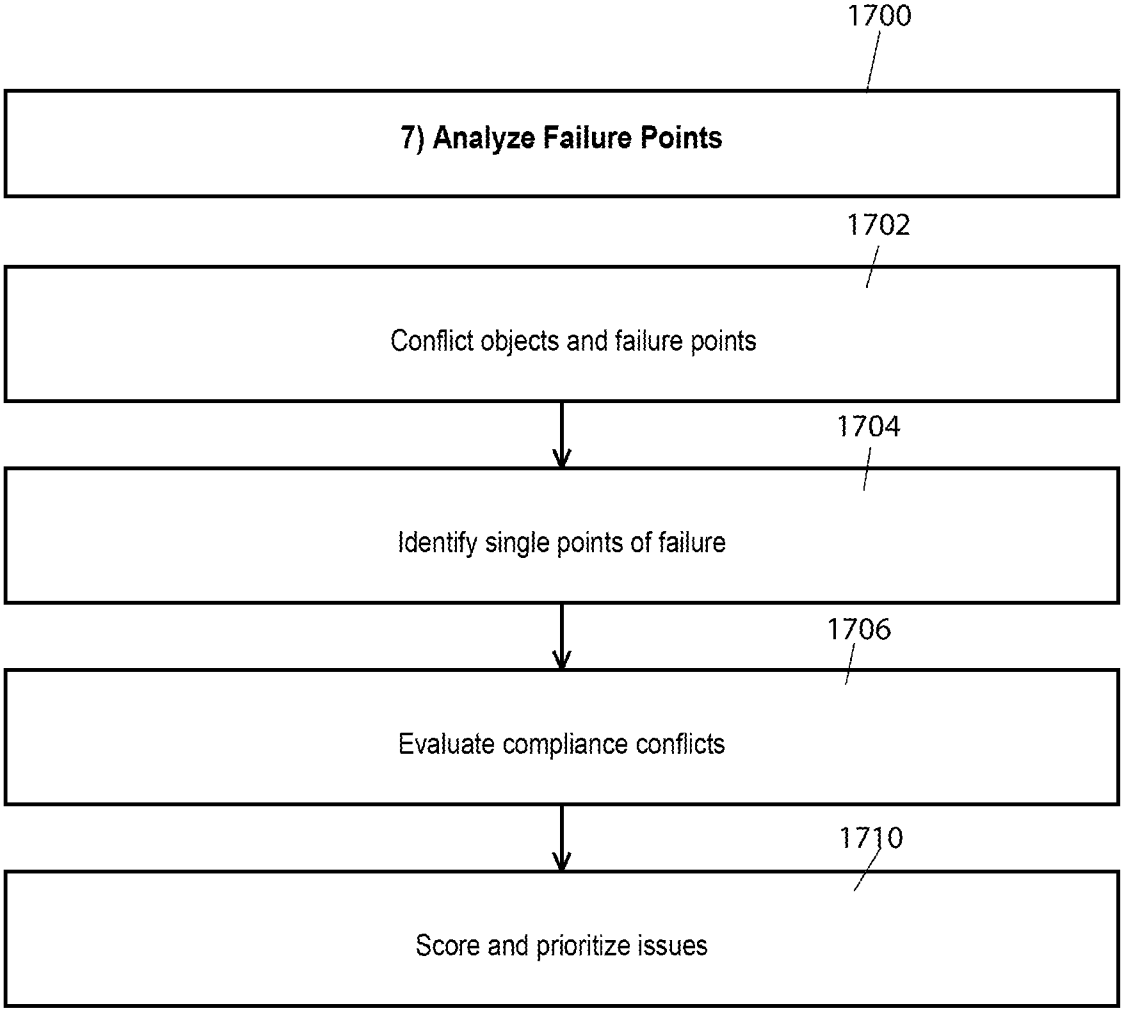
FIG. 13 shows clash/compliance self-check and issue list generation.

The processes depicted in FIGS. 11-13 may be executed sequentially or iteratively, and may be implemented as internal stages spanning the input module (200) and processing module (300) to transition from collected constraints and preferences into a build-ready project representation and a preliminary integrity/compliance assessment.

FIG. 11 depicts a system-input preparation stage (1500) in which the system selects an applicable technical domain pathway, derives feeds and inlets/outlets, resolves missing connection points from layouts and requirements, and outputs a connection-definition dataset for downstream build operations.

A domain pathway selector (1502) is configured to select at least one system domain pathway corresponding to an environment or technical system to be synthesized, including, by way of example, fire protection, life-safety signaling, electrical, plumbing, mechanical, or combinations thereof, and to bind the selected pathway to the applicable requirements set (1406) and reconciled specification parameters (1410).

An inlet/outlet derivation engine (1504) is configured to derive feeds, inlets, outlets, and interface points for the selected domain pathway based on available user input, existing-context inlet/outlet stream (154), and governing standards when user input is absent or underspecified. The inlet/outlet derivation engine (1504) generates a preliminary interface set that is configured to identify candidate tie-ins, supply/return points, terminations, and other connection primitives. A preliminary interface set may further be configured to comprise structured interface objects representing derived or specified connection points, including spatial bindings, capacity attributes, and provenance metadata indicating whether the interface originated from user input, standards defaults, or inferred existing conditions.

A missing-interface resolver (1508) is configured to derive missing inlets/outlets and associated connection attributes from layouts and requirements where the preliminary interface set (1504) is incomplete. The missing-interface resolver (1508) may infer connection points from the canonical layout object (1120), extracted architectural features (1110), and/or the standards-conformant specification set (1410), and may annotate inferred interfaces with confidence scores and dependency flags.

A connection definition output (1510) comprises a structured dataset of connection definitions including interface objects, required capacities, compatibility constraints, and connectivity intents, and is transmitted to downstream build stages as an input to model-map construction.

FIG. 12 depicts a model-map build stage (1600) that constructs a project-specific model map from the collected inputs and derived connection definitions, provides completion integration for remaining missing data or user supplementation, and generates a finalized connection map suitable for downstream synthesis and output.

A model-map builder (1602) is configured to construct a model map representing system topology and connection pathways using at least the normalized spatial representation (1110), the computation-ready dataset (1208), and the connection definition output (1510). The model-map builder (1602) generates graph structures and/or routed network primitives that bind interface points to spatially feasible pathways.

A completion integration controller (1604) is configured to integrate remaining missing data elements required for stable model-map construction, including incorporation of inferred values from the knowledge-based backfill engine (1312) and/or solicitation of targeted user inputs via the user interface subsystem (110) where inference confidence falls below a threshold. The completion integration controller (1604) is configured to map out system infrastructure features, such as inlets, outlets, valves, breakers, interchanges, control centers, etc. The completion integration controller (1604) updates the model map to reflect newly integrated data and records provenance and versioning to the project data store (500).

A constraint binding engine (1606) is configured to bind compiled constraints, including the regulatory constraint library (1022), the reconciled specification parameters (1410), and dimensional constraints derived from the standard dimension package (830), onto the model map constructed by the model-map builder (1602), thereby producing constraint-aware topology and restricting infeasible routes, prohibited connections, and disallowed placements.

A finalized connection map (1608) comprises a constraint-aware representation of the project's system connectivity, including interface points, routed pathways, capacities, and dependency metadata sufficient to support downstream layout synthesis, documentation generation, and compliance evaluation.

FIG. 13 depicts a preliminary self-check stage (1700) that performs rudimentary integrity screening over the finalized connection map to identify failure points, compliance conflicts, and unresolved issues before downstream output finalization.

A clash-and-capacity checker (1702) is configured to perform geometric clash screening and capacity sufficiency screening on the finalized connection map (1608), including detection of spatial interferences with architectural features, violations of clearance envelopes, and capacity mismatches at interfaces, branches, and terminations. The clash-and-capacity checker (1702) generates one or more detected conflict objects (1704) associated with spatial coordinates and contributing elements.

Detected conflict objects (1704) comprise structured representations of clashes, overload risks, bottlenecks, and other failure-point indicators identified by the clash-and-capacity checker (1702), including severity metadata and affected dependencies.

A compliance conflict evaluator (1706) is configured to evaluate the finalized connection map (1608) against applicable requirements set (1406) and the regulatory constraint library (1022) to detect preliminary compliance conflicts, including prohibited configurations, missing mandated elements, and threshold violations. The compliance conflict evaluator (1706) may produce a compliance conflict record linked to governing citations and applicability predicates. Compliance conflict records (1708) may comprise structured indicators of potential noncompliance conditions, including citation references, triggering facts, and recommended remediation categories.

An issue itemization engine (1710) is configured to aggregate detected conflict objects and compliance conflict records into an issue suitable for iterative remediation, downstream optimization, and output reporting. The issue itemization engine (1710) may classify issues by type, severity, and resolvability, and may generate traceable links to the affected map segments and upstream input dependencies. An issue list may be comprised of a structured collection of identified clashes, capacity risks, compliance conflicts, and unresolved dependencies generated during the self-check stage (1700) and is used to drive corrective iterations prior to final output generation by the output module (400) as described with respect to FIG. 5.

Figure 14:
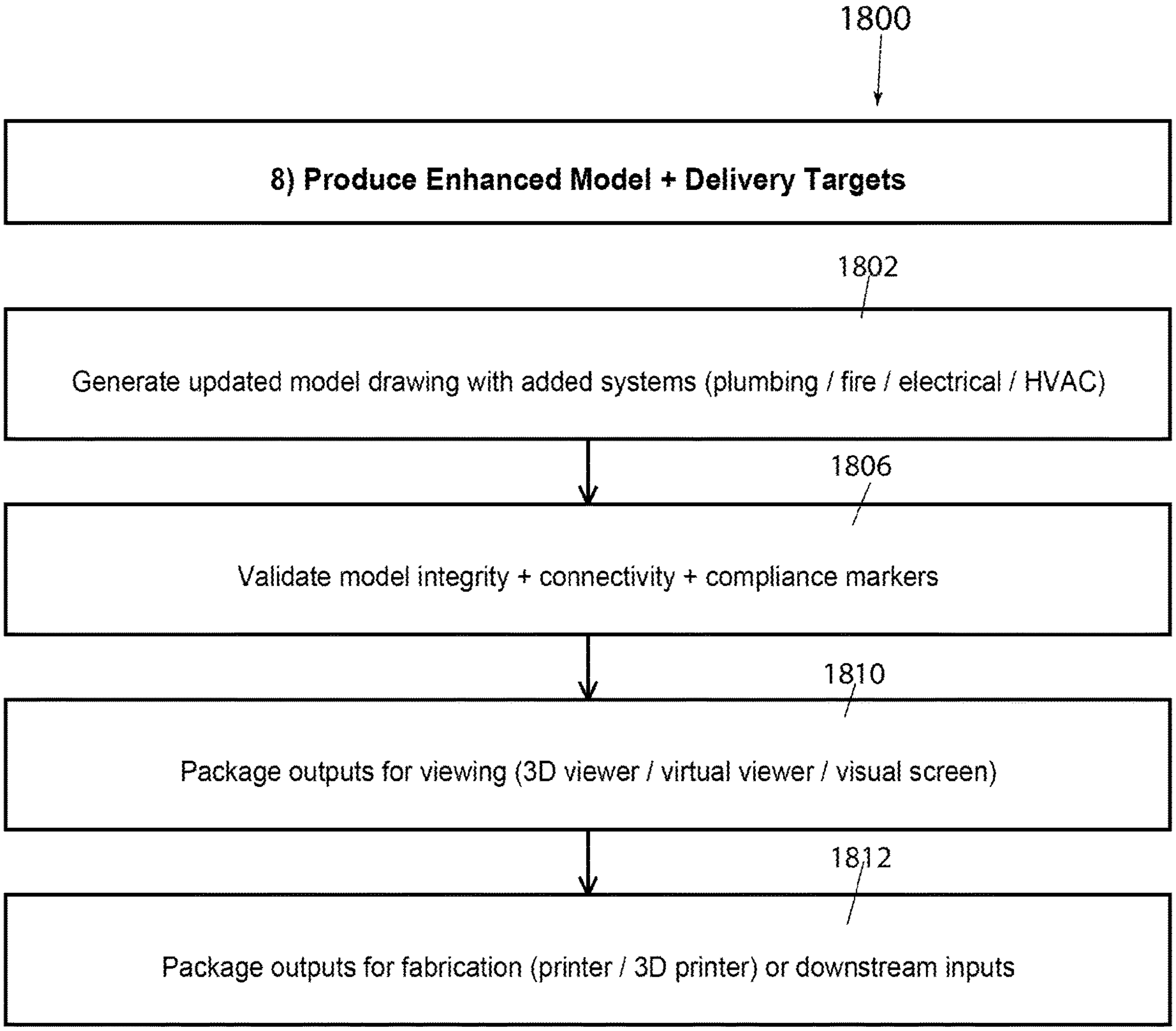
FIG. 14 illustrates integrated overlay output, final checks, review, and export.

FIG. 14 depicts a finalization and delivery stage (1800) in which the system generates an updated project model and/or drawing set with additional synthesized systems, performs a final integrity screening over connectivity and compliance, provides an interactive user review checkpoint, and exports the accepted deliverable in a user-directed medium. Components introduced in FIG. 1 retain their reference numerals in FIG. 14, including the user interface subsystem (110), the processing module (300), the output module (400), and the project data store (500).

An integrated overlay generator (1802) is configured to generate an updated model or drawing set by overlaying, embedding, or otherwise integrating one or more synthesized technical systems into the project's baseline artifacts. In exemplary embodiments, the integrated overlay generator (1802) incorporates system elements for plumbing, fire protection and life-safety, electrical, HVAC, or combinations thereof, and is configured to produce a deliverable model that preserves spatial registration, element identifiers, and provenance links to underlying constraints and selections. The integrated deliverable model may further comprises a project artifact representing the baseline geometry augmented with the generated system topology, placements, routings, and associated annotations, and may be embodied as a three-dimensional model, a two-dimensional drawing overlay, or a coupled 2D/3D deliverable package.

A final integrity and connectivity checker (1806) is configured to perform an integrity screening on the integrated deliverable model (1804) including verification of connectivity continuity, inlet/outlet consistency, capacity plausibility, and preliminary compliance conformance against the applicable requirements set (1404) and associated constraint libraries. The final integrity and connectivity checker (1806) produces a final validation report (1808) comprising pass/fail indicators and any residual exception items suitable for presentation and remediation.

A final validation reporter and viewer (1808) comprises machine-readable and/or human-readable results of the integrity screening, including identified discontinuities, unresolved compliance conflicts, incomplete interface definitions, and any conditions requiring user decision, waiver, or iterative correction.

A user review reporter and viewer (1808) is configured to present the integrated deliverable model (1804) and the final validation report to a user for review via the user interface subsystem (110), and to enable user-directed execution of one or more verification actions including re-running the final integrity and connectivity checker (1806), inspecting flagged issues, and accepting or rejecting the current deliverable state. The user review and control interface (1810) may further support iterative adjustments that route the workflow back to prior stages for remediation where acceptance criteria are not satisfied.

A directed export and rendering engine (1812) is configured, responsive to user acceptance, to output the integrated deliverable model (1804) into one or more user-directed media and formats. In exemplary embodiments, the directed export and rendering engine (1812) produces deliverables including interactive viewer outputs, on-screen renderings, three-dimensional output files, two-dimensional output files, and print-ready drawing packages suitable for physical printing on paper, and stores exported artifacts and associated metadata within the project data store (500) for traceability and subsequent revision control.

Figure 15:
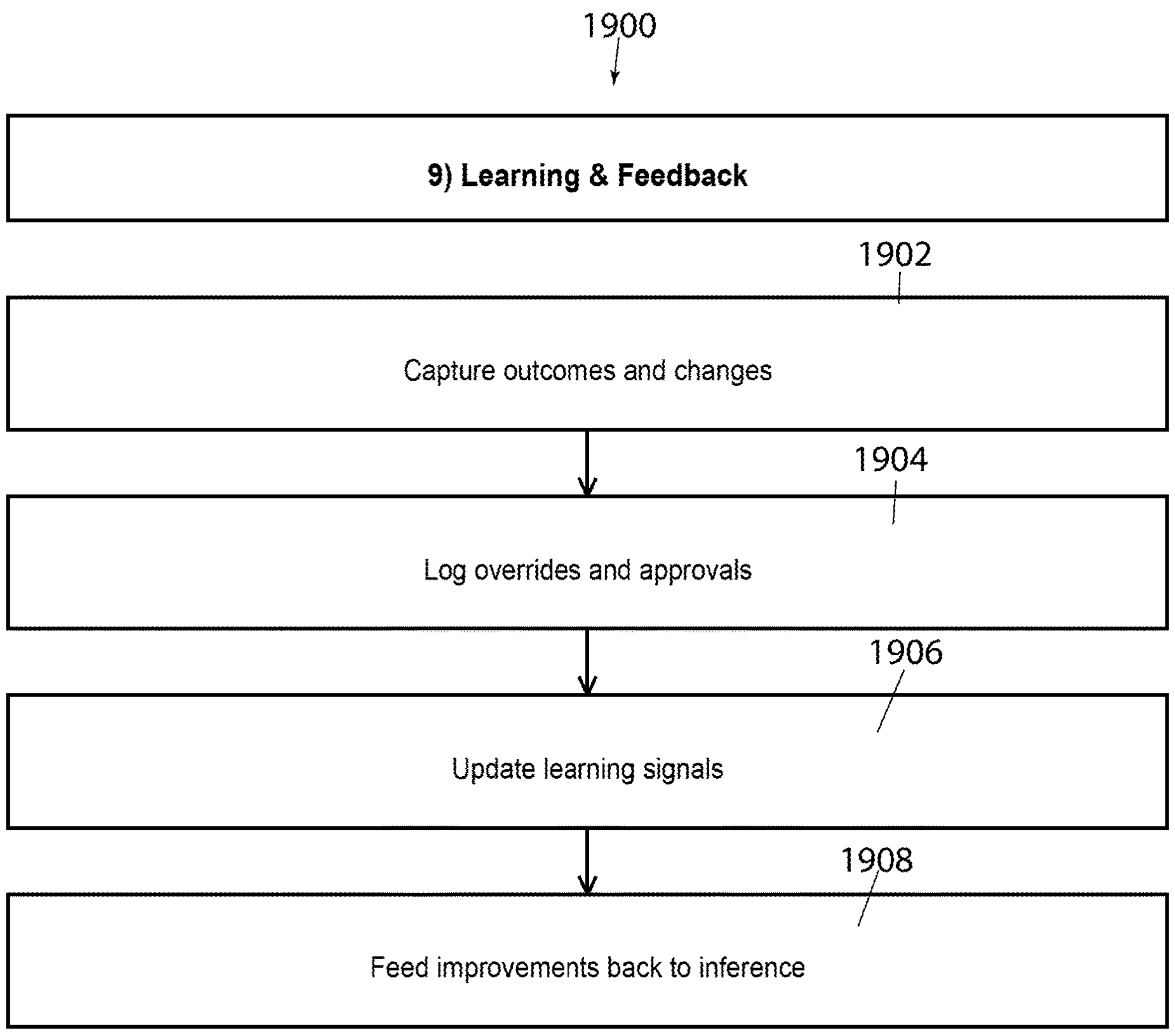
FIG. 15 shows post-project learning and knowledge-base updating.

FIG. 15 depicts a learning and model-improvement stage (1900) performed by the AI-assisted input module of the input module (200) after, or concurrently with, generation of project deliverables. In this stage (1900), project-specific information is integrated into persistent knowledge resources so that subsequent projects benefit from improved parsing, better constraint resolution, and accelerated convergence.

An outcome and change capture engine (1902) is configured to capture project outcomes and deltas arising during the project lifecycle, including accepted deliverables, rejected alternatives, user edits, iteration counts, and any final parameter values associated with the integrated deliverable model (1804). The outcome and change capture engine (1902) further records associations between observed outcomes and the upstream inputs and constraints that generated them, thereby producing traceable learning records suitable for supervised and/or reinforcement-style updates.

An override and approval ledger (1904) is configured to log governance-relevant actions including user overrides, authority approvals, waivers, exception handling, and any decision points where the system's recommended configuration was modified or conditionally accepted. The override and approval ledger (1904) stores the rationale context, identity or role metadata where available, timestamps, and affected constraint references, thereby enabling subsequent calibration of inference behavior while preserving auditability.

A learning-signal update engine (1906) is configured to transform captured outcomes, deltas, and governance events into learning signals, including labeled examples, preference rankings, penalty signals for rejected configurations, and reward signals for accepted configurations. The learning-signal update engine (1906) may compute feature attributions linking signals to project context, jurisdictional conditions, equipment classes, and geometric patterns, and may normalize signals to reduce bias from outlier projects or nonrepresentative approvals.

An inference improvement and knowledge integration engine (1908) is configured to apply the learning signals to update one or more models and knowledge artifacts used by the AI-assisted input module, and to integrate derived knowledge into persistent repositories. In exemplary embodiments, the inference improvement and knowledge integration engine (1908) updates parsing priors for architectural feature extraction, adjusts selection rationale parameters used for baseline layout assembly and equipment choice, refines jurisdiction-specific constraint mappings, and enriches libraries of validated patterns and defaults, with the updated artifacts being persisted to the project data store (500) and merged into the AI knowledge base (950) subject to quality controls and provenance tracking.

Figure 16:
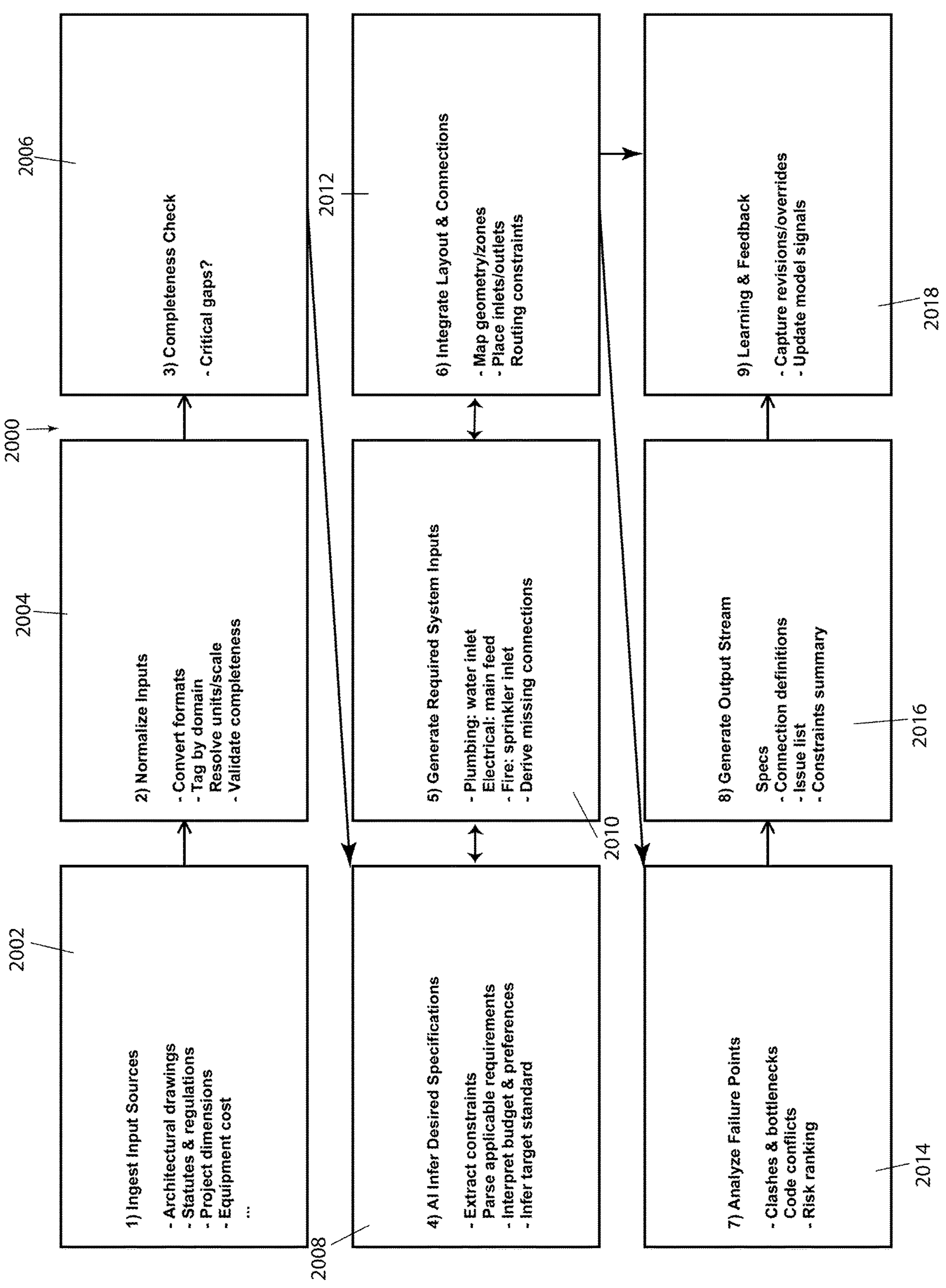
FIG. 16 illustrates a consolidated flowchart with verification/correction loops and outputs.

In operation, FIG. 16 illustrates that the system proceeds from input ingestion (2002) through normalization (2004), completeness verification (2006), and specification sensibility evaluation (2008), then generates required system inputs (2010), integrates layout connections (2012), and analyzes failure points (2014), producing finalized outputs (2016) and recording feedback for continuous improvement (2018), with steps (2) through (7) configured to support iterative verification and correction prior to final output generation.

FIG. 16 depicts a consolidated flowchart (2000) summarizing the end-to-end operational sequence corresponding to steps (1) through (9) of the disclosed system, with intermediate stages configured for bidirectional verification and correction. In the illustrated embodiment, step (1) represents initial input ingestion, step (8) represents generation of final deliverables, and steps (2) through (7) are configured as two-way stages that permit iterative verification, error correction, and re-processing prior to proceeding downstream. Components introduced in FIG. 1 retain their reference numerals in FIG. 16, including the user interface subsystem (110), the input module (200), the processing module (300), and the output module (400).

Step (1) comprises an input ingestion stage (2002) in which project inputs are acquired, including the model-file input (120), drawing input (122), equipment preference input (124), equipment cost input (126), project-dimension input (128), regulatory input (130), and supplemental project-data input (132), and are admitted into the input module (200) as an initial project state.

Step (2) comprises an input normalization stage (2004) in which the data normalization engine (210) converts heterogeneous artifacts and parameters into a canonical internal representation, including unit harmonization, coordinate-frame alignment, schema mapping, and semantic normalization sufficient to support uniform downstream computation.

Step (3) comprises a completeness and verification stage (2006) that performs internal and external verification of input sufficiency, including a completeness check for required artifacts and parameters and a verification of measurement availability and data quality for the intended synthesis objective, with the stage being configured to route the workflow back to step (1) and/or step (2) when missing information, ambiguity, or invalidity is detected.

Step (4) comprises a specification sensibility stage (2008) in which inferred and/or provided specifications are evaluated for engineering plausibility and internal consistency, including reconciliation of extracted constraints with applicable requirements and project context, and with the stage being configured to return to earlier stages for correction when a specification set is incoherent, infeasible, or underdetermined.

Step (5) comprises a required-system input generation stage (2010) in which the system derives the system-domain inputs and interface definitions necessary to construct a build-ready representation, including derivation of feeds, inlets/outlets, and connection definitions consistent with the governing specifications and constraints, with the stage being configured to iteratively request or infer missing interface data when needed.

Step (6) comprises an integration and layout-connection stage (2012) in which the processing module (300) synthesizes and integrates system topology with the project geometry, generating layout connections, route candidates, placement candidates, and constraint-aware connectivity representations, with bidirectional correction enabled to resolve clashes, missing dependencies, or constraint conflicts discovered during integration.

Step (7) comprises a failure-point and weakness analysis stage (2014) in which the system performs a preliminary integrity assessment, including clash screening, capacity plausibility checks, and compliance-conflict detection, and itemizes detected issues, with the stage being configured to return to one or more of steps (2) through (6) for remediation and re-evaluation until acceptance criteria are satisfied.

Step (8) comprises an output stream generation stage (2016) in which the output module (400) produces deliverables including updated models and/or drawings with integrated systems, associated reports and constraints, and export packages in user-directed formats, such that the deliverables may be rendered in a viewer, saved as 2D/3D output files, or prepared for printing and issuance.

Step (9) comprises a feedback and learning-record stage (2018) in which project outcomes, user adjustments, overrides, approvals, and other governance events are recorded as learning signals and persisted to the project data store (500) and/or the AI knowledge base (950) to improve subsequent parsing, selection, and inference behavior.

Figure 17:
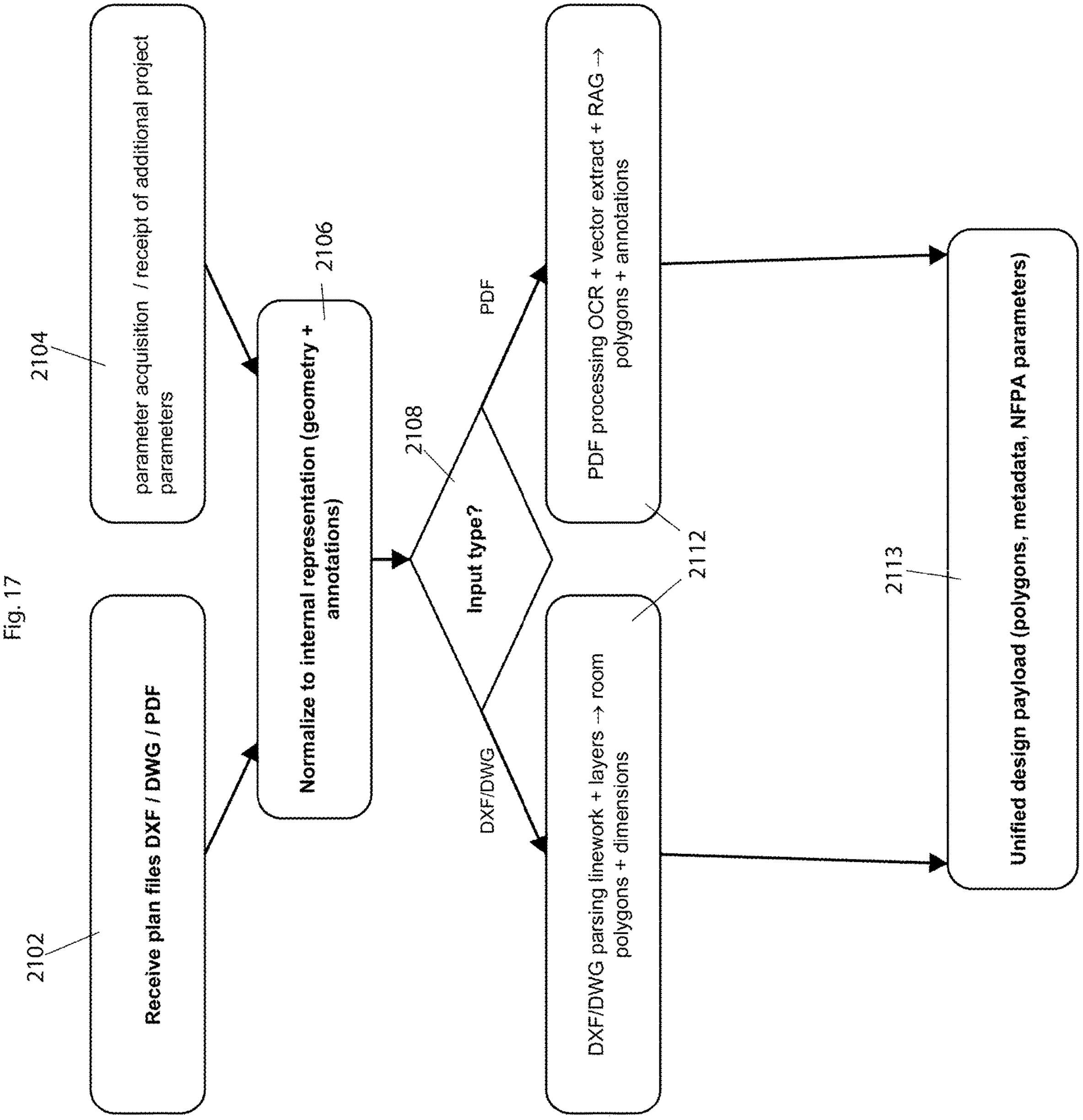
FIG. 17 shows an intake-to-output method for parsing, placing, validating, and exporting.
Figure 18:
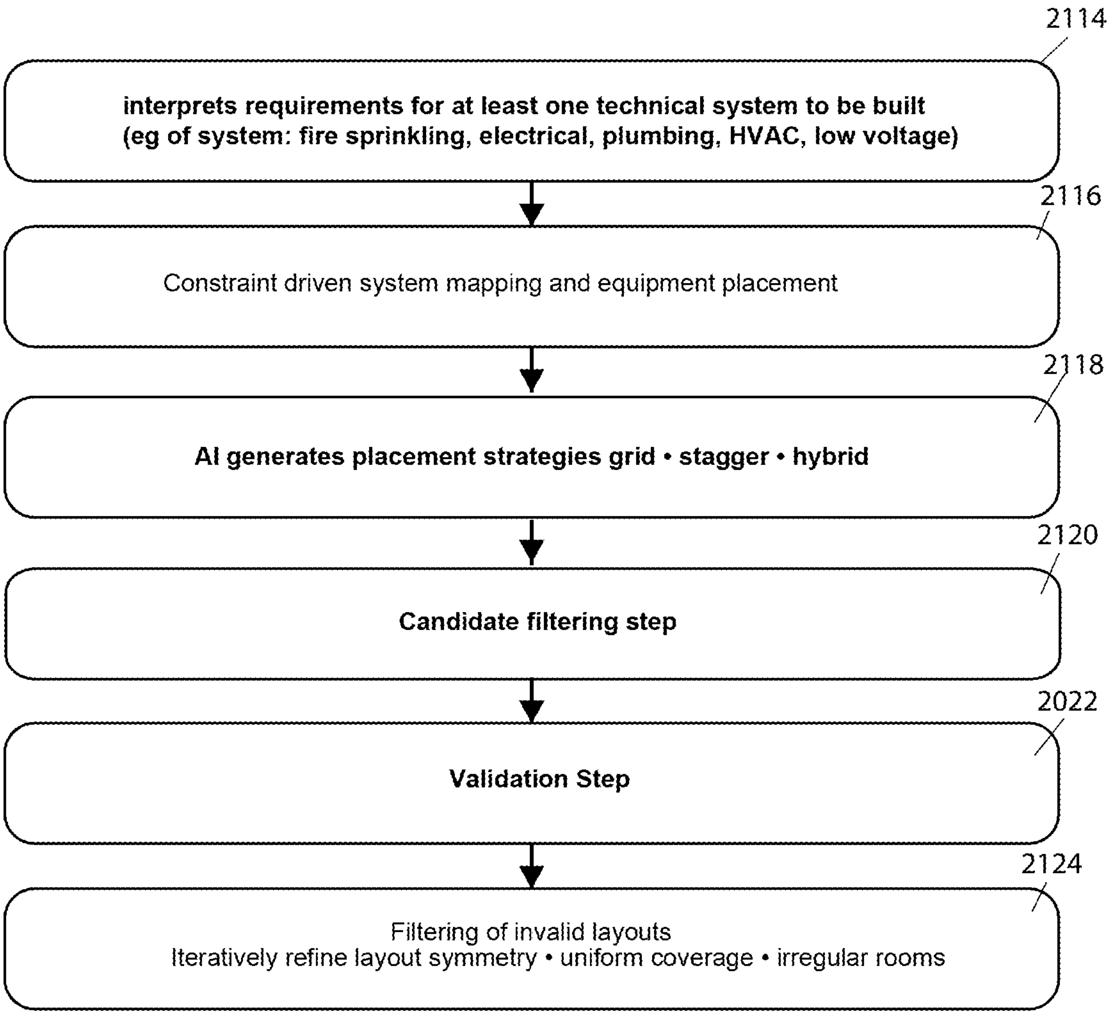
FIG. 18 illustrates constraint-driven layout generation from a uniform model.
Figure 19:
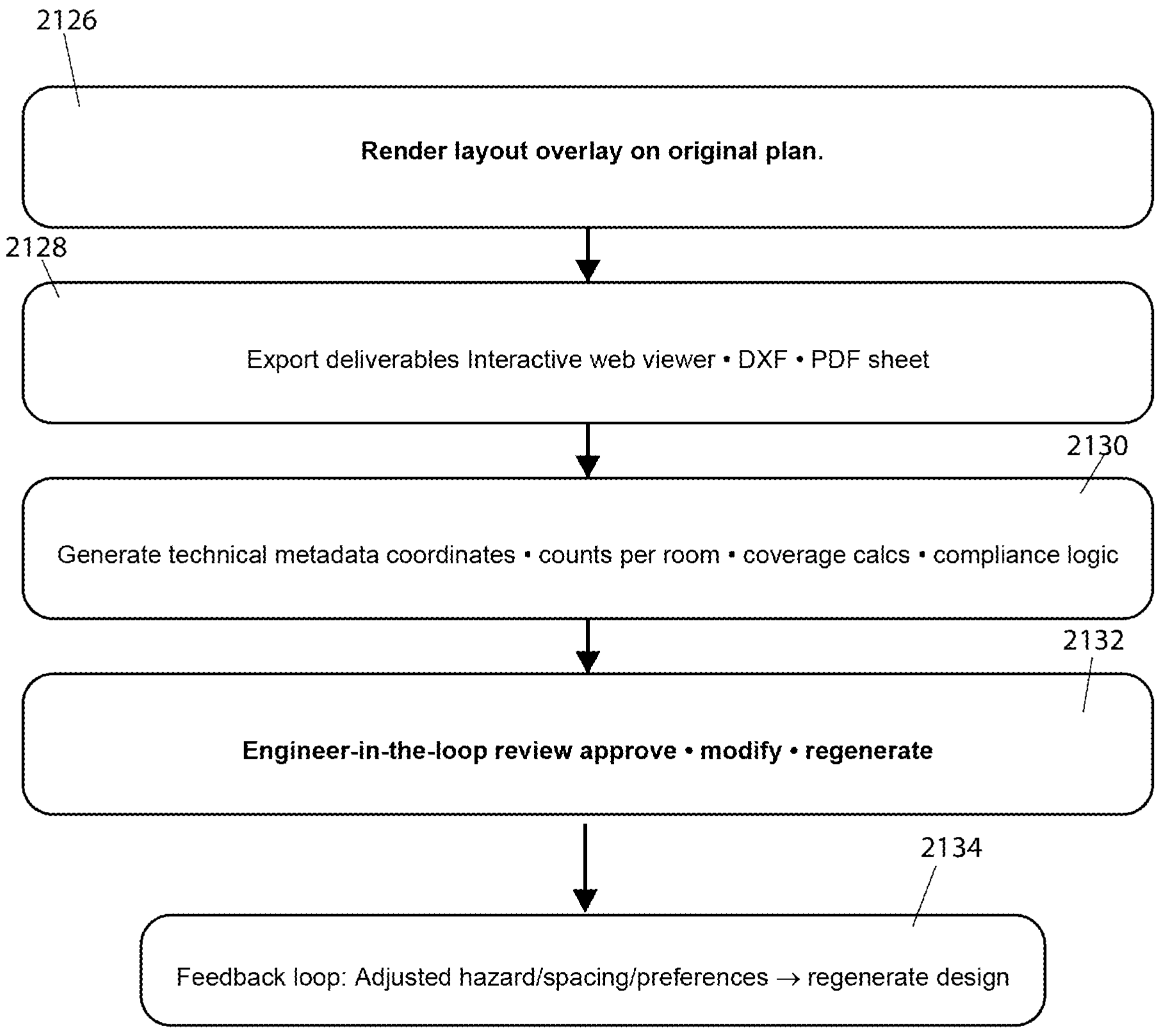
FIG. 19 outlines validation, issue detection, and deliverable export.

FIGS. 17-19 depicts a computer-implemented method for intake and processing of project artifacts and parameters to generate a compliant system layout and associated deliverables. The method may be performed by the architecture (100) described with respect to FIG. 1, including execution by the input module (200), processing module (300), and output module (400), with data optionally persisted to the project data store (500).

In a receiving step (2102), the system receives at least one project file in one or more formats including CAD formats and document formats, such as DXF, DWG, and PDF, and further receives files through a direct connection to an external authoring system that furnishes such files, including computer-aided design or building-information modeling software. The receiving step (2102) may include authentication and session association such that received artifacts are bound to a project instance.

In a parameter acquisition step (2104), the system receives additional project parameters including project dimensions, regulatory inputs, equipment preferences, cost constraints, and other constraints that condition synthesis, including parameters provided by user entry and/or retrieved from connected repositories.

In a normalization step (2106), the system reconciles the received file(s) and parameters into a canonical internal representation by harmonizing units, scales, coordinate frames, schema fields, and element identifiers, thereby conditioning the project state for consistent downstream inference and computation in view of anticipated outputs and dimensional context.

In an input-type determination step (2108), the system determines an input type and/or format signature corresponding to the received file(s), including identification of whether the input is a native three-dimensional model artifact, a two-dimensional drawing, a rasterized scan, or a document-embedded plan set, and selects a parsing pathway accordingly.

In a format-aware parsing step (2110), the input module parses the received file(s) in accordance with the detected format, extracting geometry, annotations, scale indicators, architectural features, and metadata necessary to support subsequent system synthesis. Where required, the format-aware parsing step (2110) performs or triggers conversion of drawing-based or document-based inputs into a structured model representation so that a uniform model is available to internal processes.

In a uniform model generation step (2112), the system generates or updates a uniform internal model that represents the project space and associated constraints in a consistent data structure suitable for application-wide processing, including normalized geometry objects, feature labels, and indexed spatial relationships.

Unified design payload step 2113 prepares a file or package for later processing. The payload file may contain a combination of all inputs, user and system preferences, project specific parameters, such as software subscription terms, all preliminary models generated up to this time. A payload container may be an amalgamation or combination of files and other records stored in memory of system disk in a single location or across varied physical infrastructure.

In a system-requirement interpretation step (2114), the processing module interprets requirements for at least one technical system to be built, including deriving applicable rule sets, spacing constraints, coverage constraints, and performance thresholds from regulatory inputs and project context, and instantiating those requirements as machine-actionable constraints bound to the uniform internal model.

In a constraint-driven placement synthesis step (2116), the system applies a rules engine and constraint evaluation logic to compute candidate placement regions and preliminary placements for equipment elements associated with the interpreted system requirements, including determination of permissible zones, prohibited zones, and required coverage intervals.

In an AI strategy generation step (2118), one or more learned models generate at least one placement strategy for placing system elements within the project space, including generating candidate sets of device placements, routing options, and topology configurations responsive to constraints and prior outcomes. The AI strategy generation step (2118) may output multiple candidate strategies for scoring and selection.

In a candidate filtering step (2120), the system filters candidate placements and strategies based on geometric feasibility and performance objectives, including evaluation for symmetry and uniformity where appropriate, coverage continuity, and mitigation of irregularities or edge-condition gaps, thereby producing a refined candidate set.

In a validation step (2122), the system validates the refined candidate set against applicable constraints, including code requirements, spacing thresholds, clearance constraints, capacity constraints, and connectivity integrity, and generates a validation result identifying pass/fail conditions and any remediable exceptions.

A filtering step 2124 may be a useful feature in some embodiments, permitting the system or user to focus on the most optimal system layout. A filter may be established to eliminate invalid or impractical layouts. Invalidity or impracticality may be determined by an AI enabled process based on conflicts with geography, spacing, code compliance, increased failure rate or cost. Filtering may also be done through interactive user interface and input.

FIG. 19 depicts a simplified set of terminal method steps executed by the application to render the synthesized system design onto the baseline project artifacts, export consumable deliverables, attach technical metadata, and iterate under engineer oversight until an acceptable output package is produced.

A render layout overlay step (2126) is configured to generate an overlay representation in which one or more synthesized systems, such as plumbing, fire protection, HVAC, electrical, and/or low-voltage/data cabling (e.g., internet/CAT5), are composited onto the baseline plan package. The baseline plan package may include a drawing, or a model file, ingested at in step 2102. In exemplary embodiments, the overlay binds the generated system entities to the underlying geometry and coordinate system, preserving alignment, scale, and element identifiers so that intersections, tie-ins, and co-routed assemblies (e.g., plumbing coordinated with fire protection) remain spatially consistent with each other and the underlying baseline drawing.

An export deliverables step (2128) is configured to package and transmit the overlay and associated artifacts to one or more output modalities, including (i) an interactive viewer, (ii) a model/drawing file package, and/or (iii) a two-dimensional drawing set. In exemplary embodiments, the export deliverables step (2128) supports outbound rendering through an external or outbound listener application that presents the deliverables as a visual representation on display devices and may additionally drive outputs to virtual reality and/or augmented reality devices, physical-output visualizers, and/or a three-dimensional printer, depending on the selected export channel.

A technical metadata generation step (2130) is configured to generate and associate metadata with the exported layout, including coordinate data, element location descriptors, connectivity identifiers, and other data-specific attributes describing the overlayed systems. The generated metadata may include, without limitation, placement coordinates, routing geometry, interface/tie-in references, and cross-references sufficient to support downstream installation, inspection, fabrication, and audit workflows.

An engineer-in-the-loop step (2132) is configured to enable supervised review of the exported deliverables and associated metadata, including approval, modification, and regeneration actions. In exemplary embodiments, the engineer-in-the-loop step (2132) provides a controlled mechanism for a reviewer to confirm compliance posture, detect clashes or constructability issues, adjust assumptions or constraints, and trigger regeneration of one or more affected portions of the overlay and deliverables.

A correction and loopback step (2134) is configured to capture identified failures, exceptions, or required corrections produced during engineer review and to return the corrected inputs and/or directives to step (2124) for reprocessing and refinement. The loop continues until an updated export produced in the output step (2128) satisfies the acceptance criteria established during validation step (2122) or (2132), thereby completing the terminal method sequence.

Figure 20:
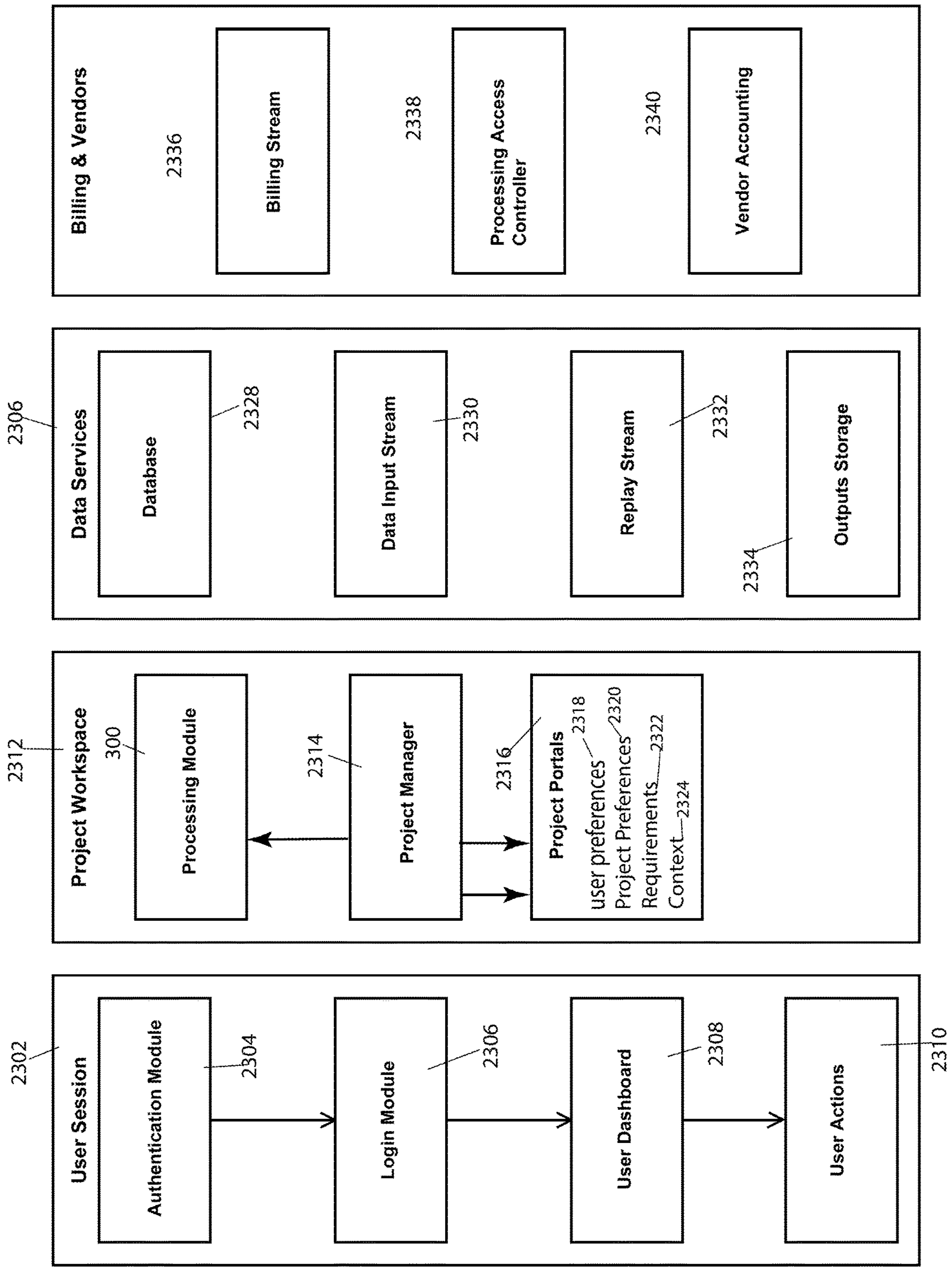
FIG. 20 shows multi-session project management with data services and billing.

FIG. 20 depicts an operational and dataflow representation (2300) of the disclosed application as a multi-tenant, AI-enabled system configured to concurrently support multiple user sessions, multiple project workspaces per session, shared and/or dedicated data services, and usage-based billing.

A user session container (2302) comprises a logical session boundary associated with a given user or organization and is configured to encapsulate authentication state, authorization scope, session-level configuration, and access to one or more project workspaces. In exemplary embodiments, multiple user session containers (2302) may execute concurrently, and each user session container (2302) may be associated with one or more tenants, billing identities, or client subaccounts.

An authentication module (2304) is configured to establish identity, session validity, and authorization scope for a user session container (2302), including enforcement of role-based access to project workspaces and system resources.

A login module (2306) is configured to receive credential material, initiate authentication transactions with the authentication module (2304), and establish a session token or equivalent session artifact that enables access to the user interface subsystem (110) for project operations.

A user dashboard (2308) is configured to provide a session-scoped interface for creating, selecting, running, and verifying projects, and to surface project status indicators and actionable controls that invoke user actions (2310) to initiate processing workflows and manage project artifacts.

User actions (2310) comprise discrete control inputs issued through the user dashboard (2308) to create a project workspace, upload or connect inputs, configure preferences, initiate processing, review outputs, and approve exports, with each action being logged and attributable for auditing and billing.

A project workspace (2312) comprises an isolated project space within a user session container (2302) and is configured to maintain project-scoped parameters, artifacts, constraint sets, and outputs. In exemplary embodiments, a user session container (2302) may include a plurality of project workspaces (2312), each having an independent state, access policy, and lifecycle.

A project manager module (2314) is configured to manage project lifecycle state, including milestones, goals, and foundational identification parameters for a project workspace (2312), and to maintain a project status that conditions which processing operations are available or required.

A project portal (2316) is configured to expose controlled project access to internal team members and external vendors, and to mediate collaborative workflows including artifact submission, review, approval, and issue resolution. The project portal (2316) further manages project-scoped preference and requirement intake, including user-level preferences (2318), project-level preferences (2320), project requirements (2322), and legal or jurisdictional context (2324), each of which may be versioned and associated with an individual project residing or being maintained within the project portal.

User-level preferences (2318) comprise session- or tenant-scoped preference parameters reusable across project workspaces, including default equipment preferences, standardization policies, brand constraints, and review conventions.

Project-level preferences (2320) comprise project-specific preference parameters that override or refine user-level preferences (2318) for a given project workspace (2312), including equipment selection priorities, deliverable formats, and project-specific constraints.

Project requirements (2322) comprise scope and performance requirements for the project workspace (2312), including system domains to be synthesized, deliverable requirements, schedule constraints, and acceptance criteria used for processing orchestration.

A legal and jurisdictional context set (2324) comprises the controlling jurisdiction signals and regulatory selections for the project workspace (2312) and provides the contextual basis for regulatory input (130) acquisition, applicability determinations, and constraint compilation.

The project manager module (2306) is configured to manage the lifecycle of each project portal (2316) and provide AI assisted processing for each project through the processing module (300).

A data services layer (2326) is configured to provide persistence, retrieval, indexing, and stream services to one or more user session containers (2302) and project workspaces (2312). In exemplary embodiments, the data services layer (2326) may be dedicated per session or shared across sessions, and includes database services (2328), input stream services (2330), replay stream services (2332), and output storage services (2334) that cooperate to support traceability, reproducibility, and iterative project execution.

Database services (2328) comprise one or more databases and/or object stores that persist project artifacts, models, preferences, derived constraints, and prior outcomes, including data that supports the AI knowledge base (950) and learning workflows described with respect to FIG. 15.

A data input stream service (2330) is configured to ingest and queue project artifacts and parameters, including uploads and direct connections to external authoring systems, and to route such inputs to the input module (200) under the governance of session and project policies.

A replay stream service (2332) is configured to rehydrate prior project states, intermediate representations, and decision traces for audit, reprocessing, comparative analysis, or iterative refinement, including reproduction of prior pipeline runs against updated constraints or preferences.

An output storage service (2334) is configured to persist outputs generated by the output module (400), including model overlays, drawing packages, reports, and export artifacts, and to make such outputs available for retrieval via the user dashboard (2308) and project portal (2316).

A billing module (2336) is configured to track activity and resource consumption attributable to user session containers (2302), project workspaces (2312), and vendor participation via the project portal (2316), and to generate accounting artifacts including invoices, usage summaries, and charge allocations. In exemplary embodiments, the billing module (2336) supports billing of end users for application usage and additionally supports pass-through or sub-billing workflows by which a user session container (2302) bills its own clients for services consumed through the platform.

A processing access controller (2338) is configured to mediate invocation of the processing module (300) from the project portal (2316) in accordance with project status maintained by the project manager module (2314). The processing access controller (2338) initiates ingestion of files via the data input stream service (2330), invokes normalization and parsing within the input module (200), applies constraints and preferences, and orchestrates generation of outputs via the output module (400), with the resulting artifacts being persisted via the data services layer (2326) and logged for billing by the billing module (2336). Vendor accounting module (2340) may then be used for creating detailed billing statements that can track each user session 2302, activities of each project space 2312, as well for all data persistence activities 2306 for dynamic and accurate billing.

Figure 21:
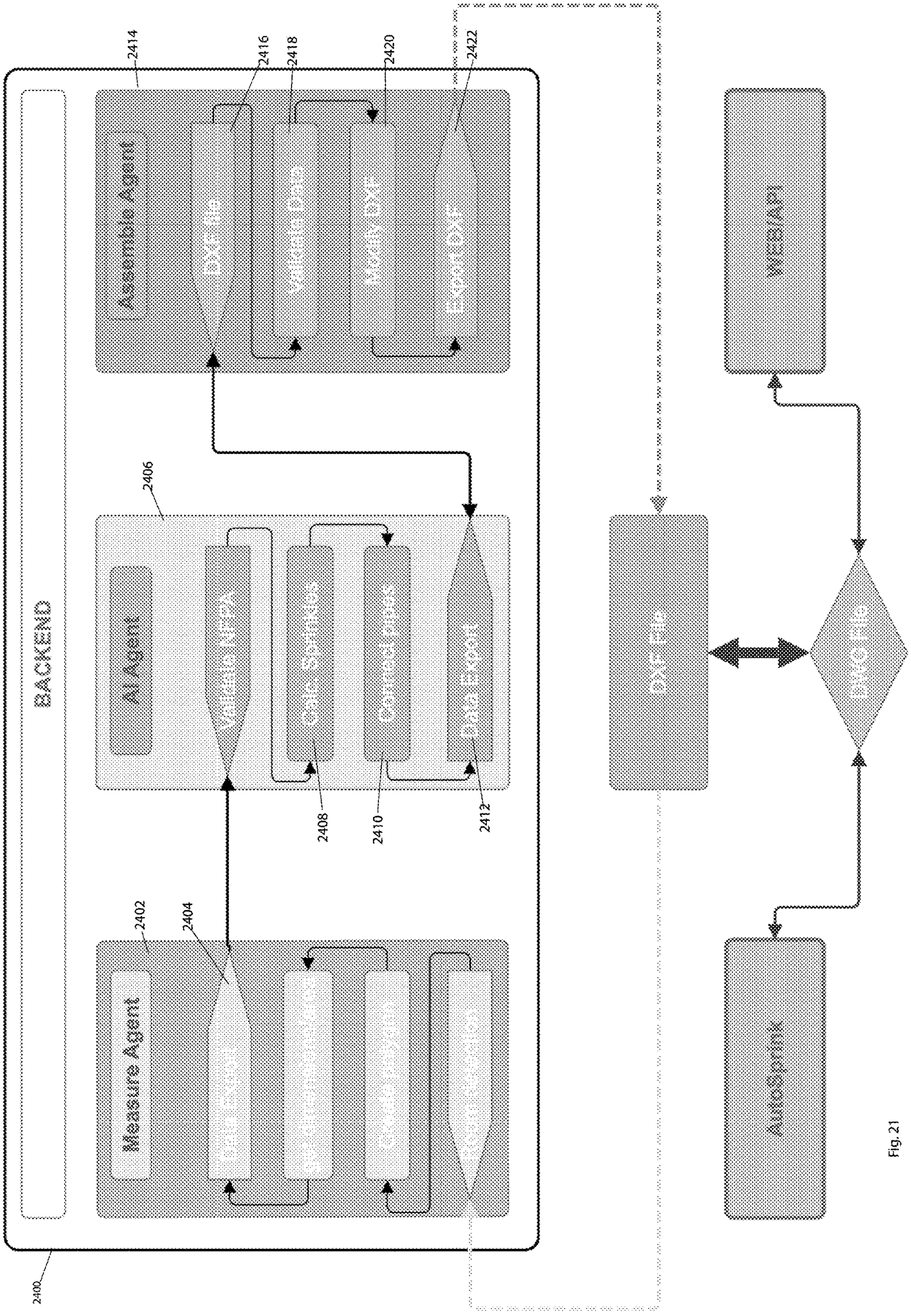
FIG. 21 illustrates backend agents for measuring, synthesizing, and assembling overlays.

FIG. 21 depicts a backend processing architecture (2400) implemented as a cooperating set of agents that ingest a project artifact, extract measurements and requirements, synthesize one or more target systems in view of context and constraints, and assemble an updated output artifact in which the target system(s) are overlaid onto an existing drawing or model.

A measure agent (2402) is configured to ingest at least one project file and to perform format-aware parsing to extract geometric primitives, unit systems, coordinate frames, and measurable features required for downstream synthesis. The measure agent (2402) determines dimensional measurements and minimum requirement fields implicated by the artifact content, including room extents, elevations, clearances, and existing system geometry where present, and produces a measured project representation (2404) comprising normalized measurements and extracted feature descriptors.

A measured project representation (2404) comprises machine-actionable geometry, measurements, and feature annotations derived from the ingested artifact, including identifiers sufficient to associate extracted measurements with spaces, elements, and any detected existing systems.

An AI synthesis agent (2406) is configured to receive the measured project representation (2404) and to infer and apply requirements for one or more target systems to be generated. The AI synthesis agent (2406) reconciles the measured project representation (2404) with regulatory input (130), project context and scheme parameters (2408), and equipment context (2410) comprising desired, available, or preferred equipment selections, including preferences and cost constraints. The AI synthesis agent (2406) computes a synthesis plan (2412) defining what system elements are to be generated, the constraints governing placement and routing, and how the generated system is to interface with existing conditions and other systems.

A project context and scheme set (2408) comprises project-specific parameters describing intended system domains, scope, occupancy and use assumptions, risk posture, constructability constraints, and other contextual variables that condition requirement selection, routing strategy, and integration decisions.

An equipment context set (2410) comprises available and/or preferred equipment data used to constrain system synthesis, including catalog availability, equipment ratings and certifications, maintenance and durability characteristics, and cost ceilings, as derived from equipment preference input (124) and equipment cost input (126).

A synthesis plan (2412) comprises a structured plan for generating at least one target system, including selected system types, required components, spacing and coverage constraints, interface definitions, and multi-system coordination constraints where a generated system is to be integrated with an existing system shown in the ingested artifact.

An assembly agent (2414) is configured to assemble an output artifact by overlaying the ingested artifact stream with the target system elements specified by the synthesis plan (2412). The assembly agent (2414) generates an integrated overlay artifact (2416) in which generated system topology, device placements, routing entities, and annotations are spatially registered to the original drawing or model and coordinated with any existing systems present in the ingested file.

An integrated overlay artifact (2416) comprises an updated drawing and/or model incorporating the generated system(s) over the baseline artifact, including cases in which a new system is injected into an existing system context and cases in which systems are generated over a baseline architectural drawing. In a first exemplary case, where the ingested artifact depicts an existing plumbing system and the target system includes a fire sprinkler system, the integrated overlay artifact (2416) includes the sprinkler system elements coordinated with the existing plumbing geometry. In a second exemplary case, where the ingested artifact comprises an architectural drawing and the target system includes plumbing, electrical, HVAC, fire protection, or combinations thereof, the integrated overlay artifact (2416) includes the generated systems overlaid and coordinated according to project parameters, preferences, and/or prior outcomes.

A conformance comparator (2418) is configured to compare the integrated overlay artifact (2416) against one or more desired outputs, acceptance criteria, and preference constraints, including checking alignment with the synthesis plan (2412), validation results produced by constraint checking, and user-specified configuration preferences. The conformance comparator (2418) produces a conformance result (2420) indicating whether the assembled artifact satisfies required constraints and whether corrective iteration is indicated.

A conformance result (2420) comprises pass/fail indicators, deviation metrics, and issue annotations identifying differences between the integrated overlay artifact (2416) and governing requirements or preferences, including any detected conflicts or omissions that should be remediated prior to final export.

A backend output emitter (2422) is configured to output the integrated overlay artifact (2416), optionally conditioned on the conformance result (2420), as a final deliverable in one or more formats including a three-dimensional model, a two-dimensional drawing package, and/or a visual model suitable for rendering by a visualization device and/or for use in downstream build workflows. The backend output emitter (2422) may persist the deliverable to the project data store (500) and make it available to the output module (400) for user-directed export and rendering as described with respect to FIG. 14.

Figure 22:
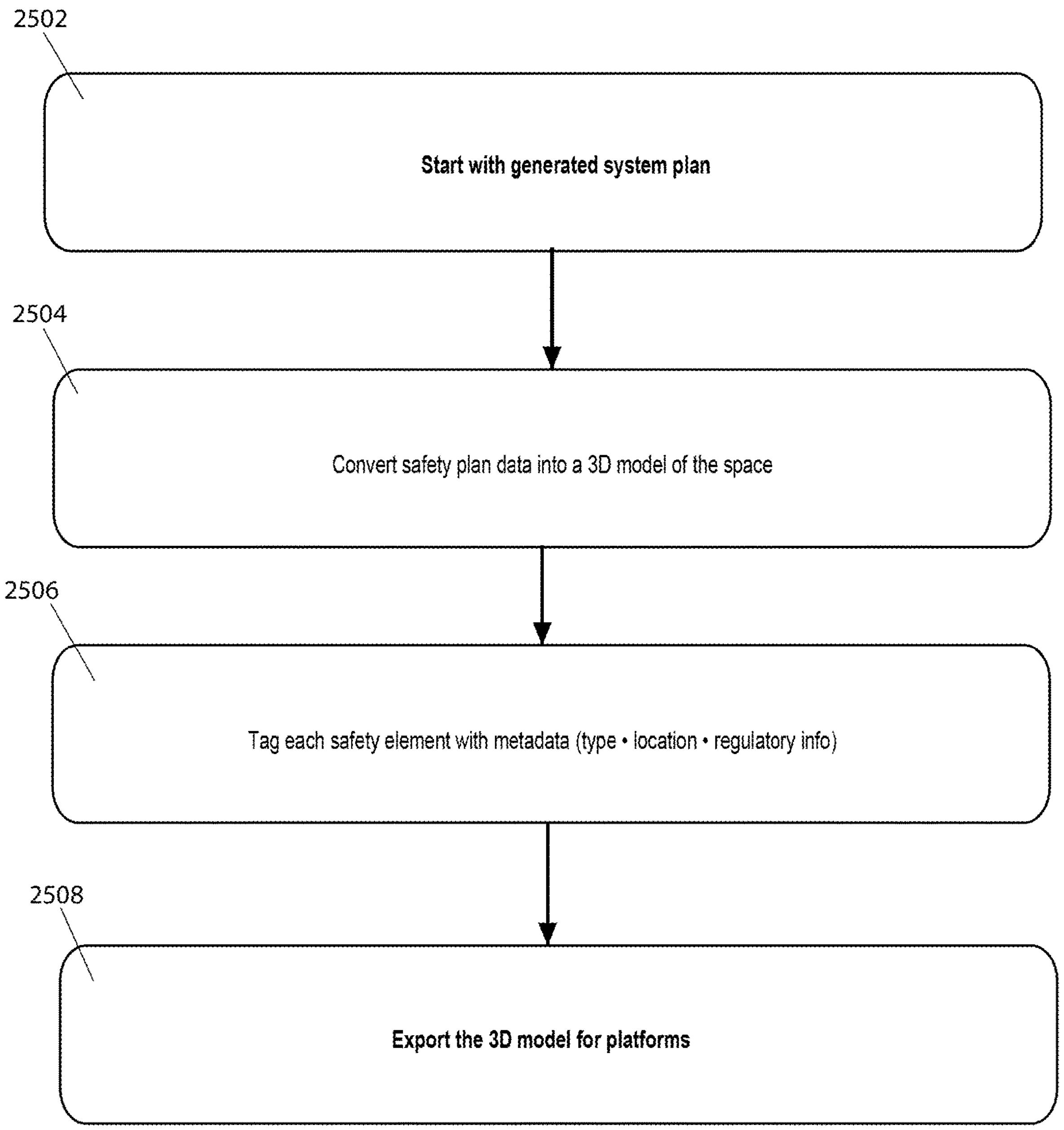
FIG. 22 shows generating a tagged 3D model from a safety plan for export.
Figure 23:
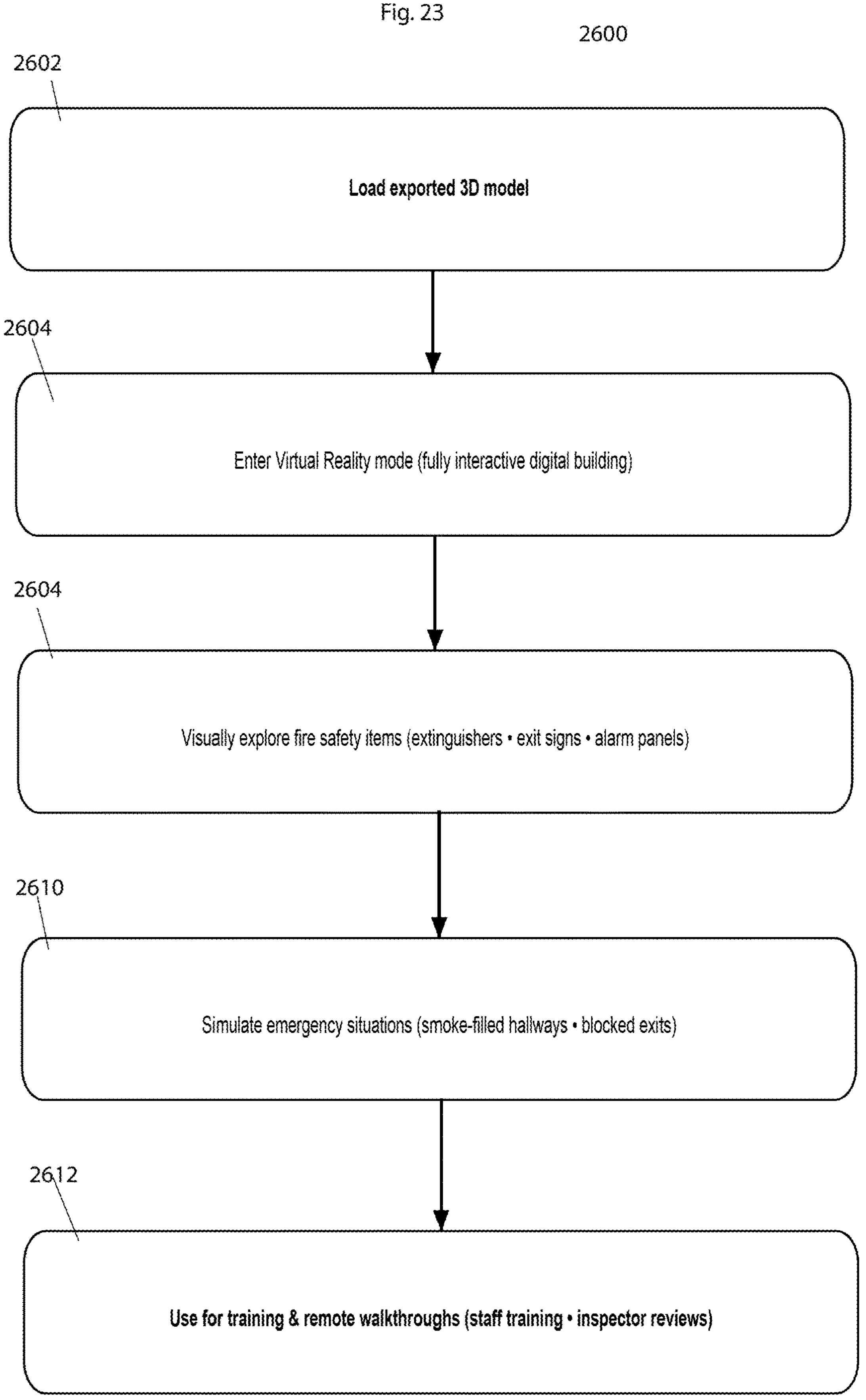
FIG. 23 illustrates VR review and simulation using the exported model.
Figure 24:
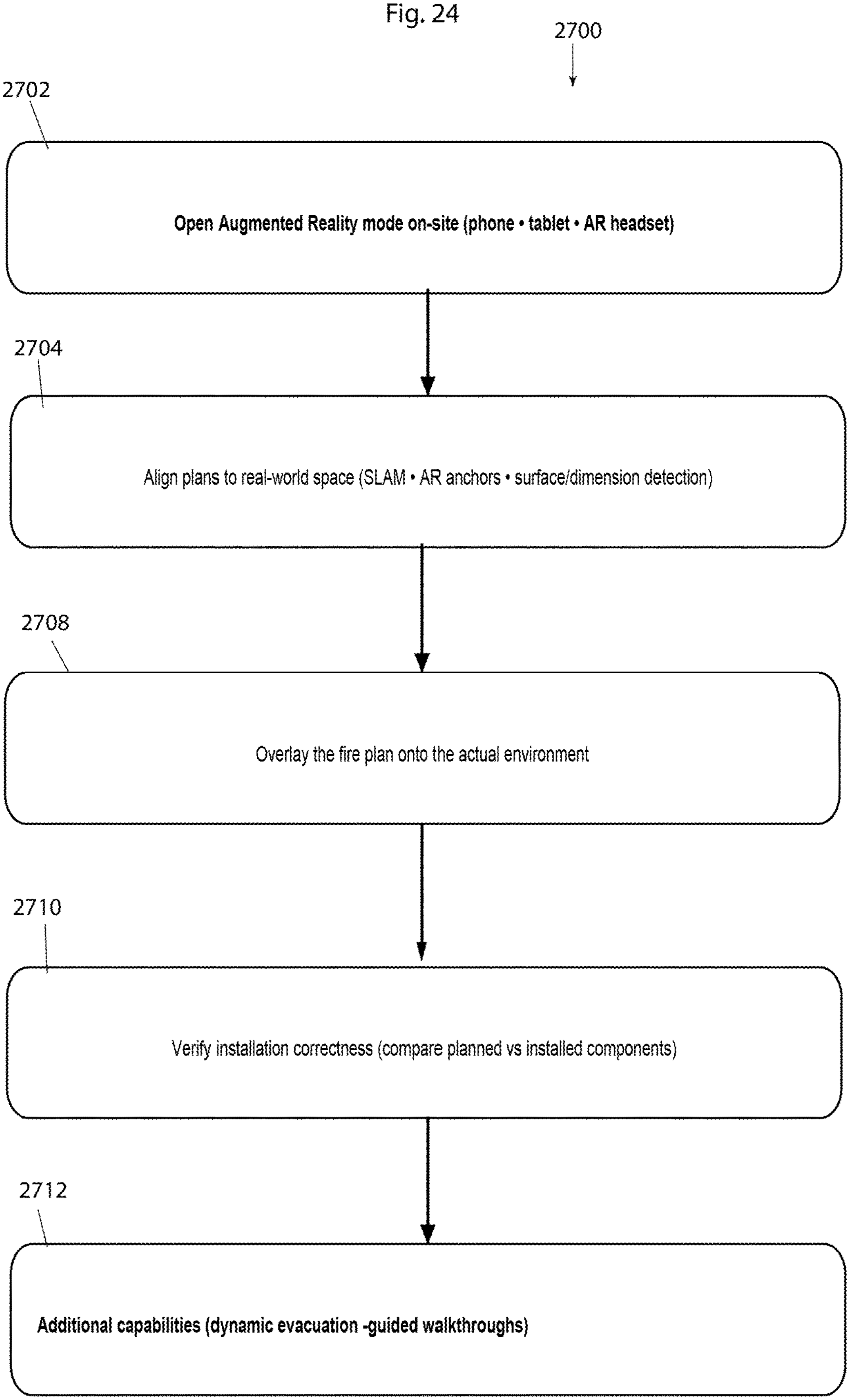
FIG. 24 shows AR on-site overlay using the exported model.

FIGS. 22-24 depict an optional visualization subsystem by which the disclosed application can present a virtual mock-up of the synthesized systems without physical construction, enabling review, training, and scenario testing using exported models and visualization devices.

FIG. 22 depicts one example of converting a desired system plan into a visual presentation for a dynamic preview, validation, or review in which an outputted, generated system plan is converted into a portable three-dimensional visualization package suitable for dynamic visual presentation across one or more visualization platforms.

In the generated plan stage (2502) a baseline drawing inputted using input interface 110 is combined with a desired prospective system layout. The artificial intelligence agent would dynamically attempt to parse the input file and combine it with the prospective system layout into a conversion plan.

At conversion stage (2504) the plan is converted into a three-dimensional model of the space by binding plan elements to a spatial representation and producing a structured 3D model suitable for interactive rendering.

The metadata tagging stage (2506) may occur as part of the conversion stage (2504) or as a later stage, where each visual detail is tagged within the three-dimensional model with metadata including, without limitation, element type, spatial location, and regulatory information, thereby creating an enhanced visual model.

During the platform export stage (2508), the enhanced visual model is configured, using AI-assisted methodologies, to export the tagged three-dimensional model into one or more formats compatible with downstream visual platforms for dynamic visualization, including interactive viewers, such as WebXR®, Unity®, or Unreal Engine®.

FIG. 23 depicts a virtual reality presentation workflow (2600) in which an exported three-dimensional model is loaded into a VR environment for immersive review and simulation.

A VR model loader (2602) is configured to load a selected export artifact from the platform-compatible formats (2516) into a VR runtime environment, including association of model layers, metadata tags, and interaction bindings.

A VR session controller (2604) is configured to initiate a virtual reality mode session using a visualization presentation system (2606) comprising, for example, a head-mounted display, headset, or other immersive display device, and to present the loaded model in a navigable 3D scene.

(2606) A visualization presentation system (2606) comprises one or more devices capable of presenting the 3D environment to a user, including head-mounted displays, projection environments, or other immersive rendering devices, and may be coupled to one or more input devices for navigation and interaction. The visualization presentation system is then used to enable immersive exploration. An immersive exploration enabling a user to visually explore the synthesized systems within the context of the existing environment, including element interrogation using the metadata tags, layer toggling, and spatial navigation to inspect placements, routing, and interfaces.

A scenario simulation engine (2610) is configured to execute one or more simulated scenarios (2612) within the VR environment, including failure scenarios, obstruction scenarios, evacuation or access scenarios, and other what-if conditions, and to visualize the impacts of such scenarios on system performance and spatial usability.

Simulated scenarios (2612) comprise parameterized simulation states and visualizations applied to the VR scene to support review, training, and design validation without physical build-out.

FIG. 24 depicts an augmented reality presentation workflow (2700) in which the synthesized system elements are rendered as overlays within a real-world environment using an AR-capable device.

The processing module (300) may contain an AR model loader (2702) and a spatial registration engine (2704). The AR model loader (2702) is configured to obtain the tagged 3D model (2512) and/or a selected export artifact from the platform-compatible formats (2516) and prepare the artifact for real-time overlay rendering on an AR-capable device.

The spatial registration engine (2704) is configured to detect a real-world space and establish a registration transform aligning the virtual model coordinate system to the physical environment, including detecting planes, fiducials, geometry features, or anchor points to achieve stable placement and scale correctness.

The AR overlay renderer is then configured to render the synthesized systems as virtual overlays (2708) within the user's view of the physical space via a visual presentation device, thereby enabling inspection of proposed system placements and routes relative to real-world constraints.

The augmented reality device may be provided with a model of planned systems or components, with an AR overlay renderer 2710 may visually recognize and interpret spatial and physical features and then overlay these with the 3D model 2512 to review and validate the planned 3D model. The AR rendering may provide, previews and walk-throughs 2712.

Figure 25:
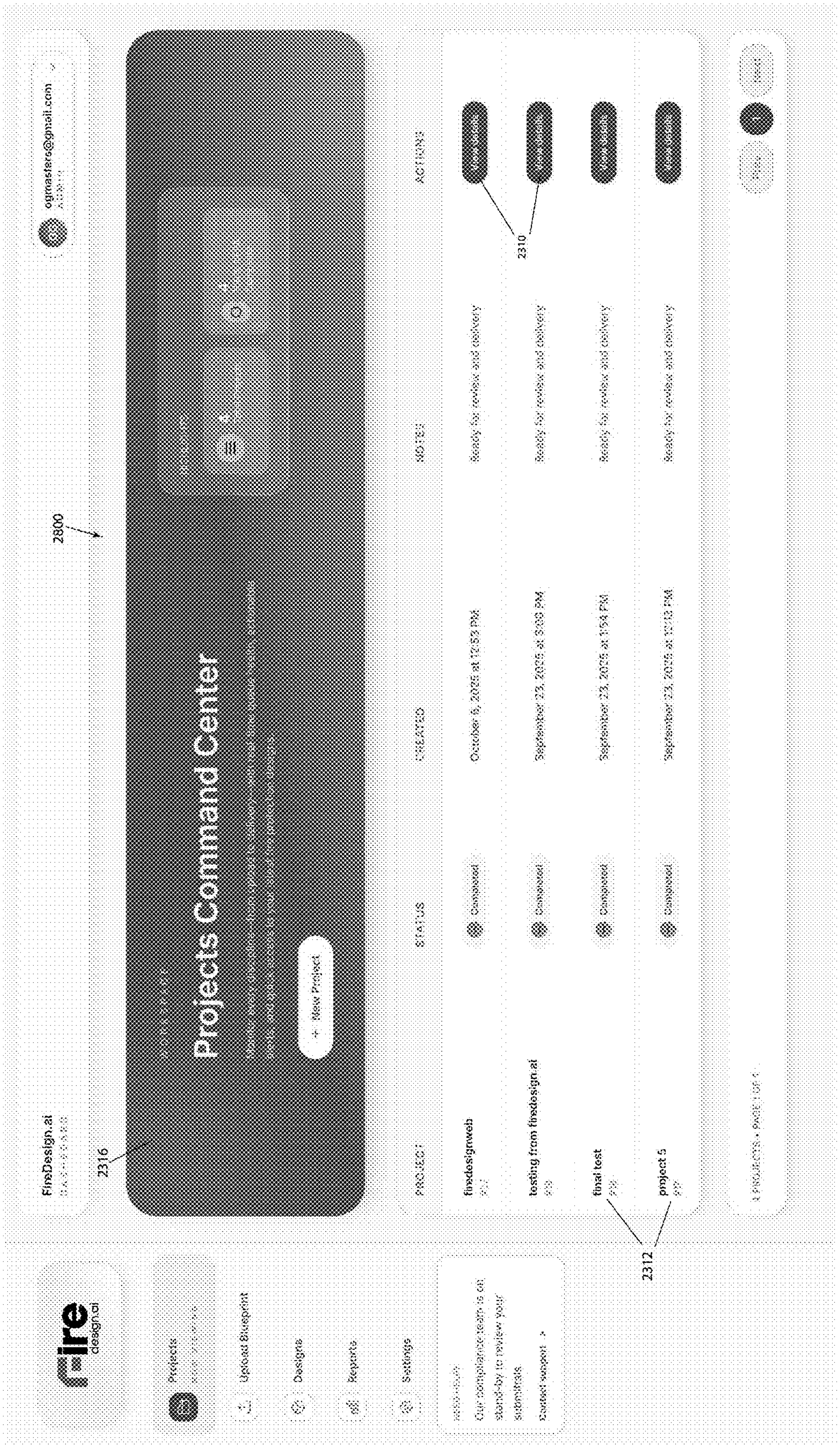
FIG. 25 shows a project command center for multi-project control.
Figure 26:
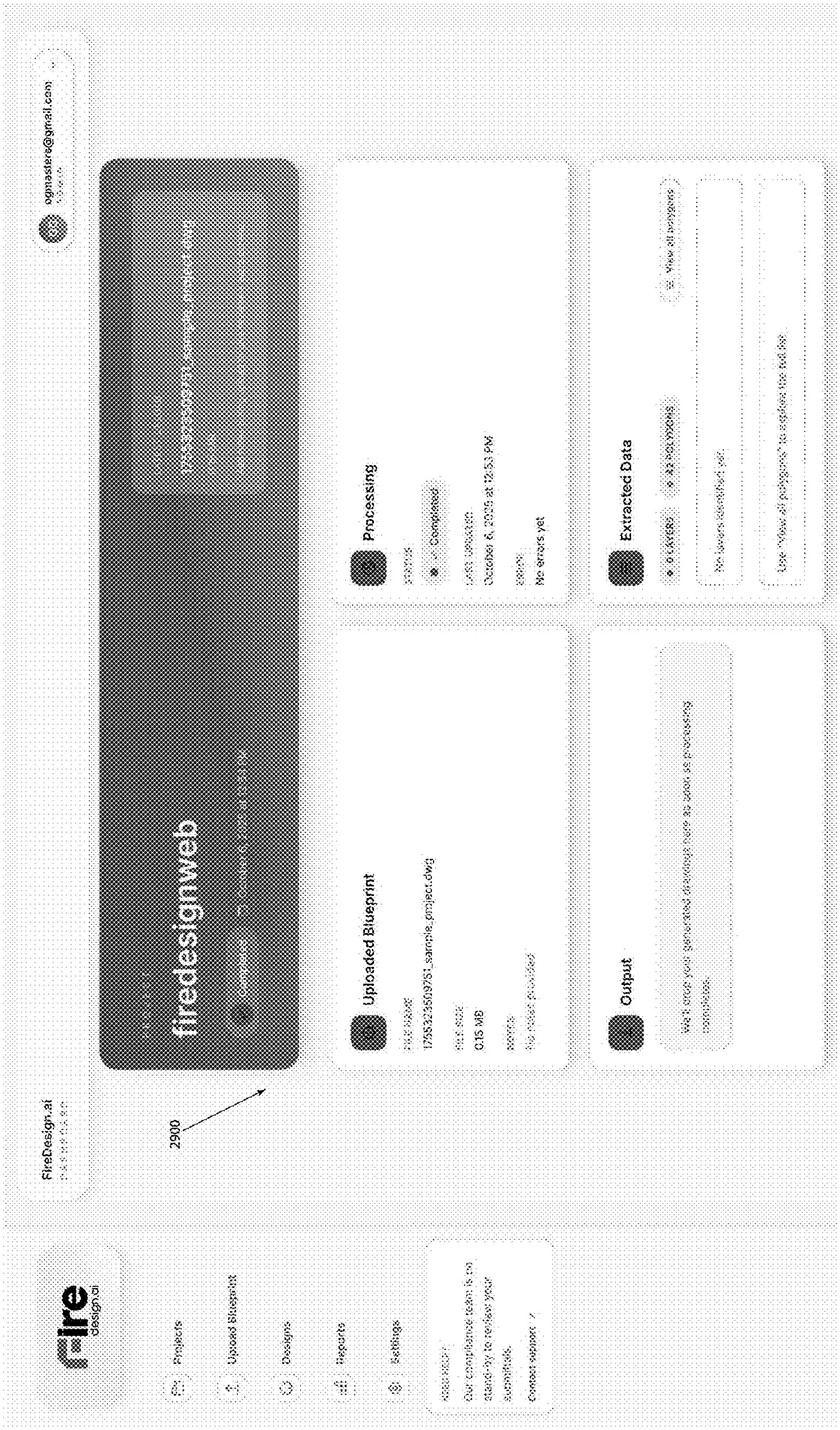
FIG. 26 presents a project manager status view.
Figure 27:
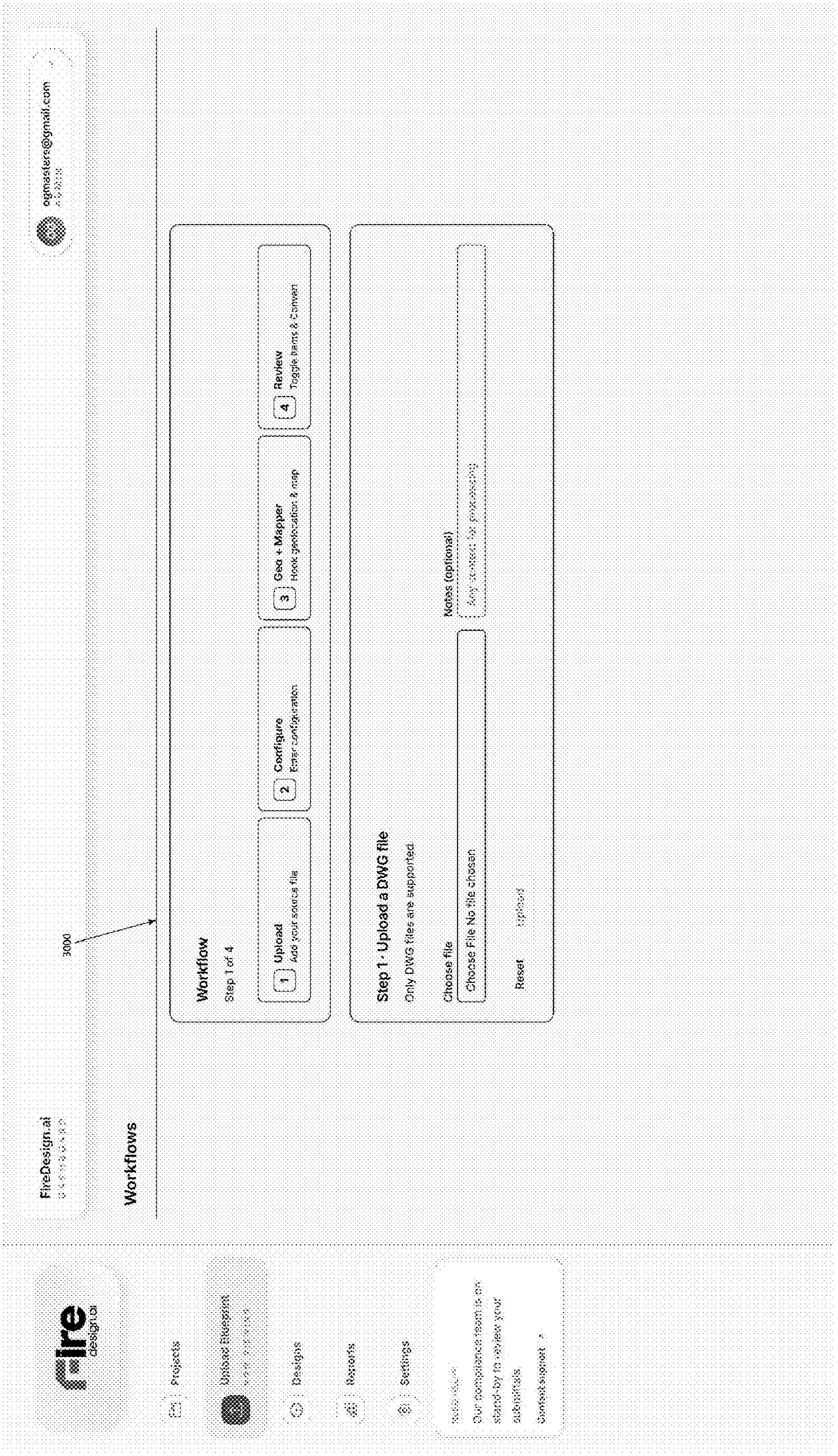
FIG. 27 shows a stage navigation interface for upload, configuration, review, and output.

FIGS. 25-27 depict exemplary graphical user interface views presented within a user session container (2302) and associated project workspace (2312), illustrating how a user interacts with the project portal (2316) to initiate processing, monitor project state, and navigate among project stages and output options. The illustrated screens are representative; the arrangement, labels, and sequencing may vary without departing from the disclosed operating model.

FIG. 25 depicts a project command center screen (2800) rendered by the user interface subsystem (110) in which the project portal (2316) is open and a plurality of project workspaces (2312) are concurrently visible within the user session. The project command center screen (2800) is configured to present project-level status summaries and to accept user actions (2310) for a selected project, including initiating ingestion, executing a processing run, requesting verification, and retrieving outputs. Each displayed project is associated with an execution context that, upon user action, invokes a corresponding processing instance (2802) mediated by a processing access controller (2338), such that the processing module (300) is triggered to execute using inputs and parameters stored through the data services layer (2326) and processed through the input module (200). In this manner, the project command center screen (2800) functions as a control surface for launching and supervising multiple project executions while maintaining isolation of project states and artifacts.

(2802) A processing instance (2802) comprises an executable processing context logically bound to a selected project workspace (2312), configured to invoke ingestion and normalization pathways in the input module (200), apply constraints and preferences, and produce outputs through the output module (400), with persistence and retrieval facilitated by the data services layer (2326).

FIG. 26 depicts a project manager screen (2900) associated with the project manager module (2314) and configured to display a project's lifecycle state and processing pipeline status. The project manager screen (2900) presents state indicators for whether the project is in an upload phase, a build/configuration phase, an active processing phase, a data retrieval or indexing phase associated with database services (2328), or a readiness state indicating that sufficient inputs exist for downstream build and output generation. The project manager screen (2900) is further configured to surface progress markers and gating conditions, such that the user can determine whether additional inputs are required, whether the system is currently executing a processing run, and whether outputs are available for review or export.

FIG. 27 depicts a stage navigation and output-control screen (3000) configured to allow a user to select a workflow stage for interaction within a given project workspace (2312). The stage navigation and output-control screen (3000) provides controls for entering an upload stage, a configuration stage for setting project parameters and preferences, a mapping or "mapper" stage for establishing connections and constraints, and a review or testing stage for inspecting intermediate or final results. The stage navigation and output-control screen (3000) may further include file-ingestion controls enabling a user to submit a project file and prompting the system to determine a file type and select an applicable parsing pathway, consistent with the intake method described with respect to FIG. 17. The stage navigation and output-control screen (3000) is additionally configured to expose output selection behavior by enabling the user to choose which form of result to view or export, including viewing intermediate states, previewing overlays, and selecting export modalities for two-dimensional and three-dimensional deliverables, with actual rendering and export being performed by the output module (400) responsive to the user's selections.

Figure 28:
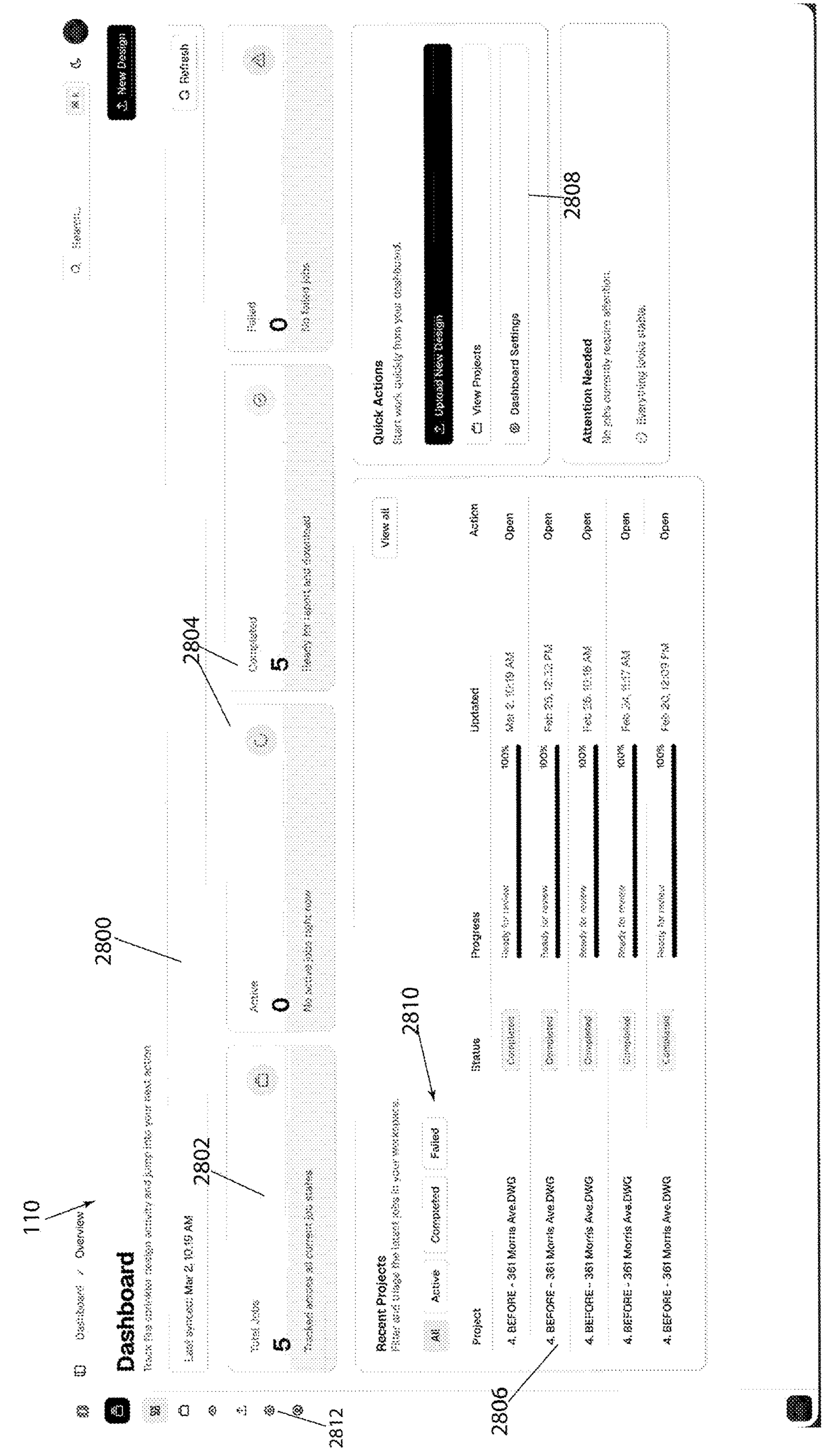
FIG. 28 depicts an alternative embodiment of the user interface subsystem as a dashboard view.

FIG. 28 depicts an embodiment of the user interface subsystem (110) implemented as a dashboard interface (2800) configured to provide a centralized operational view of system-design jobs within a workspace environment. The dashboard interface (2800) may be operatively coupled to the input module (200), the processing module (300), the output module (400), and the project data store (500) to aggregate and render job-state, project, and output-status information. In the illustrated embodiment, the dashboard interface (2800) includes a job overview panel (2802), a status metrics panel (2804), a recent projects panel (2806), a quick actions panel (2808), a project management control (2810), and a dashboard settings control (2812).

The job overview panel (2802) is configured to present a consolidated listing of design jobs spanning multiple building-system disciplines, including sprinkler, electrical, plumbing, heating or cooling, low-voltage, and multi-system design workflows. The status metrics panel (2804) is configured to expose aggregate execution parameters, including total jobs, active jobs in process, completed jobs available for review, and failed jobs requiring intervention. The recent projects panel (2806) is configured to provide indexed access to previously processed projects stored in the project data store (500). The quick actions panel (2808) is configured to initiate a new design sequence, including submission of a floor plan or other project artifact to the input module (200), while the project management control (2810) and dashboard settings control (2812) provide access to administrative, organizational, and interface-configuration functions. Accordingly, the dashboard interface (2800) functions as a supervisory control surface for monitoring, accessing, and initiating design operations supported by the claimed application. The quick actions panel (2808) is configured to present one or more selectable controls for initiating a new design workflow, including an upload action through which a user may submit a floor plan or other project artifact for processing by the input module (200).

Figure 29:
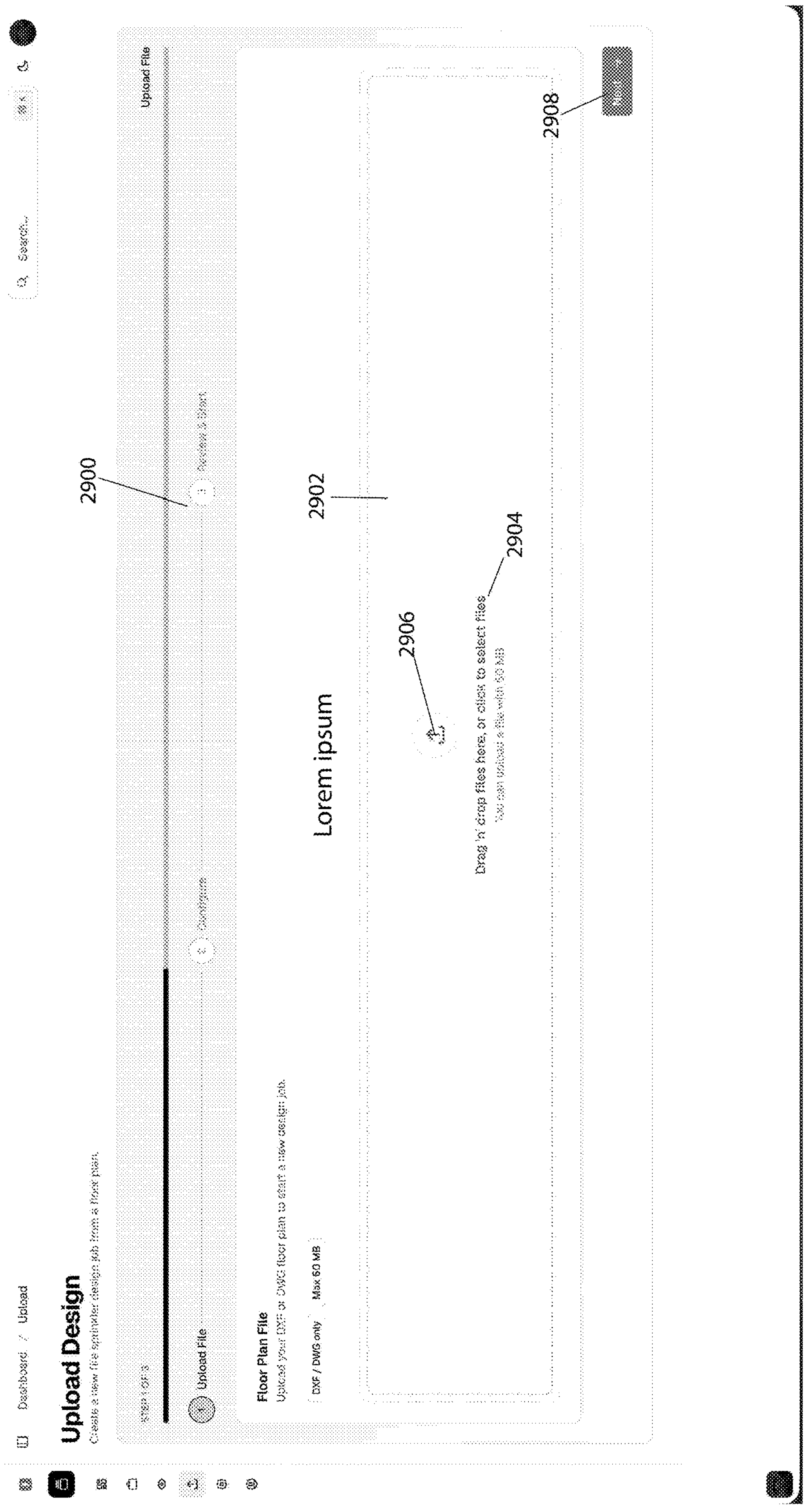
FIG. 29 depicts a workflow upload screen of the user interface subsystem.

FIG. 29 depicts an upload interface (2900) of the user interface subsystem (110) implementing a first stage of a design-ingestion workflow. The upload interface (2900) is configured to receive a floor plan or analogous architectural source file for initialization of a new system-design project. In the illustrated embodiment, the upload interface (2900) includes a file intake region (2902), a drag-and-drop control (2904), a manual file selection control (2906), a file format validation control (2908), and a project initiation control (2910). The upload interface (2900) is operatively coupled to the input module (200) such that uploaded DXF files, DWG files, or file packages of varying size may be ingested as project artifacts for downstream processing. Upon receipt, the uploaded architectural blueprint is provided to the processing module (300), including AI-assisted routines, for parsing, normalization, and preparation of a machine-actionable design input.

Figure 30:
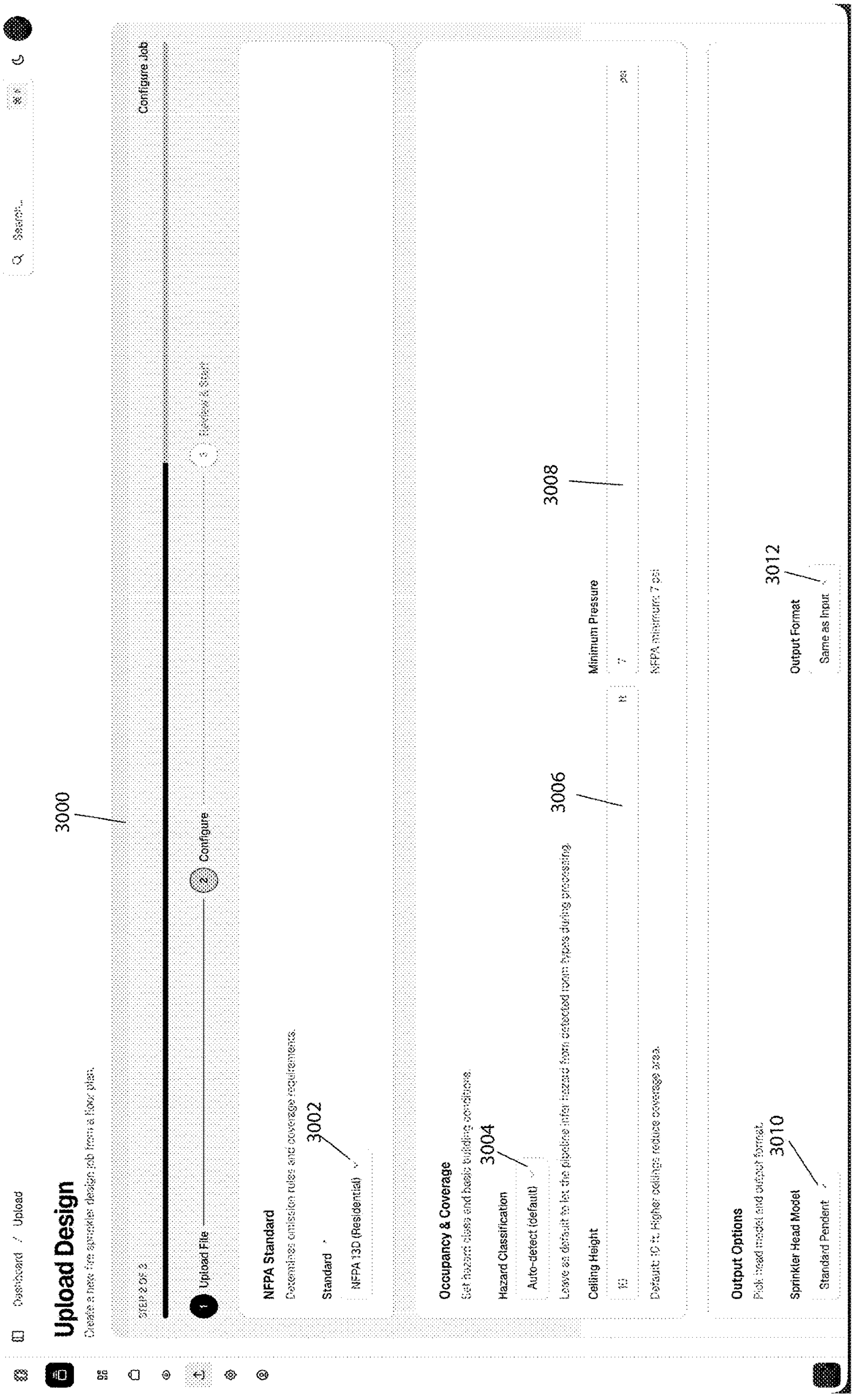
FIG. 30 depicts a workflow configuration screen of the user interface subsystem.

FIG. 30 depicts a design configuration interface (3000) of the user interface subsystem (110) implementing a second stage of the system-design workflow. The design configuration interface (3000) is configured to acquire project-specific parameters that govern rule application and design constraint enforcement during automated processing. In the illustrated embodiment, the design configuration interface (3000) includes a standards selection control (3002), an occupancy parameter control (3004), a hazard and space-limitation control (3006), an environmental specification control (3008), an equipment selection control (3010), an output-format selection control (3012), and a workflow submission control (3014). The standards selection control (3002) is configured to receive a selected regulatory, operational, or professional design standard, while the occupancy parameter control (3004) and hazard and space-limitation control (3006) are configured to define usage classifications and applicable spatial or risk constraints. The environmental specification control (3008) is configured to receive design-performance inputs including ceiling height and minimum system pressure, current, or flow, as applicable to the selected system type. The equipment selection control (3010) is configured to identify a desired equipment model and type, and the output-format selection control (3012) is configured to define a target deliverable format. The design configuration interface (3000) thereby supplies the processing module (300) with a structured design-criteria set enabling AI-assisted application of coverage rules, performance constraints, and system-layout parameters during project generation.

Figure 31:
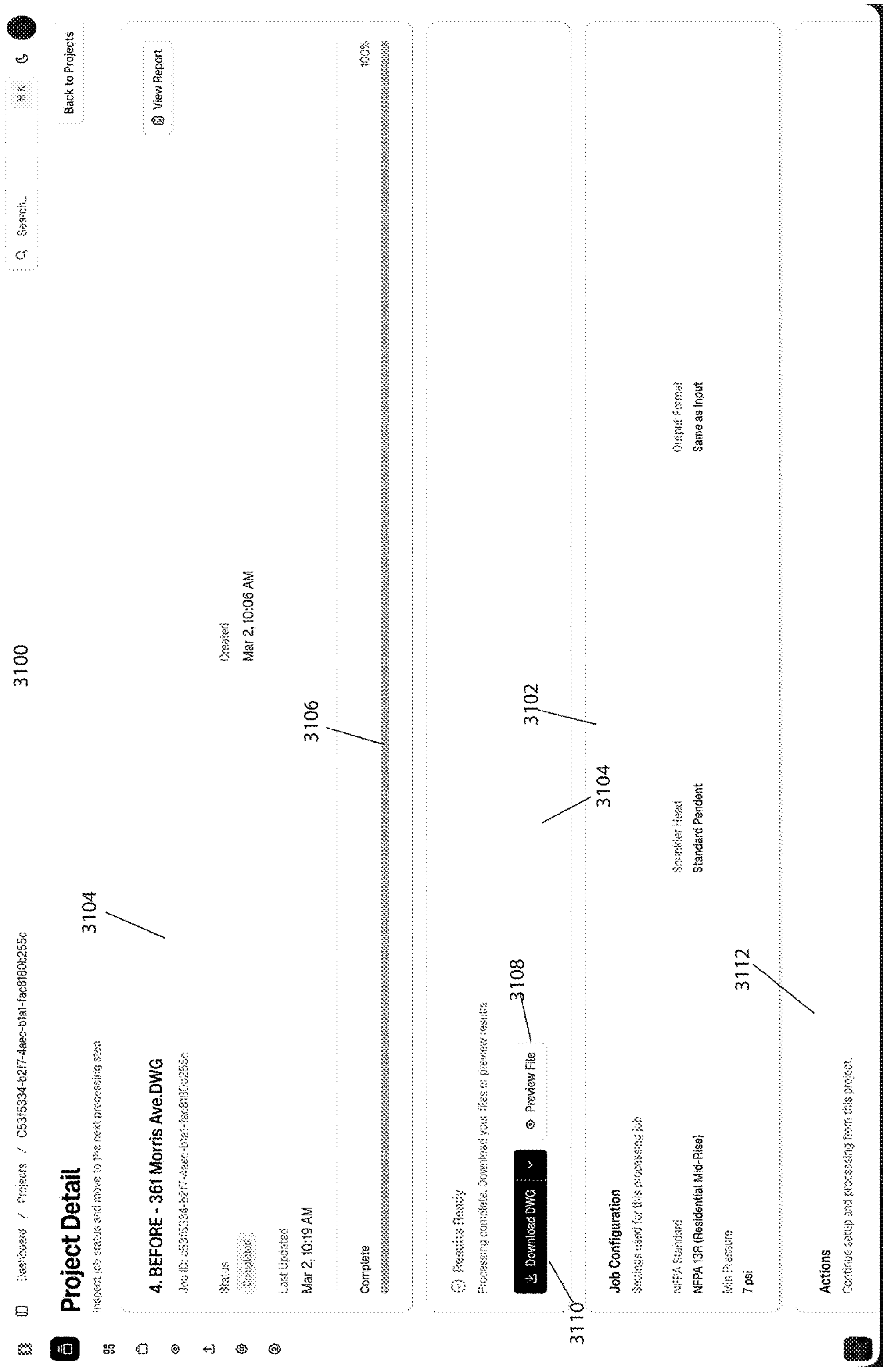
FIG. 31 depicts a project detail screen of the user interface subsystem.

FIG. 31 depicts a project detail interface (3100) of the user interface subsystem (110) configured to expose execution metadata and output-state information for a completed design phase. The project detail interface (3100) may be operatively coupled to the processing module (300), the output module (400), and the project data store (500), and may include a metadata panel (3102), a status panel (3104), a result indicator (3106), a preview control (3108), a download control (3110), and a configuration trace panel (3112). The metadata panel (3102) is configured to present project identifiers and temporal attributes, including job ID, creation time, and last-update time, while the status panel (3104) and result indicator (3106) are configured to indicate completion state and output readiness. The preview control (3108) and download control (3110) enable user access to the generated design, including retrieval of a DWG output file, and the configuration trace panel (3112) presents the governing job parameters applied during execution, thereby providing procedural traceability for the generated result.

Figure 32:
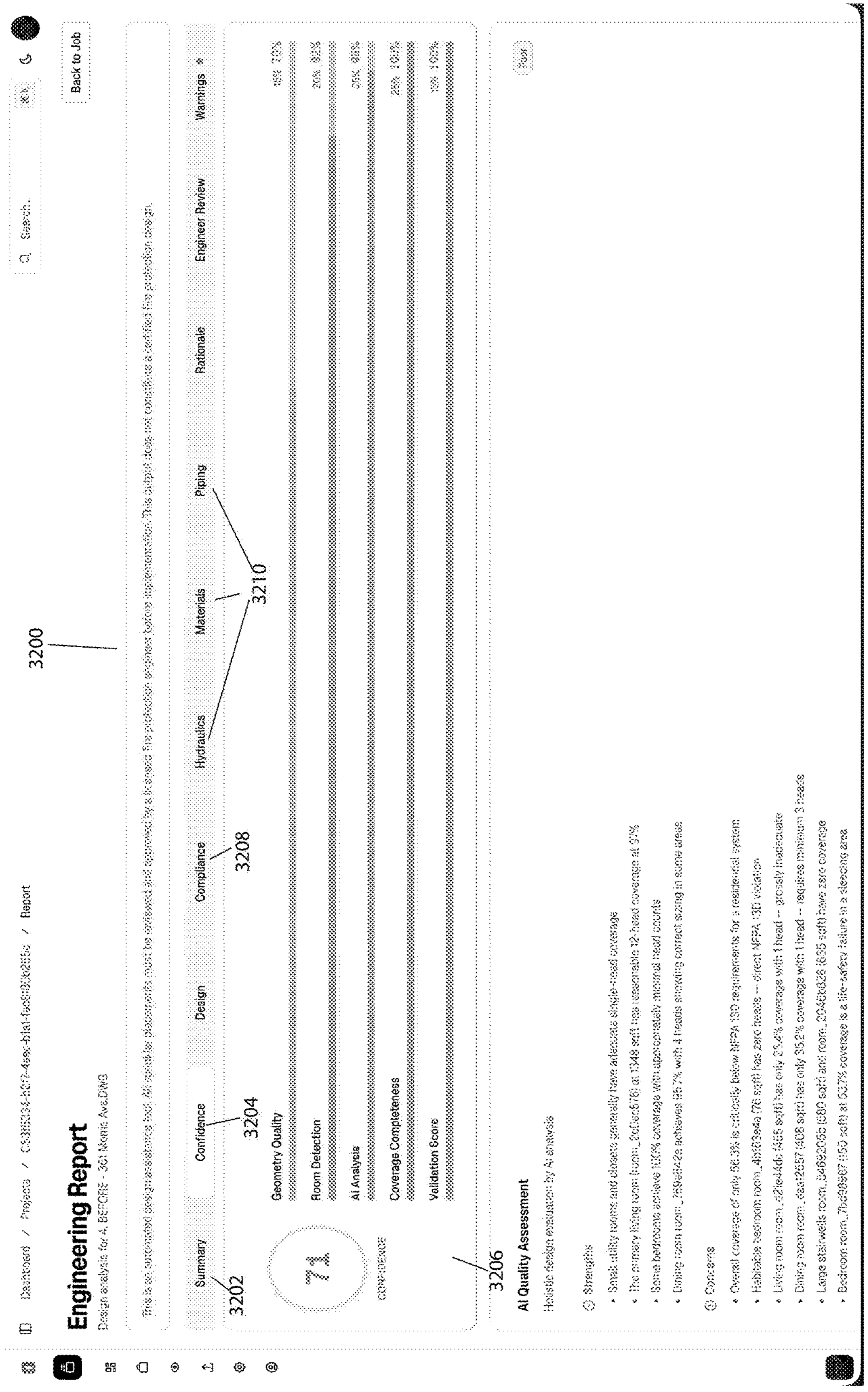
FIG. 32 depicts an engineering report screen of the user interface subsystem.

FIG. 32 depicts an engineering report interface (3200) of the user interface subsystem (110) configured to present a structured technical evaluation of an AI-generated system design and the engineering basis associated therewith. The engineering report interface (3200) may be operatively coupled to the processing module (300), the output module (400), and the project data store (500), and may include a design summary section (3202), a confidence assessment section (3204), an AI quality evaluation section (3206), a compliance review section (3208), and a technical detail section (3210). The design summary section (3202) is configured to provide an overview of the generated system layout and associated design outcome. The confidence assessment section (3204) is configured to generate and display a composite confidence score derived from multiple analytical factors, including geometry fidelity, room-detection accuracy, AI-analysis reliability, coverage completeness, and validation-check performance.

The AI quality evaluation section (3206) is configured to present a more granular assessment of design strengths, limitations, and potential risk areas, including identification of regions that may not satisfy NFPA coverage criteria or other applicable design thresholds. The compliance review section (3208) is configured to summarize code-driven and standards-based considerations evaluated during generation of the design, while the technical detail section (3210) is configured to provide additional engineering information relating to design decisions, hydraulic calculations, material selections, and piping characteristics. Accordingly, the engineering report interface (3200) functions as a consolidated verification, traceability, and decision-support output through which a user may assess the quality, compliance posture, and technical sufficiency of the generated design.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

The invention claimed is:

1. An artificial intelligence (AI) assisted computer-implemented system for generating code-constrained building-system layouts, comprising: one or more processors; and one or more non-transitory computer-readable media storing instructions that, when executed by the one or more processors, cause the system to: (a) receive, via a user interface, one or more project inputs comprising at least one of (i) a three-dimensional model file, (ii) a two-dimensional drawing, or (iii) a scan-derived drawing convertible into a structured model representation; (b) receive, via the user interface or a data service, additional constraint inputs comprising at least one of equipment preferences, equipment cost constraints, project dimensional parameters, and regulatory requirements; (c) normalize the one or more project inputs and the additional constraint inputs into a unified internal representation by resolving units, scales, coordinate frames, and schema fields; (d) verify completeness of the unified internal representation by determining whether required measurements and required parameter fields are present for a selected system domain; (e) responsive to detecting missing information, perform at least one of (i) inferring one or more missing fields using a stored knowledge repository or (ii) requesting supplemental input via the user interface; (f) infer a standards-conformant specification set for the selected system domain by extracting constraints from the model or drawing and determining applicable code requirements based on a jurisdictional context; (g) generate system connectivity definitions including at least one feed, inlet, or outlet for the selected system domain; (h) synthesize a layout by integrating system elements into the unified internal representation, including routing and placement consistent with the inferred standards-conformant specification set and the additional constraint inputs; (i) perform an integrity screening comprising at least one of connectivity verification, capacity plausibility checking, clash detection, or compliance conflict detection; and (j) generate an output deliverable comprising an updated model or drawing having the synthesized layout overlaid onto a baseline project artifact and export the output deliverable in a user-selected format; and wherein the user interface provides a control enabling the user to iteratively revise at least one constraint input responsive to an issue.

2. The system of claim 1, wherein normalizing the one or more project inputs includes converting units between metric and imperial systems and aligning at least one drawing scale to at least one model scale.

3. The system of claim 1, wherein verifying completeness comprises determining whether both (i) geometric measurements sufficient to bind placements to a coordinate frame and (ii) a regulatory constraint set sufficient to evaluate compliance are present, and, if not present, initiating the request for supplemental input.

4. The system of claim 1, wherein inferring one or more missing fields comprises retrieving prior project-derived defaults from a project data store and applying confidence scoring to each inferred field, and wherein fields below a confidence threshold are flagged for user confirmation.

5. The system of claim 1, wherein determining applicable code requirements comprises selecting governing provisions based on at least one of state, county, municipality, agency, department, or authority having jurisdiction and compiling the selected provisions into machine-actionable constraint objects.

6. The system of claim 1, wherein the equipment cost constraints include a budget ceiling, and wherein the system further generates a cost model, produces an estimated cost, determines whether the estimated cost is within the budget ceiling, and, if not within the budget ceiling, generates an adjusted scenario and re-estimates cost prior to synthesizing the layout.

7. The system of claim 1, wherein the equipment preferences are derived from one or more equipment catalogs obtained from at least one of a local database, an external catalog interface, or a proprietary equipment library, and wherein the system filters candidate equipment based on capacity, rating, and certification attributes.

8. The system of claim 7, wherein filtering candidate equipment further comprises applying operational-context filters including at least one of environmental operating conditions, duty cycle, occupancy-related constraints, or maintenance constraints, prior to selecting a recommended equipment set.

9. The system of claim 1, wherein synthesizing the layout comprises generating a canonical layout baseline for the project by selecting a prior-driven configuration identified as having produced positive outcomes in prior projects, and storing the canonical layout baseline for downstream processing.

10. The system of claim 1, wherein synthesizing the layout comprises integrating a plurality of system domains including at least two of plumbing, fire protection, electrical, or heating, ventilation and air conditioning (HVAC), and generating multi-system coupling constraints that avoid cross-system interference.

11. The system of claim 1, wherein generating system connectivity definitions comprises deriving at least one inlet or outlet from at least one of user input, standards-based defaults, or inference from building layout features, and resolving missing inlets or outlets from extracted requirements.

12. The system of claim 1, wherein the integrity screening further comprises generating an itemized issue list that identifies at least one of: detected clashes, capacity bottlenecks, missing mandated elements, prohibited configurations, or unresolved dependencies, and associating each issue with a spatial location within the updated model or drawing.

13. The system of claim 1, wherein generating the output deliverable comprises rendering an interactive viewer output configured to present the updated model or drawing with selectable overlay layers and element-level inspection of regulatory and equipment metadata.

14. The system of claim 1, wherein exporting the output deliverable comprises producing at least one of (i) a three-dimensional output file, (ii) a two-dimensional drawing file, or (iii) a print-ready drawing package for physical printing.

15. The system of claim 1, further comprising recording, in a knowledge base, at least one of accepted outcomes, user overrides, approvals, or revision deltas associated with the synthesized layout, and updating inference parameters used for subsequent projects based on the recorded information.

16. A multi-level computer-implemented system for managing and executing system-overlay projects, comprising: one or more processors; and one or more non-transitory computer-readable media storing instructions that, when executed by the one or more processors, cause the system to: (a) establish a plurality of user sessions, each user session being authenticated and associated with authorization scope; (b) maintain, for each user session, a plurality of project workspaces, each project workspace storing a baseline project artifact comprising at least one of a two-dimensional drawing file, a three-dimensional model file, or a document-embedded plan set; (c) receive, for a selected project workspace, project parameters comprising at least one of project dimensions, jurisdictional context, regulatory requirements, equipment preferences, or cost constraints; (d) execute, responsive to a user action within a project portal, an end-to-end processing pipeline including (i) ingesting input sources, (ii) normalizing the input sources, (iii) performing a completeness check comprising internal verification and user-facing verification, (iv) performing a specification sensibility determination, (v) generating required system inputs and integrating layout connections, (vi) analyzing failure points, and (vii) generating an output stream; (e) overlay one or more additional systems onto the baseline project artifact based on the project parameters to generate an updated deliverable artifact; (f) resolve and reconcile using artificial intelligence conflicting project parameters through a process of inference; (g) present, through a user interface, a selectable stage navigation control enabling access to at least an upload stage, a configuration stage, a mapping stage, and a review/testing stage for the selected project workspace; (g) store inputs, intermediate states, and the updated deliverable artifact in a data services layer accessible to at least one additional project workspace; and (h) export the updated deliverable artifact in a user-selected output format and record project outcomes as feedback data associated with the selected project workspace.

17. The system of claim 16, wherein the plurality of user sessions includes at least one user session configured to manage a plurality of client subaccounts and to allocate billing charges to the client subaccounts based on usage of the processing pipeline.

18. The system of claim 16, wherein the project portal enables association of a project workspace with a plurality of collaborators including internal team members and external vendors, and enforces role-based permissions for uploading baseline artifacts, modifying project parameters, and approving exports.

19. The system of claim 16, wherein the data services layer comprises a database service configured to persist at least one of baseline artifacts, constraint sets, intermediate representations, replayable execution traces, or exported outputs, and further comprises a replay stream service configured to reconstruct a prior pipeline run for audit or reprocessing.

20. The system of claim 16, wherein the selectable stage navigation control further enables selection of an output-view mode including at least one of a two-dimensional overlay preview, a three-dimensional viewer preview, an issue-list view, or an export-format selection view.

21. The system of claim 16, wherein the completeness check determines whether required inputs for a selected system domain are present and, upon determining missing data, automatically routes the selected project workspace to the upload stage or the configuration stage to solicit the missing data.

22. The system of claim 16, wherein analyzing failure points comprises performing at least one of a clash check, a capacity check, a connectivity integrity check, or a compliance-conflict check, and generating an itemized issue list displayed within the review/testing stage.

23. The system of claim 16, wherein the end-to-end processing pipeline includes bidirectional correction loops between at least two of the normalization, completeness check, specification sensibility determination, required system input generation, layout connection integration, and failure-point analysis steps, such that corrective revisions trigger re-execution of one or more prior steps before exporting the updated deliverable artifact.

24. The system of claim 16, wherein the system generates, for a project command center view, a plurality of project tiles each corresponding to a respective project workspace and each configured to invoke a respective processing instance, and wherein the project command center view displays per-project status including at least uploading, processing, database access, and ready-to-export states.

25. The system of claim 16, wherein the system includes a billing module configured to track user actions and processing resource consumption per project workspace and to generate accounting outputs comprising at least one of usage summaries, invoices, or vendor charge allocations.

26. A computer-implemented method for generating a code-constrained building-system layout from heterogeneous project inputs, comprising:

receiving, by one or more processors via a user interface, wherein the user interface provides a control enabling the user to iteratively revise at least one constraint input responsive to an issue, at least one baseline project artifact in a file format selected from DXF, DWG, and PDF, including optionally receiving the baseline project artifact through a direct connection to an external authoring program; receiving, by the one or more processors, project parameters comprising at least one of project dimensions, regulatory requirements, equipment preferences, or cost constraints; normalizing, by the one or more processors, the baseline project artifact and the project parameters into a unified internal representation by reconciling units, scale, coordinate frame, and schema fields in accordance with an anticipated output and the project dimensions; determining, by the one or more artificial intelligence assisted processes, an input type corresponding to the baseline project artifact and selecting a format-aware parsing pathway; parsing, by the one or more processors, the baseline project artifact according to the selected parsing pathway to extract geometry and architectural features and, when the baseline project artifact is a drawing or document, converting the baseline project artifact into a uniform internal model usable across internal processing stages;

interpreting, by the one or more processors, system requirements for at least one selected technical domain by applying a constraint ruleset including spacing and coverage constraints derived from the regulatory requirements; generating, by the one or more processors using an artificial intelligence model, at least one placement strategy specifying candidate placements of system elements within the uniform internal model; filtering, by the one or more processors, the candidate placements according to at least one spatial objective comprising symmetry, uniform coverage, or mitigation of irregular coverage regions to produce a refined candidate set; validating, by the one or more processors, the refined candidate set against the constraint ruleset to generate a validation result; and rendering and exporting, by the one or more processors, an output deliverable comprising a layout overlaid onto the baseline project artifact and output in at least one user-selected format.

27. The method of claim 26, wherein receiving the project parameters further comprises receiving a jurisdictional context used to determine applicable code provisions, compiling the applicable code provisions into machine-actionable constraints, and performing the validating step using the machine-actionable constraints.

28. The method of claim 26, wherein filtering the candidate placements further comprises evaluating connectivity feasibility with respect to at least one feed, inlet, or outlet definition and removing candidate placements that violate a clearance constraint, a capacity constraint, or a connectivity continuity constraint prior to rendering and exporting the output deliverable.

* * * * *